US012772316B2

(12) United States Patent
Singh et al.

(10) Patent No.: US 12,772,316 B2
(45) Date of Patent: Oct. 20, 2026

(54) UNIFIED NETWORKING SYSTEM AND DEVICE FOR HETEROGENEOUS MOBILE ENVIRONMENTS

(71) Applicant: THE TRUSTEES OF COLUMBIA UNIVERSITY IN THE CITY OF NEW YORK, New York, NY (US)

(72) Inventors: Amandeep Singh, Bangalore (IN); Gaston S. Ormazabal, New York, NY (US); Henning G. Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 269 days.

(21) Appl. No.: 18/541,210

(22) Filed: Dec. 15, 2023

(65) Prior Publication Data

US 2024/0121845 A1 Apr. 11, 2024

Related U.S. Application Data

(60) Division of application No. 16/744,650, filed on Jan. 16, 2020, now Pat. No. 11,889,575, which is a (Continued)

(51) Int. Cl.

*H04W 76/16* (2018.01)
*H04L 41/0895* (2022.01)

(Continued)

(52) U.S. Cl.

CPC ......... *H04W 76/16* (2018.02); *H04L 41/0895* (2022.05); *H04L 43/08* (2013.01);

(Continued)

(58) Field of Classification Search

CPC ............. H04W 76/16; H04W 28/0226; H04W 36/0019; H04W 36/12; H04W 36/14;

(Continued)

(56) References Cited

U.S. PATENT DOCUMENTS

2001/0009547 A1* 7/2001 Jinzaki .............. H04L 12/40058 370/410
2002/0001302 A1 1/2002 Picket (Continued)

FOREIGN PATENT DOCUMENTS

CN 1968134 B * 5/2010
CN 102045308 A * 5/2011 ......... H04L 63/1458

(Continued)

OTHER PUBLICATIONS

U.S. Appl. No. 14/558,467 (U.S. Pat. No. 10,541,926), filed Dec. 2, 2014 (Jan. 21, 2020).

(Continued)

*Primary Examiner* — Atique Ahmed
(74) *Attorney, Agent, or Firm* — Baker Botts LLP

(57) ABSTRACT

Method for unified networking for a device in heterogeneous mobile environments includes maintaining and monitoring active network interfaces, managing the location of the device, managing network access security, enabling disruption tolerance support for applications, enabling service sharing and session mobility, managing system parameters for one or more active application sessions, managing storage functionality in one or more memory devices, and maintaining a mapping for one or more flows corresponding to the one or more active application sessions, maintaining one or more policies, and performing flow control decisions based upon the policies using a policy engine. The method can also include monitoring for network events, evaluating whether to perform a handover based upon policies, and (Continued)

providing seamless secure handovers in a heterogeneous mobile environment. A device, non-transitory computer-readable medium, and a system for unified networking are also provided.

17 Claims, 37 Drawing Sheets

Related U.S. Application Data continuation of application No. 14/558,467, filed on Dec. 2, 2014, now Pat. No. 10,541,926, which is a continuation of application No. PCT/US2013/032637, filed on Mar. 15, 2013.

(60) Provisional application No. 61/763,665, filed on Feb. 12, 2013, provisional application No. 61/656,176, filed on Jun. 6, 2012.

(51) Int. Cl.

| | |
|---|---|
| ***H04L 43/08*** | (2022.01) |
| ***H04L 47/193*** | (2022.01) |
| ***H04L 47/20*** | (2022.01) |
| ***H04L 61/103*** | (2022.01) |
| ***H04L 61/4511*** | (2022.01) |
| ***H04L 61/5084*** | (2022.01) |
| ***H04L 69/321*** | (2022.01) |
| ***H04W 28/02*** | (2009.01) |
| *H04L 41/0893* | (2022.01) |
| *H04L 41/0894* | (2022.01) |
| *H04W 36/00* | (2009.01) |
| *H04W 36/12* | (2009.01) |
| *H04W 36/14* | (2009.01) |
| *H04W 80/00* | (2009.01) |

(52) U.S. Cl.

CPC ............ *H04L 47/193* (2013.01); *H04L 47/20* (2013.01); *H04L 61/103* (2013.01); *H04L 61/4511* (2022.05); *H04L 61/5084* (2022.05); *H04L 69/321* (2013.01); *H04W 28/0226* (2013.01); *H04L 41/0893* (2013.01); *H04L 41/0894* (2022.05); *H04W 36/0019* (2023.05); *H04W 36/12* (2013.01); *H04W 36/14* (2013.01); *H04W 80/00* (2013.01)

(58) Field of Classification Search

CPC ..... H04W 80/00; H04W 88/06; H04W 48/18; H04L 41/0895; H04L 43/08; H04L 47/193; H04L 47/20; H04L 61/103; H04L 61/4511; H04L 61/5084; H04L 69/321; H04L 41/0893; H04L 41/0894; H04L 67/52

See application file for complete search history.

(56) References Cited

U.S. PATENT DOCUMENTS

2002/0075844 A1 6/2002 Hagen
2004/0044721 A1 3/2004 Song et al.
2004/0081183 A1 4/2004 Monza et al.
2004/0174392 A1 9/2004 Bjoernsen et al.
2004/0228304 A1 11/2004 Riedel et al.
2005/0007995 A1* 1/2005 Inoue .................... H04W 68/00 370/352
2005/0198363 A1 9/2005 Ling et al.
2006/0045098 A1 3/2006 Krause
2006/0047761 A1* 3/2006 Kaplan ................... H04L 67/51 709/206
2006/0168331 A1 7/2006 Thomson et al.
2006/0187858 A1* 8/2006 Kenichi .................. H04L 63/08 370/254
2006/0234676 A1 10/2006 Harris et al.
2006/0252376 A1 11/2006 Fok et al.
2007/0067807 A1 3/2007 O'Neil
2007/0173283 A1* 7/2007 Livet ..................... H04W 88/06 455/552.1
2008/0005349 A1 1/2008 Li et al.
2008/0069118 A1* 3/2008 Monier .................. G01D 4/004 370/400
2008/0086564 A1 4/2008 Putman et al.
2008/0192925 A1 8/2008 Sachs et al.
2008/0242224 A1 10/2008 Fratti et al.
2009/0034622 A1* 2/2009 Huchet ................ H04N 19/182 375/E7.193
2009/0112521 A1 4/2009 Carpenter et al.
2009/0113066 A1* 4/2009 Van Wie ............. G06F 3/04815 709/231
2009/0144390 A1 6/2009 Previdi et al.
2009/0219833 A1 9/2009 Yaqub et al.
2009/0225751 A1 9/2009 Koenck et al.
2009/0286531 A1 11/2009 Bhatt et al.
2009/0300407 A1* 12/2009 Kamath .............. H04L 67/1034 714/E11.073
2009/0316652 A1 12/2009 Agashe et al.
2010/0091653 A1 4/2010 Koodli et al.
2010/0121961 A1 5/2010 Elleuch et al.
2010/0157868 A1 6/2010 Yam
2010/0177660 A1 7/2010 Essinger et al.
2010/0195503 A1* 8/2010 Raleigh ............... H04L 41/5054 709/224
2010/0232389 A1 9/2010 Park
2010/0291907 A1 11/2010 MacNaughtan et al.
2011/0032824 A1* 2/2011 Eyuboglu ............ H04W 36/10 370/329
2011/0032870 A1 2/2011 Kumar
2011/0107379 A1 5/2011 Lajoie et al.
2011/0124334 A1 5/2011 Brisebois et al.
2011/0131338 A1 6/2011 Hu
2011/0145392 A1 6/2011 Dawson et al.
2011/0161496 A1 6/2011 Nicklin
2011/0164527 A1* 7/2011 Mishra .................. H04L 45/308 370/252
2011/0275364 A1 11/2011 Austin et al.
2012/0036035 A1 2/2012 Baluja et al.
2012/0084078 A1* 4/2012 Moganti ................. G10L 17/00 704/201
2012/0096159 A1* 4/2012 Short ...................... H04L 63/08 709/225
2012/0134328 A1 5/2012 Gauvreau et al.
2012/0205990 A1 8/2012 Minnoy et al.
2012/0297238 A1 11/2012 Watson et al.
2013/0091285 A1* 4/2013 Devarakonda ........ G06F 9/4856 709/226
2013/0132562 A1* 5/2013 Bandyopadhyay ..... H04L 47/41 709/224
2013/0143542 A1 6/2013 Kovvali et al.
2013/0210464 A1 8/2013 Mittal
2013/0227106 A1 8/2013 Grinshpun et al.
2013/0308470 A1 11/2013 Bevan et al.
2014/0075567 A1 3/2014 Raleigh et al.
2014/0098671 A1 4/2014 Raleigh et al.
2014/0201321 A1 7/2014 Donaghey et al.
2014/0219088 A1* 8/2014 Oyman ............... H04L 65/1083 370/231
2014/0280830 A1 9/2014 Ang et al.
2014/0376365 A1 12/2014 Tipton et al.

FOREIGN PATENT DOCUMENTS

CN 102546697 A * 7/2012
CN 103548314 A * 1/2014 ............. H04W 8/26
GB 2 403 623 A 1/2005
JP 2009-527133 A 7/2009
JP 2010-528502 A 8/2010
JP 2015-528222 A 9/2015
WO WO 2007/078663 A2 7/2007

(56) References Cited

FOREIGN PATENT DOCUMENTS

| | | |
|---|---|---|
| WO | WO 2008/138376 A1 | 11/2008 |
| WO | WO 2011/149532 A1 | 12/2011 |
| WO | WO 2013/184225 A1 | 12/2013 |

OTHER PUBLICATIONS

U.S. Appl. No. 16/744,650 (U.S. Pat. No. 11,889,575), filed Jan. 16, 2020 (Jan. 30, 2024).
U.S. Appl. No. 16/744,650, Dec. 15, 2023 Issue Fee Payment.
U.S. Appl. No. 16/744,650, Sep. 22, 2023 Notice of Allowance.
U.S. Appl. No. 16/744,650, Aug. 11, 2023 Request for Continued Examination (RCE).
U.S. Appl. No. 16/744,650, Jul. 25, 2023 Advisory Action.
U.S. Appl. No. 16/744,650, Jul. 10, 2023 Response After Final Action.
U.S. Appl. No. 16/744,650, Jul. 10, 2023 Amendment and Request for Continued Examination (RCE).
U.S. Appl. No. 16/744,650, Apr. 12, 2023 Final Office Action.
U.S. Appl. No. 16/744,650, Jan. 17, 2023 Response to Non-Final Office Action.
U.S. Appl. No. 16/744,650, Oct. 21, 2022 Non-Final Office Action.
U.S. Appl. No. 16/744,650, Jun. 27, 2022 Response to Non-Final Office Action.
U.S. Appl. No. 16/744,650, Apr. 26, 2022 Non-Final Office Action.
U.S. Appl. No. 16/744,650, Feb. 18, 2022 Response to Restriction Requirement.
U.S. Appl. No. 16/744,650, Oct. 8, 2021 Restriction Requirement.
U.S. Appl. No. 14/558,467, Dec. 4, 2019 Issue Fee Payment.
U.S. Appl. No. 14/558,467, Sep. 5, 2019 Notice of Allowance.
U.S. Appl. No. 14/558,467, Jun. 11, 2019 Response to Non-Final Office Action.
U.S. Appl. No. 14/558,467, Feb. 19, 2019 Non-Final Office Action.
U.S. Appl. No. 14/558,467, Sep. 19, 2018 Amendment and Request for Continued Examination (RCE).
U.S. Appl. No. 14/558,467, May 25, 2018 Response to Final Office Action.
U.S. Appl. No. 14/558,467, Mar. 27, 2018 Final Office Action.
U.S. Appl. No. 14/558,467, Feb. 9, 2018 Response to Non-Final Office Action.
U.S. Appl. No. 14/558,467, Nov. 9, 2017 Non-Final Office Action.
U.S. Appl. No. 14/558,467, Jul. 10, 2017 Response to Restriction Requirement.
U.S. Appl. No. 14/558,467, May 11, 2017 Restriction Requirement.
Gao et al., "End-To-End QoS Provisioning in Mobile Heterogeneous Networks," IEEE Wireless Communications, IEEE Service Center, Piscataway, NJ, US, vol. 11, No. 3, Jun. 1, 2004, pp. 24-34.
Imai et al., "Seamless Communication Services and Their R & D Directions," The IEICE Transactions on Communications (Japanese Edition), the Institute of Electronics, Information and Communication Engineers, Aug. 1, 2006, J89-B/No. 8, pp. 1347-1356 (Machine-translation of English abstract included).
International Search Report and Written Opinion dated May 31, 2013 in International Application No. PCT/US2013/032637.
Kasai et al., "Seamless Service Environment Platform for Service Transfer among Terminals," The IEICE Transactions on Communications (Japanese Edition) the Institute of Electronics Information and Communication Engineers J86B(8):1389-1403 (2003) (with English machine translation).
Kuwana, "The Changing Environment and Cyber Security," NTT R&D, pp. 37-40 (2012) (with English machine translation).
Shindo et al., "Design and Implementation of Session Management Architecture for Service Mobility," IEICE Technical Report, the Institute of Electronics Information and Communication Engineers 103(692):47-52 (2004) (with English abstract).
Supplementary European Search Report mailed Feb. 9, 2016 in EP Application No. 13801342.0.
U.S. Appl. No. 14/558,467, Feb. 9, 2018 Response to Non-Final Office.

* cited by examiner

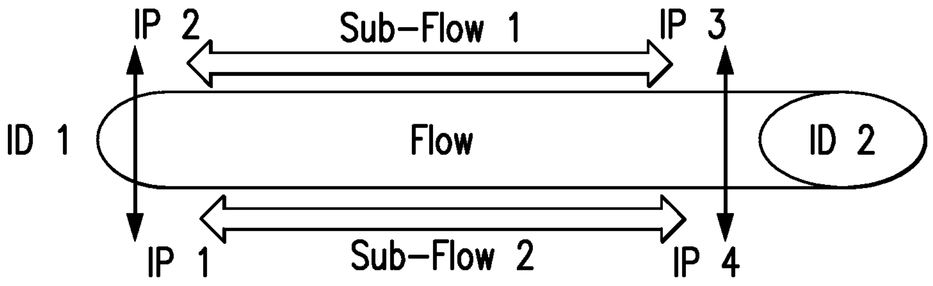
FIG. 1
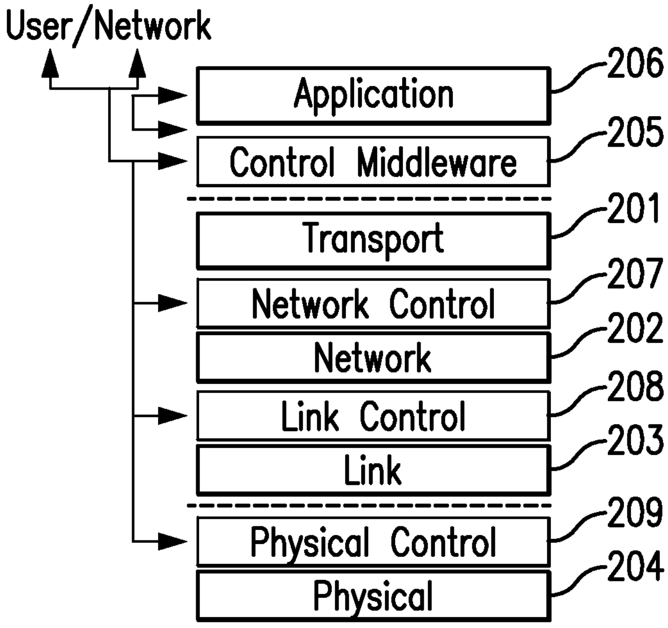
FIG. 2
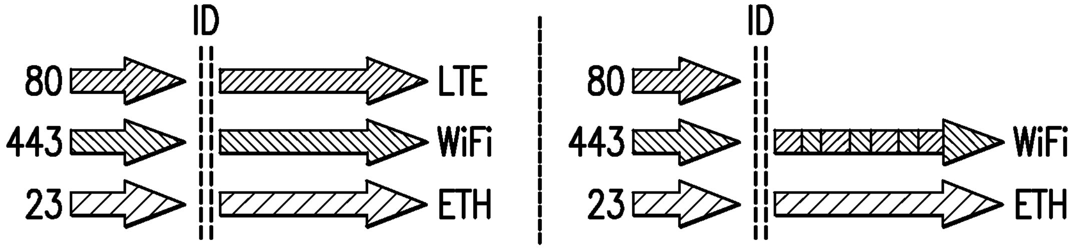
FIG. 3A
FIG. 3B

Continued from FIG.63–1

UNIFIED NETWORKING SYSTEM AND DEVICE FOR HETEROGENEOUS MOBILE ENVIRONMENTS

CROSS-REFERENCE TO RELATED APPLICATIONS

This application is a divisional of U.S. patent application Ser. No. 16/744,650, filed on Jan. 16, 2020, now allowed, which is a continuation of U.S. patent application Ser. No. 14/558,467, filed on Dec. 2, 2014, now U.S. Pat. No. 10,541,926, which is a continuation of International Application No. PCT/US2013/032637, filed on Mar. 15, 2013, which claims priority to U.S. Provisional Patent Application No. 61/656,176, filed on Jun. 6, 2012, and U.S. Provisional Patent Application No. 61/763,665, filed on Feb. 12, 2013, each of which is incorporated by reference herein in its entirety.

BACKGROUND

The disclosed subject matter relates to networking systems in mobile environments. People have become more connected than ever. Mobile communications and the Internet are at the center of this phenomenon. The mobile environment can be defined as a combination of different network access technologies and communication devices, which a mobile device encounters in daily usage. Mobile applications can be used across different network technologies, and also, from multiple devices with diverse networking, computing and input/output features. Users can want mobile applications to work seamlessly across network technologies or administrative service domains and to be always connected to the best available network, and also, across different communication devices. With the increase in mobile devices, in order to provide a better user experience, service providers also need to manage infrastructure network resources and handle the increase in mobile broadband traffic efficiently.

Certain communication devices, e.g., smartphones, tablets, and laptops, have significant mobility and processing power that provide phone, computing, video, and data communication. These devices can have multiple network interfaces, such as Wi-Fi, WiMAX, LTE, and possibly a wired LAN. Cellular networks provide pervasive mobility with a large coverage area as compared other networks like Wi-Fi which only provide limited coverage. Also, there can be multiple service providers in the same geographic area in most of the regions around the world. However, communication devices can be limited where they only connect to one network interface at a time and/or are registered with only one service provider. Certain applications can provide seamless handovers across heterogeneous networks, but, users cannot control which network interface to use for a particular application or data type and there is no general framework to provide this functionality to all applications.

Internet services such as communications, streaming, online gaming, collaboration applications, etc., and also, desktop applications, can be accessed from different devices having different screen sizes, variable processing power, and battery requirements, for example, from smartphones, tablets, laptops, as well as Wi-Fi enabled TVs. Supporting a single application session across multiple devices can require session and personal mobility. For example, users can want to move an active session from a smartphone to a desktop PC or a video call to a Wi-Fi enabled screen and a desk phone, e.g., to improve their experience or due to battery concerns. Having mobility, however, can cause temporary communication disruptions due to reduction in signal strength, physical channel congestion, and/or network unavailability.

Users can move to places where there is no wireless Internet access at all or the user cannot readily access any of the networks, e.g., while traveling internationally. Thus, connectivity can be intermittent, with disruptions from seconds to hours or days. If there is no network connectivity, a device software can delay the transmission of data until a suitable network is found, i.e., disruption tolerance. Certain applications use this functionality, but, users cannot control which network interface to use for a particular application or data type and there is no general framework to provide this functionality to all applications.

Hence, there is a need for a networking system that provides a seamless user experience, improves overall network robustness by making use of multiple service providers and/or network interfaces, and enables seamless device-to-device communications

SUMMARY

In accordance with one aspect of the disclosed subject matter, a device for providing unified networking in a heterogeneous mobile environment is provided. The device includes network hardware including a physical layer and one or more memory devices. The one or more memory devices has stored therein a link layer stacked on top of the physical layer; a network layer stacked on top of the link layer; a transport layer stacked on top of the network layer; an application layer stacked on top of the transport layer; a physical control function (PCF) between the physical layer and the link layer for managing spectrum channel configuration; a link control function (LCF) between the link layer and the network layer for providing one or more of mac-address and lookup table control, link status, control and performance information, network packet lookup, network to device discovery and authentication, handover delay optimizations, and control for virtual interface configuration; a network control function (NCF) between the network layer and the transport layer for providing one or more of routing table control, multi-homing, mobility, multipath and on-demand end-to-end security functionalities; and a control middleware between the application layer and the transport layer for maintaining a mapping for one or more flows, maintaining one or more policies, and performing flow control decisions based on the one or more policies.

In some embodiments, the control middleware can be adapted to manage the physical, link, and network control functions. The control middleware can be adapted to provide one or more of multi-homing, mobility, multipath, service sharing, disruption tolerance, and combinations thereof. The control middleware can also be adapted to manage discovery of networks, devices and available physical spectrum channels. The control middleware can be configured for communication with a service access manager for controlling network access. The control middleware can comprise a network manager, location manager, security manager, queue manager, service sharing manager, and system manager modules, a data store, and a policy engine for determining when to execute a handover.

In some embodiments, the NCF can be adapted to provide a flow identifier to the transport layer, which does not change during the lifetime of the flow even in the event of a mobility event. The NCF can be configured for communication with a mobility manager for handling mobility events. The LCF can be configured for communication with a network information manager that provides information about available networks. The PCF can be configured for communication with a spectrum database manager for transceiver spectrum configuration.

In accordance with one aspect of the disclosed subject matter, a method for unified networking for a device in heterogeneous mobile environments is provided. The method includes maintaining and monitoring active network interfaces; managing the location of the device; managing network access security; enabling disruption tolerance support for applications; enabling service sharing and session mobility; managing system parameters for one or more active application sessions; managing storage functionality in one or more memory devices; and maintaining a mapping for one or more flows corresponding to the one or more active application sessions, maintaining one or more policies, and performing flow control decisions based upon the policies using a policy engine.

In some embodiments, each of the one or more flows can include a data pipe between the device and a second communication node, each of the one or more flows being identified by a flow identifier that remains constant even in the event of a mobility event. The method can further include one or more sub-flows identified by at least one IP address that is interrupted and reconfigured in the event of a mobility event.

In some embodiments, the method can further include using the policy engine to perform flow control decisions in real-time to determine whether to complement an existing flow. A first flow provided by a first network interface can be moved to a second network interface.

In some embodiments, the method can further include using the policy engine to perform flow control decisions in real-time to determine whether to supplement an existing flow with a parallel auxiliary connection. A first flow can include a first sub-flow provided by a first network interface and a second sub-flow provided by a second network interface simultaneously. A plurality of flows can be maintained, each of the plurality of flows having a corresponding network interface.

In some embodiments, the disruption tolerance support can be provided when there is no network connectivity or if a policy enforces no network usage. The using the policy engine can further include using an active flow table, a policy table, and an evaluator.

In some embodiments, the performing flow decisions using the policy engine can include evaluating current attributes selected from the group consisting of location, time, network cost, network bandwidth, network latency, network presence, network security, device sensor data, application resource usage or combinations thereof.

In some embodiments, the method can further include offloading execution of one or more applications to a cloud in the event one or more of the system parameters exceeds a threshold value for the application. Additionally or alternatively, the method can further include offloading execution of one or more applications to a cloud in the event the application requires additional resources.

In some embodiments, the method can further include maintaining and updating a knowledge base comprising past network information including one or more of interface, time, location, resource, and bandwidth information. The knowledge base can be used to create a geographic network access map, and the geographic network access map can be used to perform flow decisions to reduce handover latency.

In some embodiments, the managing network access security can include one or more of storing and managing credentials, providing access service authentication for a plurality of network interfaces and devices, providing secure mobile handovers, and providing secure end-to-end communications. Authentication credentials for network access can be reused for link and network control function protocols across a plurality of network interfaces, and further wherein in order to set up confidential end-to-end communication paths on a per application basis, using a generic authentication framework across a plurality of network interfaces.

In some embodiments, the method can further include monitoring network performance attributes selected from the group consisting of signal strength, latency, available bandwidth, network presence, security parameter and combinations thereof and creating a network event if one or more of the network performance attributes exceeds a predetermined threshold value. The policy engine can be signaled about the network event and policies for each active application session can be evaluated to determine whether to perform a handover from a first network interface to a second network interface. If a handover decision is made, preauthentication can be performed with a security manager including selecting a pseudo-identity, authentication mechanism, and credentials corresponding to the second network interface. A network authentication request can be signaled to a link control function with the security manager, network access procedures can be performed with the link control function, and an authentication result can be returned to the security manager. The authentication result can be signaled to the policy engine and if the device is authenticated, the handover to the second network interface can be performed. The link control function can store session key tokens comprising a time-to-live for re-authentication and the time-to-live can be adjusted based past network access patterns for the device.

In some embodiments, enabling service sharing can include providing service registration for maintaining registered services on the device, evaluating service requests, and performing flow migration to perform session mobility for the device to another device. The providing service registration can include receiving a service registration request for a service at the policy engine, passing the service registration request to a service sharing manager, registering the service in a service registration table in the service sharing manager, and broadcasting the service to connected devices in parallel. The evaluating service requests can include receiving a service request for a service from an application at the policy engine, passing the service request to a service sharing manager, checking a service registration table in the service sharing manager for the service, if the service is found in the service registration table, evaluating the service to determine if a service score is above a threshold value, and notifying the application about the service if the service score is above the threshold value. The performing flow migration can include receiving a service migration request from an application at the policy engine, passing the service migration request to a service sharing manager, checking the service migration request and fetching device details from a service registration table in the service sharing manager, initiating the flow migration to a second device with the service sharing manager, synchronizing the flow at the device and the second device, notifying the application of a migration result.

In some embodiments, the device can be a network element selected from the group consisting of a server or a router. The method can further include receiving a service request at the network element, checking a service table for a service match, returning a service response if a match is found, and forwarding the service request if no match is found. The method can further include maintaining and updating a knowledge base comprising past network access data for a plurality of devices. The knowledge base can be used to proactively offer services to devices based upon the past network access data. The services can include one or more of security measures that detect Distributed Denial of Service attacks, forensics for understanding security events, providing detailed behavior of user equipment (UE) in the network, location-based services, and forensics.

In accordance with one aspect of the disclosed subject matter, a non-transitory computer-readable medium for operating a device in heterogeneous mobile environments containing computer-executable instructions that when executed cause one or more devices to perform a method for unified networking is provided. The method includes maintaining and monitoring active network interfaces; managing the location of the device; managing network access security; enabling disruption tolerance support for applications; enabling service sharing and session mobility; managing system parameters for one or more active application sessions; managing storage functionality in one or more memory devices, and maintaining a mapping for one or more flows corresponding to the one or more active application sessions, maintaining one or more policies, and performing flow control decisions based upon the policies using a policy engine. The non-transitory computer-readable medium can include any of the optional features for the device and methods described herein.

In accordance with one aspect of the disclosed subject matter, a system for managing network connections in heterogeneous mobile environments for a device is provided. The system includes one or more storage devices having stored therein a set of rules for maintaining a mapping of one or more flows corresponding to one or more active application sessions and performing flow control decisions. The set of rules is policy based. The system also includes one or more transceivers communicatively coupled to at least one network and one or more processors operatively coupled to the one or more storage devices and the one or more transceivers. The one or more processors is configured to receive information about a location of the device and active network interfaces including one or more of bandwidth, cost, and latency parameters, perform flow control decisions based on the set of rules, the information received about the location of the device and active network interfaces, and one or more of application system resource usage, time, and device type, and update the mapping of one or more flows corresponding to one or more active application sessions based on results of the flow control decisions. The system can result in more granular control of network access on a per application basis. The system can include any of the optional features for the device, method, and/or the non-transitory computer-readable medium described above.

BRIEF DESCRIPTION OF THE DRAWINGS

FIG. 1 is a diagram illustrating a flow between two communicating nodes in accordance with one aspect of the disclosed subject matter.

FIG. 2 is a diagram illustrating an exemplary modified Internet protocol suite in accordance with one aspect of the disclosed subject matter.

FIG. 3A-3B is a diagram illustrating an example of multi-homing in accordance with one aspect of the disclosed subject matter.

FIG. 63-1 and FIG. 63-2 show a flow chart illustrating exemplary operation of the network manager.

FIG. 67-1 and FIG. 67-2 show a flow chart illustrating exemplary operation of the policy engine.

FIG. 68-1 and FIG. 68-2 show a flow chart illustrating exemplary operation of the service sharing manager.

DETAILED DESCRIPTION

One aspect of the disclosed subject matter relates to a software architecture for a unified networking system in heterogeneous mobile environments that can be independent of both network and user equipment (the terms "user equipment," "UE," "device," "mobile node," and "MN" are used interchangeably herein). The architecture can include control middleware between the application layer and the transport layer called Context aware Control Middleware (CCM), which provides a unified abstraction of all network interfaces to the application layer. The middleware can abstract multi-homing, mobility (e.g., terminal, network, and session mobility), multipath, service sharing, and disruption tolerance functionalities. The architecture can also be independent of any (present and future) transport, network, link and physical layer protocols. The architecture can free applications from dealing with the complexities of device-to-device, network-to-device or device-to-network communications.

Figures 1, 63:
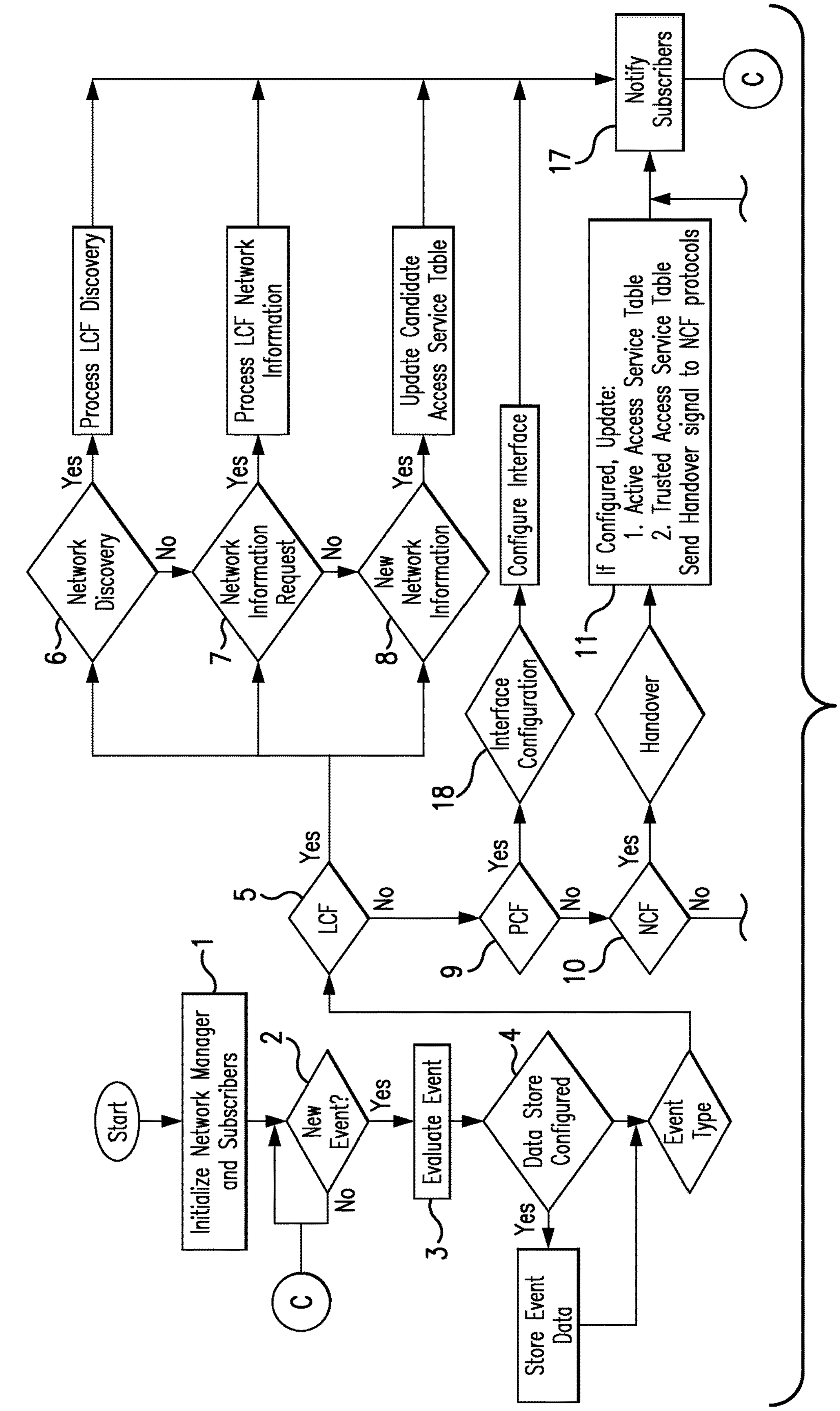

In accordance with one aspect of the disclosed subject matter, the architecture defines a concept of a flow, i.e. a logical data pipe between two communicating nodes identified by flow identifiers (i.e., IDs), which remain constant for the lifetime of the flow. The transport protocols can use flow identifiers for communication rather than IP addresses. A sub-flow can be defined as a connection between two communicating nodes using IP addresses. A flow can contain many sub-flows. If any of the IP addresses change, the sub-flow is interrupted and reconfigured (e.g., stopped and/or migrated). As the IDs remain constant during the lifetime of a flow, the transport protocol session can be kept alive even if there are changes in IP addresses due to device mobility events. For the purpose of illustration and not limitation, FIG. 1 shows a logical flow with two connections (i.e., Sub-Flow 1 and Sub-Flow 2), and the IDs (i.e., ID 1 and ID 2) at both the ends remain constant throughout the life of the flow.

Figures 2, 63:
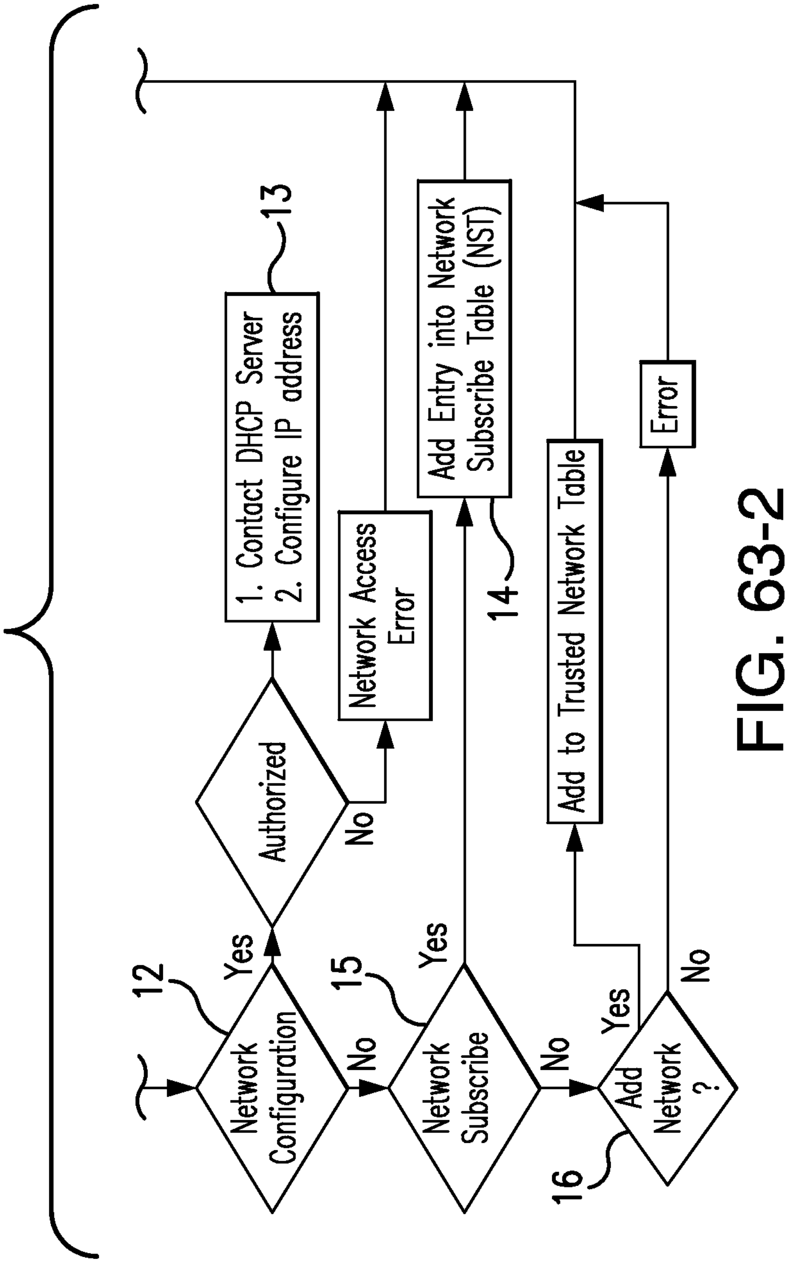

In accordance with another aspect of the disclosed subject matter, additional independent control functions or layers are provided between the transport layer 201, network layer 202, link layer 203 and physical layer 204 in the Internet protocol suite as shown in FIG. 2 for the purpose of illustration and not limitation. The control middleware 205 located between the transport layer 201 and the application layer 206 can manages these control functions. The middleware 205 can manage multiple interfaces, perform mobility decisions, enable application and device resource sharing, provide disruption tolerance support, and manage discovery of networks, devices, and available physical spectrum channels. The control middleware 205 can provide a policy based modular decision making system, which supplements or complements an existing flow with possible parallel auxiliary connections to improve user experience, performance and reliability.

As shown in FIG. 2, the Network Control Function (NCF) 207 decouples the transport layer 201 and network layer 202 functionality, which can enable the addition of any future network protocols to the networking stack without changing upper layers. The NCF 207 can enable, for example, routing table control, multi-homing, mobility, and multipath functionalities.

Multi-homing can provide the ability to use different interfaces for individual flows, as shown in FIG. 3A-3B for the purpose of illustration and not limitation. In multi-homing, there is a one-to-one correspondence between flow and interface. As shown in FIG. 3A-3B part A, the three flows on ports 80, 443, and 23 are each using different interfaces, i.e. 80 is using LTE, 443 is using WiFi, and 23 is using Ethernet. In one example, if the LTE interface becomes unavailable (e.g. if there is no network coverage) as shown in FIG. 3A-3B part B, the flow on port 80 can be diverted to Wi-Fi interface.

Figure 4A:
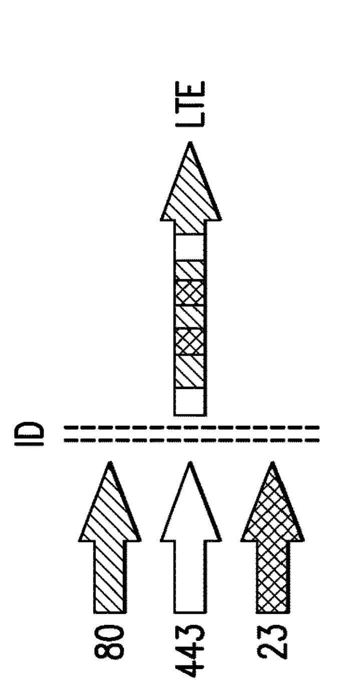
FIG. 4A-4B is a diagram illustrating an example terminal mobility event in accordance with one aspect of the disclosed subject matter.
Figure 4B:
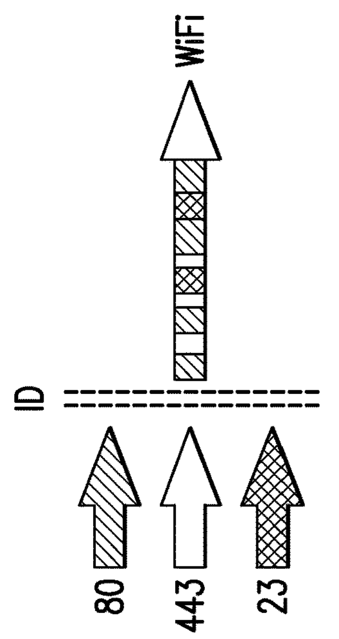

The NCF 207 enables three kinds of mobility—Terminal, Network and Session. The mobility can be homogeneous, within the same technology, or heterogeneous, across technologies (inter-technology). Terminal mobility refers to user equipment (UE) moving from one network to another, as shown in FIG. 4A-4B for the purpose of illustration and not limitation. In part A of FIG. 4A-4B, the UE is using LTE interface and in part B of FIG. 4A-4B all the traffic moves to Wi-Fi. Network mobility refers to when one or more UEs are connected to a router and the router performs terminal mobility without affecting the UE-router connections.

Figure 5A:
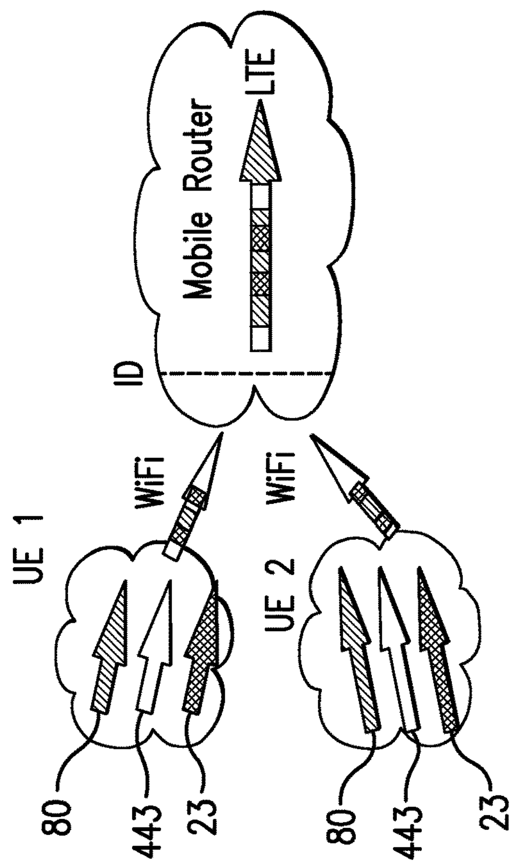
FIG. 5A-5B is a diagram illustrating an example network mobility event in accordance with one aspect of the disclosed subject matter.
Figure 5B:
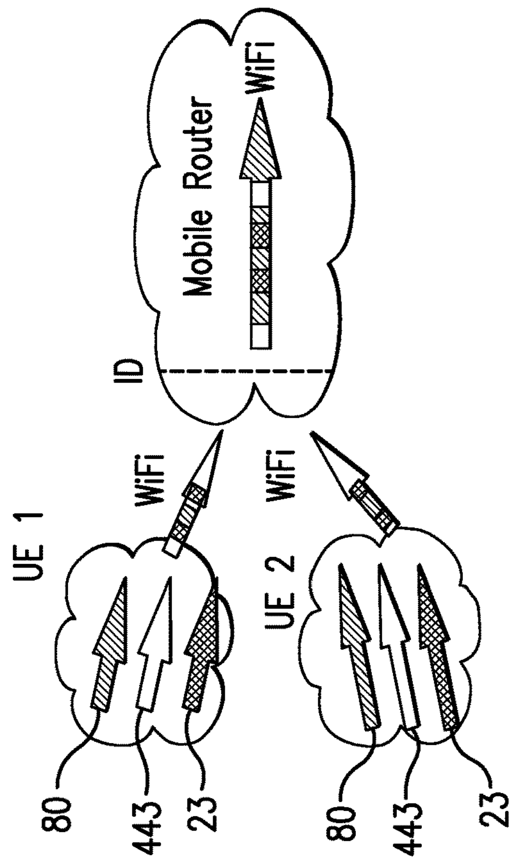

For the purpose of illustration and not limitation, FIG. 5A-5B illustrates a network mobility event. In part A of FIG. 5A-5B, the UE1 and UE2 are connected to mobile router using Wi-Fi interfaces and the router is connected to the Internet using LTE interface. In part B of FIG. 5A-5B, the mobile router performs terminal mobility to shift to Wi-Fi, but all the connections between UEs and mobile router still use Wi-Fi interfaces. Session mobility refers to when a flow moves from one UE to another UE entirely, which can also require application specific session data synchronization between the UEs.

Figure 6A:
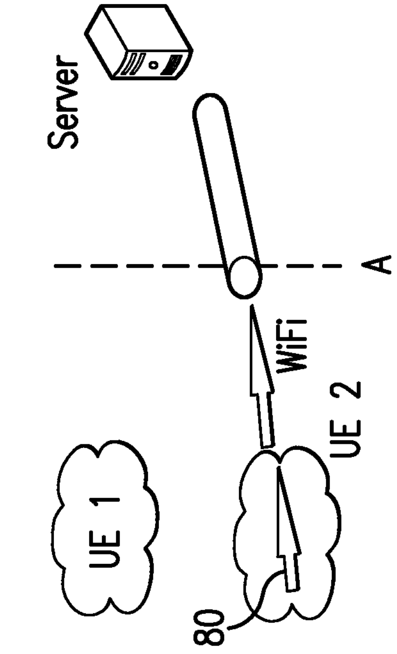
FIG. 6A-6B is a diagram illustrating an example session mobility event in accordance with one aspect of the disclosed subject matter.
Figure 6B:
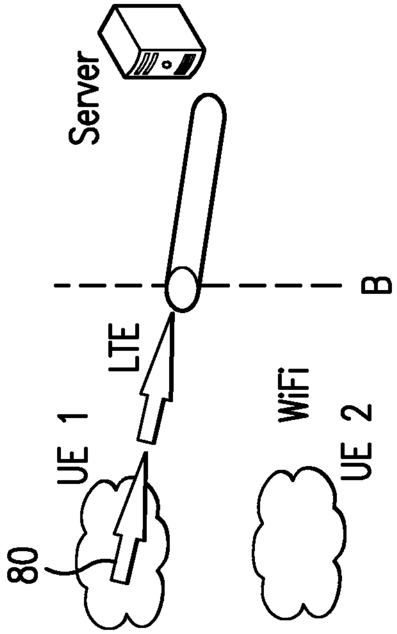

For the purpose of illustration and not limitation, FIG. 6A-B shows session mobility between UE1 and UE2. In part A of FIG. 6A-6B, UE2 is connected to the server via a Wi-Fi interface. UE1 is in the vicinity and UE2 decides to move the active session to UE1, after session mobility the session is still active between the server and the application running on port 80, but the active session is on UE1 via an LTE interface as shown in part B of FIG. 6A-6B. Session mobility can be achieved using a constant flow identifier in the Network Control Function, which can be shared between the devices, as will be described in more detail below.

Figure 7A:
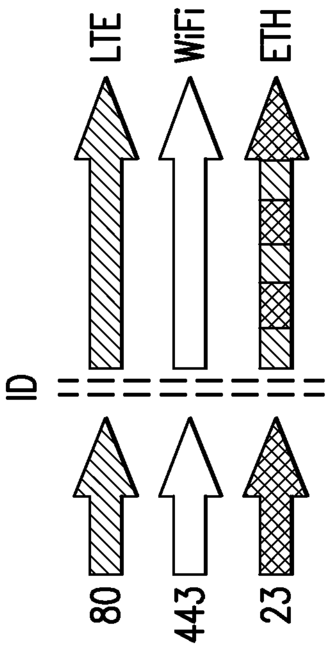
FIG. 7A-7B is a diagram illustrating exemplary multipath functionality in accordance with one aspect of the disclosed subject matter.
Figure 7B:
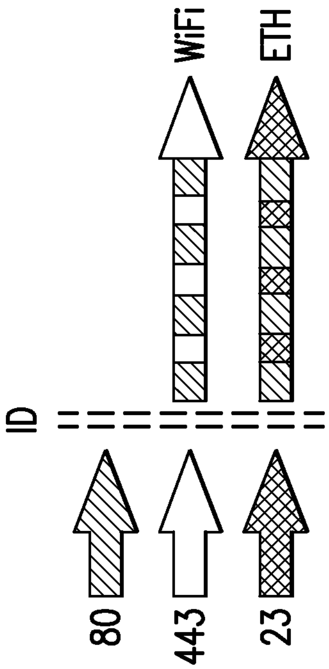

Whereas in the multi-homing case there is always a one-to-one relationship between a flow and an interface, in multipath case, a flow can have multiple sub-flows having different interfaces resulting in a one-to-many relationship between a flow and the device interfaces. For the purpose of illustration and not limitation, FIG. 7A-7B shows multipath functionality; wherein the flow running on port 80 is using LTE and ETH interfaces concurrently.

The NCF 207 can provide a constant flow identifier (ID) to the upper layer, i.e. transport, which does not change during the lifetime of the flow. This identifier can be generated dynamically, configured locally, application specific (e.g., each application provides its own identifier when creating a flow) or assigned by a third party. Each UE can have multiple identifiers configured. In case of dynamic identifiers, they can be generated at the time of flow creation.

Figure 8:
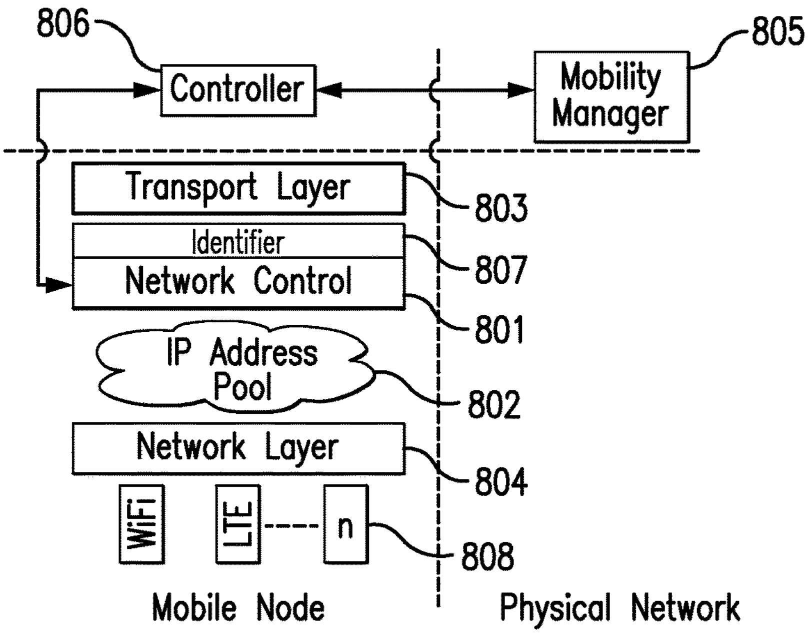
FIG. 8 is a diagram illustrating an example network control function in accordance with one aspect of the disclosed subject matter.

For the purpose of illustration and not limitation, FIG. 8 illustrates the NCF 801 semantics that control the IP address pool 802. The NCF 801 is located between the transport layer 803 and the network layer 804. To provide mobility support (e.g., in case both communicating nodes are mobile), a mobility manager (MM) 805 network element is provided to act as rendezvous point for two communicating nodes. Alternatively, if there is no MM support, the UE works in the opportunistic mode wherein a UE sends mobility event updates directly to all active connected correspondent nodes (CNs). The controller 806, as shown in FIG. 8, decouples the control plane from the data plane and it can be implemented in the operating system's user-space or kernel-space. The kernel-space memory can be managed by the operating system exclusively, can be used for running OS kernel, kernel extensions, and device drivers, and can provide runtime performance improvements. The user-space memory provides more flexibility to the software, e.g., memory can be swapped on to the disk based upon program execution. Furthermore, the NCF can be controlled by a local controller or from a remote system resulting in further decoupling of control from the local device.

In accordance with one embodiment, the existing IPv6 namespace (128 bits) can be used with a combination of presently available technologies, e.g., Host Identity Protocol (HIP) and Mobile IPv6 (MIPv6). The control middleware can dynamically select the NCF protocol based upon the correspondent node's (CN) destination address.

Figure 9:
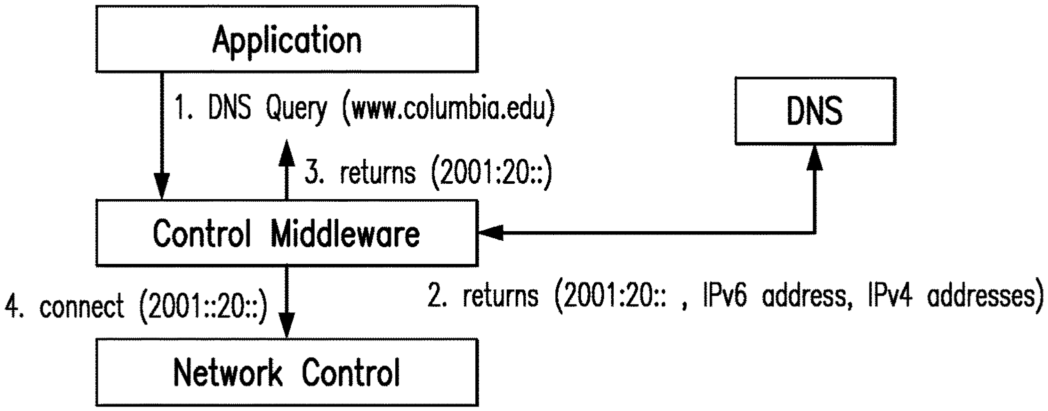
FIG. 9 is a diagram illustrating an exemplary passive selection of network control function protocol in accordance with one aspect of the disclosed subject matter.

The selection of NCF protocol can be performed by active and passive modes. In the active mode, the control middleware sends a configuration control packet to the CN, which in turn replies back with its own configuration. In the passive mode, as shown in FIG. 9 for the purpose of illustration and not limitation, the control middleware intercepts DNS query response for Host Identity Tag (HIT), and if DNS resolution contains HIT tags it is passed on to the application forcing applications to use HIP by default. The HIT provides a new namespace that can give a unique identity to each UE using a hash of a public-private key-pair. These HIT tags can be used as NCF identifiers 807 (in FIG. 8), and to support IPv6 namespace, HIT tags can be 128 bit long and to support IPv4 transport protocols, HIT tags can be 32 bit long. Furthermore, applications can modify themselves to give priority to HIT tags without any passive or active modes. In case the CN does not support NCF protocols, it can fall back to plain TCP/IP protocol.

Figure 10:
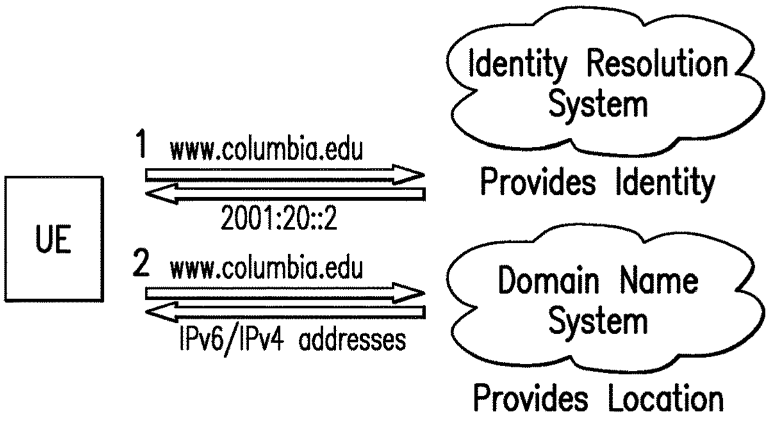
FIG. 10 is a diagram illustrating exemplary identity and location resolution in accordance with one aspect of the disclosed subject matter.

For the purpose of illustration and not limitation, FIG. 10 shows identity and location resolution in accordance with one aspect of the disclosed subject matter. If there is support for an Identity Resolution System (IRS) (e.g. DNS and Distributed Hash Tables (DHT) solutions) in the network, applications can use HIP protocol by default. The IRS can perform a Fully Qualified Domain Name (FQDN) to Identity (128 bits) resolution, for example, www.columbia.edu (FQDN) to 2001:20::2 (identity). For location resolution, DNS system can be used (e.g. the query can also have identity as the key 2001:20::2 instead of www.columbia.edu).

Figure 11:
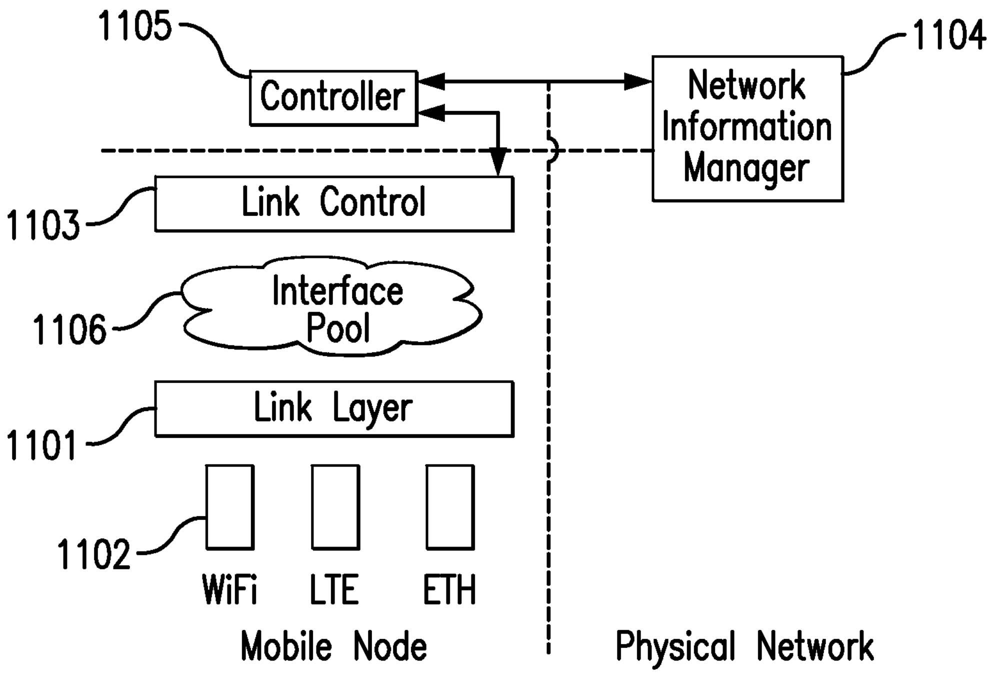
FIG. 11 is a diagram illustrating an example link control function in accordance with one aspect of the disclosed subject matter.

In one embodiment, the link layer 1101 (in FIG. 11) provides interfaces to enable connectivity using various physical networks, e.g., Ethernet, Wi-Fi, LTE, WiMAX, and the like 1102 (in FIG. 11). In accordance with the disclosed subject matter, the Link Control Function (LCF) 1103 decouples network and link layer 1101 functionality and is shown in FIG. 11 for the purpose of illustration and not limitation. The LCF 1103 can provide, for example, mac-address and lookup table control, handover delay optimizations in homogeneous and heterogeneous networks, link status (e.g., up or down), link control (e.g., on, off, or standby), and link performance information, network packet lookup, network/device discovery and authentication and control for virtual interface (i.e., when a single physical network interface is used to connect to multiple networks simultaneously, which enables parallel network access) configuration. Any (present or future) link layer technologies can be added without changing upper layers. The Network Information Manager (NIM) 1104 network element, as shown in FIG. 11, is used to provide near-by networks information (e.g., bandwidth, cost, and the like) to the LCF controller for 1105 making handover decisions. The controller 1105 sends commands and receives LCF control events. The LCF can be controlled by a local controller or from a remote system resulting in further decoupling of control from the local device. If the NIM 1104 is not configured, the LCF 11005 works in the opportunistic mode to gather near-by networks information. Similar to the IP address pool in the NCF, the LCF provides control of a logical interface pool 1106, which represents the set of active networks available for connection for each interface (e.g., physical or virtual) in the vicinity the device. In one embodiment, IEEE 802.21 MIH framework is used to manage multiple link interfaces. It provides interface availability information, link layer intelligence (e.g., signal strength), network pre-authentication, and performs mobile handovers.

Figure 12:
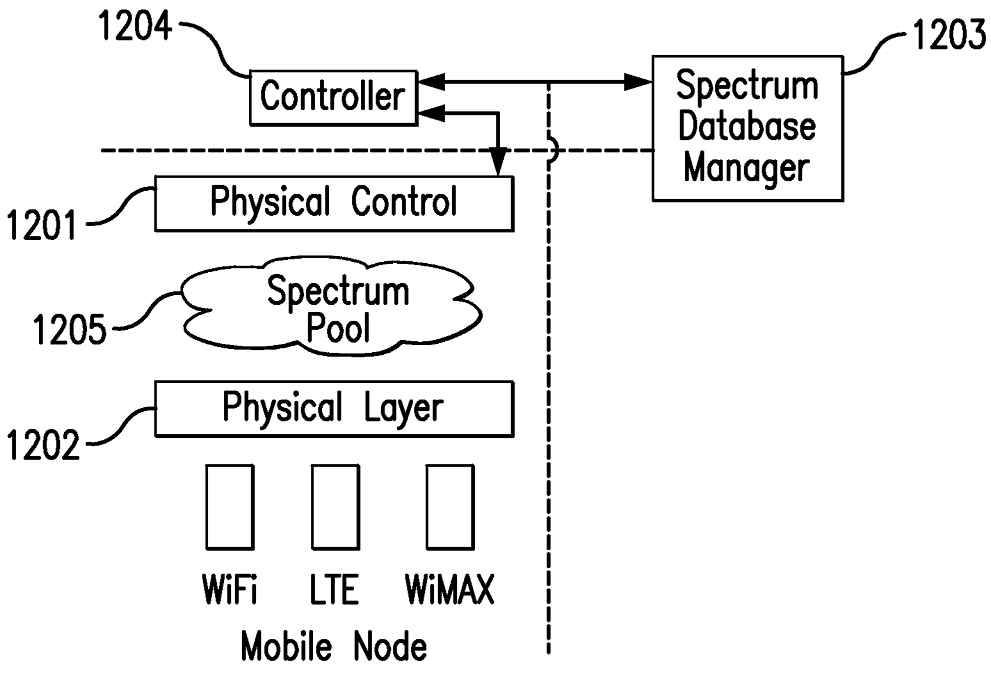
FIG. 12 is a diagram illustrating an example physical control function in accordance with one aspect of the disclosed subject matter.

In accordance with one aspect of the disclosed subject matter, for the purpose of illustration and not limitation, FIG. 12 shows the PCF 209 (in FIG. 2) functionality. The Physical Control Function (PCF) 1201 decouples the physical layer 1202 and link layer functionality and provides RF transceiver control to enable optimal spectrum channel selection, which is link interface technology specific. The Spectrum Database Manager (SDM) 1203 can manage location-based spectrum availability and can provide spectrum configuration to the controller 1204. For example, in the case of TV white space spectrum use, when a UE is in NYC, the 450 MHz channel can be used, and when the UE moves to the DC area, the 475 MHz channel can be configured dynamically by the SDM. If there is no SDM support, the UE can work in the opportunistic mode to gather spectrum information for its current location in order to make optimal channel usage decisions. The opportunistic spectrum usage is known as cognitive radio, which is a transceiver that automatically detects available channels in the wireless spectrum and accordingly changes its transmission or reception parameters so more wireless communications can run concurrently in a given spectrum band at a place. This process is also known as dynamic spectrum management. The controller provides the control plane access and communicates with the SDM for transceiver spectrum configuration. The PCF can be controlled by a local controller or from a remote system resulting in further decoupling of control from the local device. Similar to the IP address pool in the NCF, the PCF controls the logical spectrum channel pool 1205, as shown in FIG. 12, of available spectrum channels in each network interface.

Figure 13:
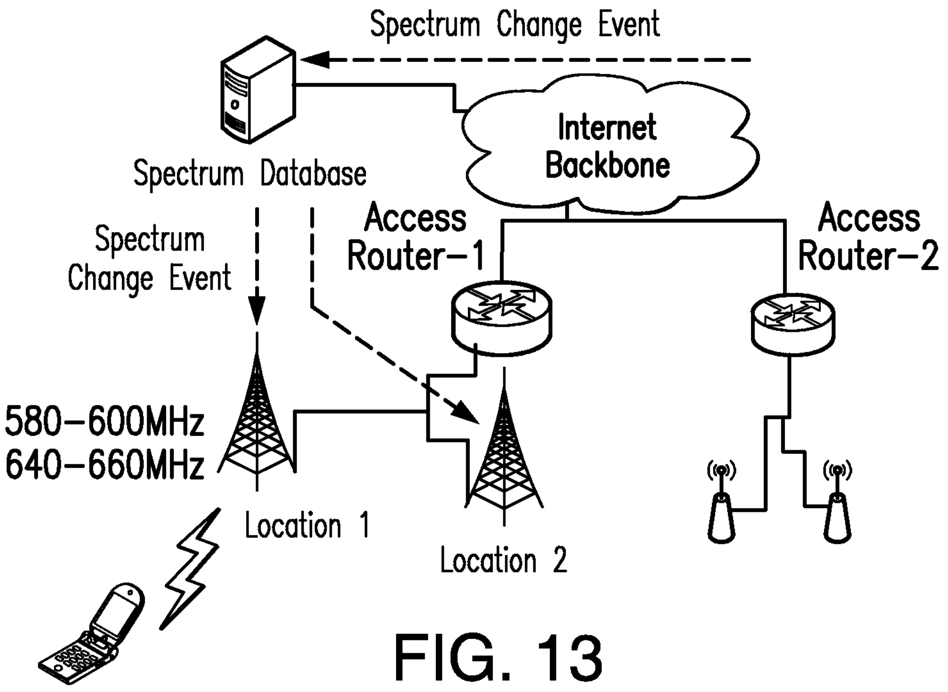
FIG. 13 is a diagram illustrating an example base station providing spectrum availability information to a device in accordance with one aspect of the disclosed subject matter.

If the infrastructure provider does not want to expose the SDM to UEs then each base station can include physical location-based spectrum availability information, which is obtained via the SDM. The base stations can be dynamically configured with any change in spectrum availability. For example, as shown in FIG. 13 for the purpose of illustration and not limitation, the base station in location 1 has a transceiver using the 580-600 MHz channel and is subscribed to spectrum changes for its location to the SDM spectrum database. When the 640-660 MHz channel becomes temporally unavailable, a spectrum change event is delivered to the base station, which configures the new channel with UE's PCF thereby opening both channels for simultaneous communications.

In accordance with the disclosed subject matter, the decoupling of network, link and physical layers can be performed with the corresponding control functions. The control middleware manages individual controllers, which communicate with corresponding network elements for each control function, i.e., the mobility manager for NCF, the network information manager for LCF, and the spectrum database manager for PCF. The network elements can be deployed on physically independent servers or individual server processes on a single physical machine. They can also be implemented and deployed in a distributed manner; for example, the mobility manager can be a distributed cluster based system that handles UEs based upon their geographic location.

In accordance with the disclose subject matter, in one embodiment, a UE can work even if the network elements are not present. In this case, the UE works independently in an opportunistic mode. Also, the control functions are independent of each other, such that presence of one does not affect the functionality of others. The Network Control Function can provide, for example, routing table control, mobility, multi-homing, multipath and identity to a UE. The Link Control Function can manage mac-address table and lookup table control, handover optimization, provides network interface information, link status (up/down), link control (on/off/standby), link performance information, network packet lookup, network to device discovery and authentication, and control for virtual interface configuration. The Physical Control Function can manage spectrum channel configuration (link technology specific). The Control Middleware manages all the active flows along with NCF, LCF and PCF controllers, and enables separation of data and control paths.

Figure 14:
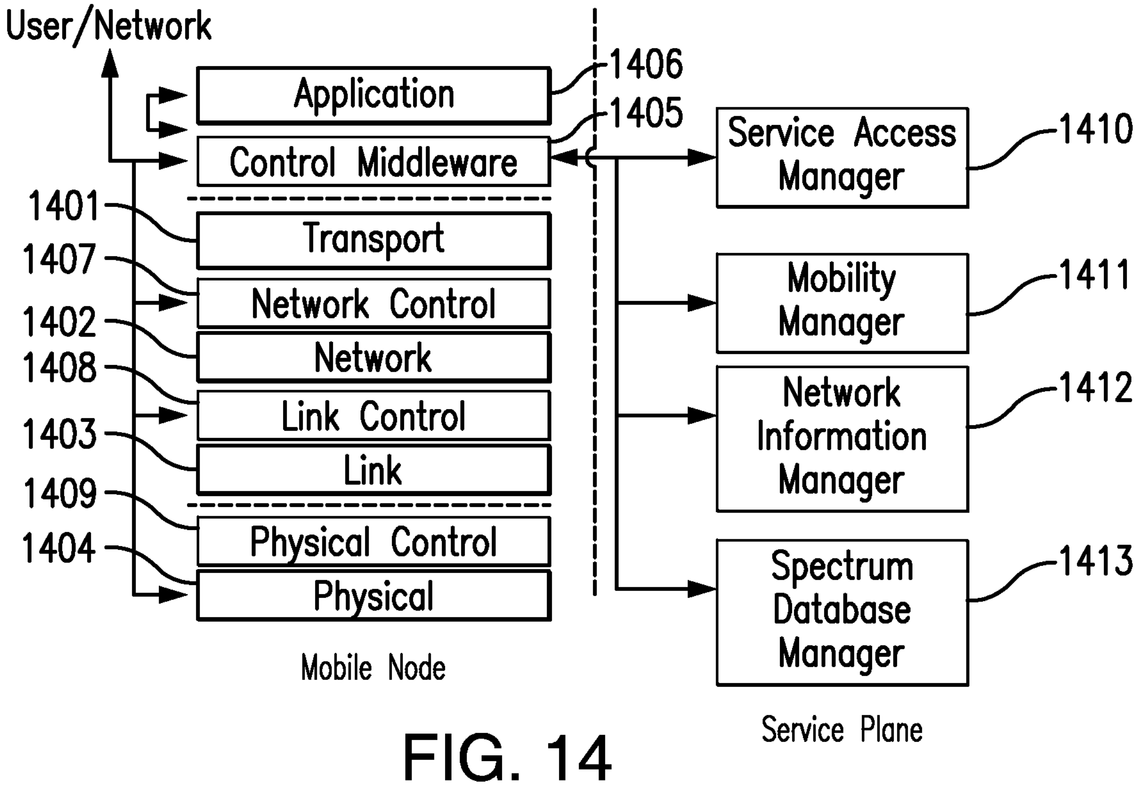
FIG. 14 is a diagram illustrating an example networking stack in accordance with one aspect of the disclosed subject matter.

For the purpose of illustration and not limitation, FIG. 14 shows the complete networking stack along with network elements in accordance with the disclosed subject matter. The control middleware can take inputs (e.g. policies) from users via GUI, applications via APIs, and service provider via service access manager (SAM).

Figure 15:
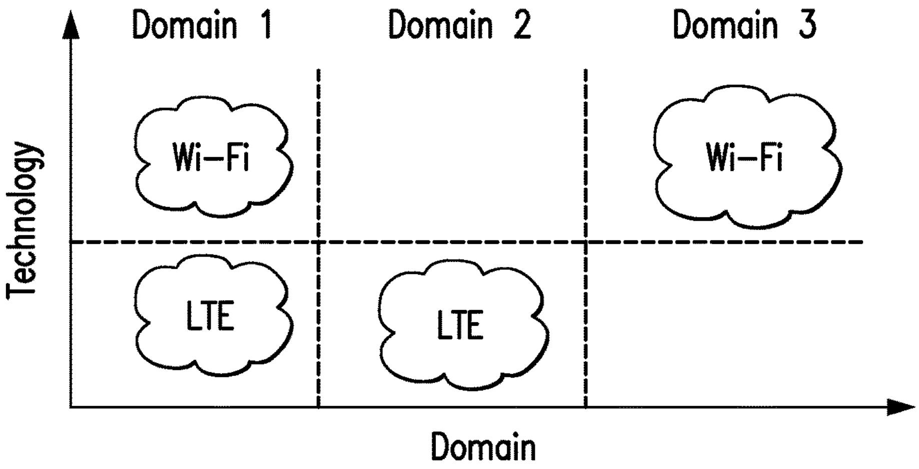
FIG. 15 is a diagram illustrating various service domains in accordance with one aspect of the disclosed subject matter.

In accordance with one aspect of the disclosed subject matter, a service domain is defined as an infrastructure provider, which provides network access using a single technology (e.g., LTE, WiMAX, or Wi-Fi) or multiple technologies (e.g., LTE and Wi-Fi). A UE can have inter-technology mobility within a domain or inter-domain. Inter-domain mobility can also be within same technology. For the purpose of illustration and not limitation, FIG. 15 shows the domain and technology along two axis having three different domains, i.e., domain 1 provides LTE and Wi-Fi access, domain 2 provides LTE access, and domain 3 provides Wi-Fi access.

In one embodiment, the network elements of the disclosed subject matter, e.g., as shown in FIG. 14, can be used to create a modular Internet Service Provider (ISP) architecture. The disclosed subject matter can decouple the present physical network infrastructure into two logical planes, i.e., service and infrastructure. The service-plane can be focused on network services and can be responsible for performing access control of all UEs, mobility, and controlling UEs access across heterogeneous service domains. The service-plane can contain all the network elements of the proposed architecture (i.e. SAM 1410, MM 1411, NIM 1412 and SDM 1413). The SAM controls and manages the network access, the MM handles mobility, the NIM provides additional network information for handover decisions, and the SDM manages location-based spectrum availability and provides spectrum configuration to UEs.

Figure 16:
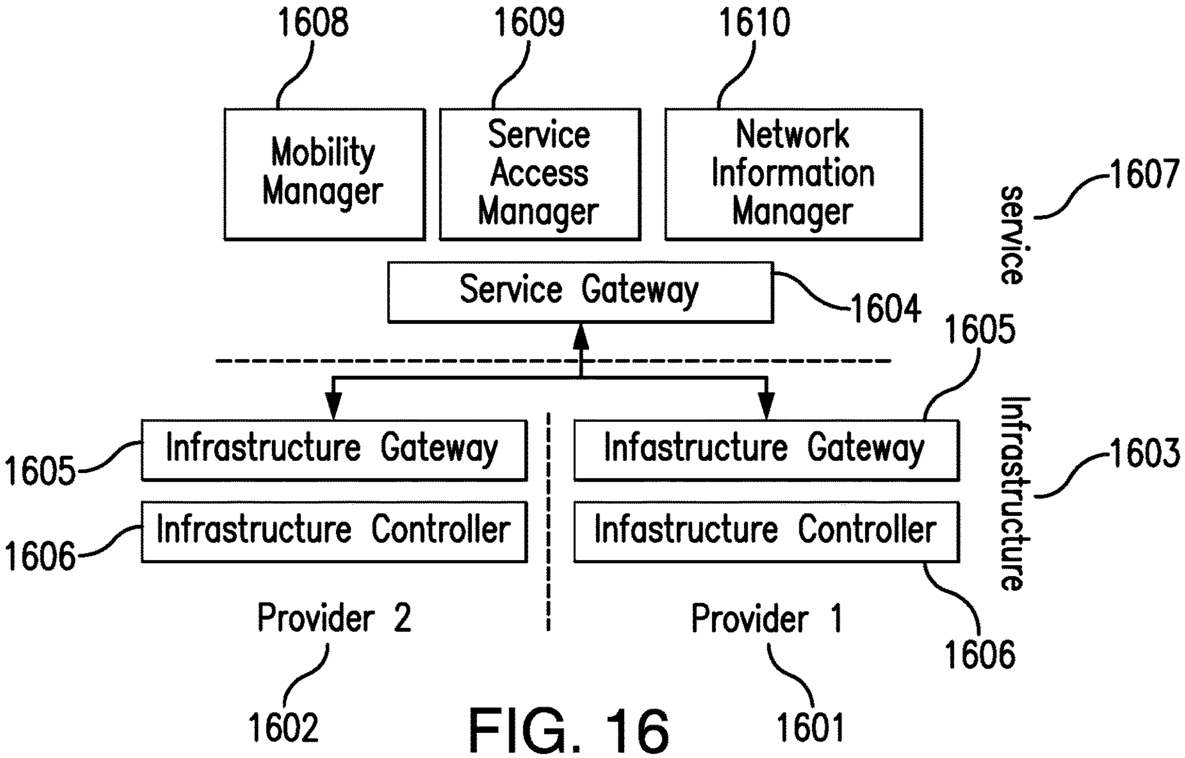
FIG. 16 is a diagram illustrating an example service and infrastructure plane of an ISP with multiple infrastructure providers in accordance with one aspect of the disclosed subject matter.

For the purpose of illustration and not limitation, FIG. 16 shows the service and infrastructure plane of an ISP with multiple infrastructure providers (i.e., Provider 1 1601 and Provider 2 1602). The infrastructure plane 1603 focuses on the physical network infrastructure. In this manner, the service providers can be decoupled from the physical infrastructure providers enabling service providers to offer services across multiple infrastructure providers resulting in a more scalable network service. Also, multiple service providers can share the same physical infrastructure resources using, in one embodiment, software defined network (SDN) mechanisms, which can build computer networks by decoupling the control plane from the data plane to configure and manage networks on demand. The service and infrastructure plane can communicate with each other using Service Gateway 1604 and Infrastructure Gateway 1605 components coupled to the Infrastructure controller 1606. The gateways can decouple the control and data plane of the ISP management functionality. This decoupling can allow the service plane 1607 (including the MM 1608, SAM 1609, and NIM 1610) to be physically anywhere, e.g., within infrastructure (e.g., ISPs) or in a remote data center (e.g., the cloud).

In accordance with one aspect of the disclosed subject matter, the Context aware Control Middleware (CCM) provides a policy based modular decision making system, which can complement or supplement an existing flow with possible parallel connections to improve user experience, performance and reliability. The CCM can control the active flows on multiple access technology interfaces (e.g., LTE, Wi-Fi, and WiMAX) for multi-homing and multipath support, performs terminal and network mobility decisions, enables application and device resource sharing, provides session mobility and disruption tolerance support, and manages discovery of networks, devices, and available physical spectrum channels. The CCM can hide all the network complexities from applications without changing any existing programming paradigms. The CCM can perform dynamic selection of transport, network, and link protocols based upon policies and application requirements resulting in more granular control of networking resources.

Figure 17:
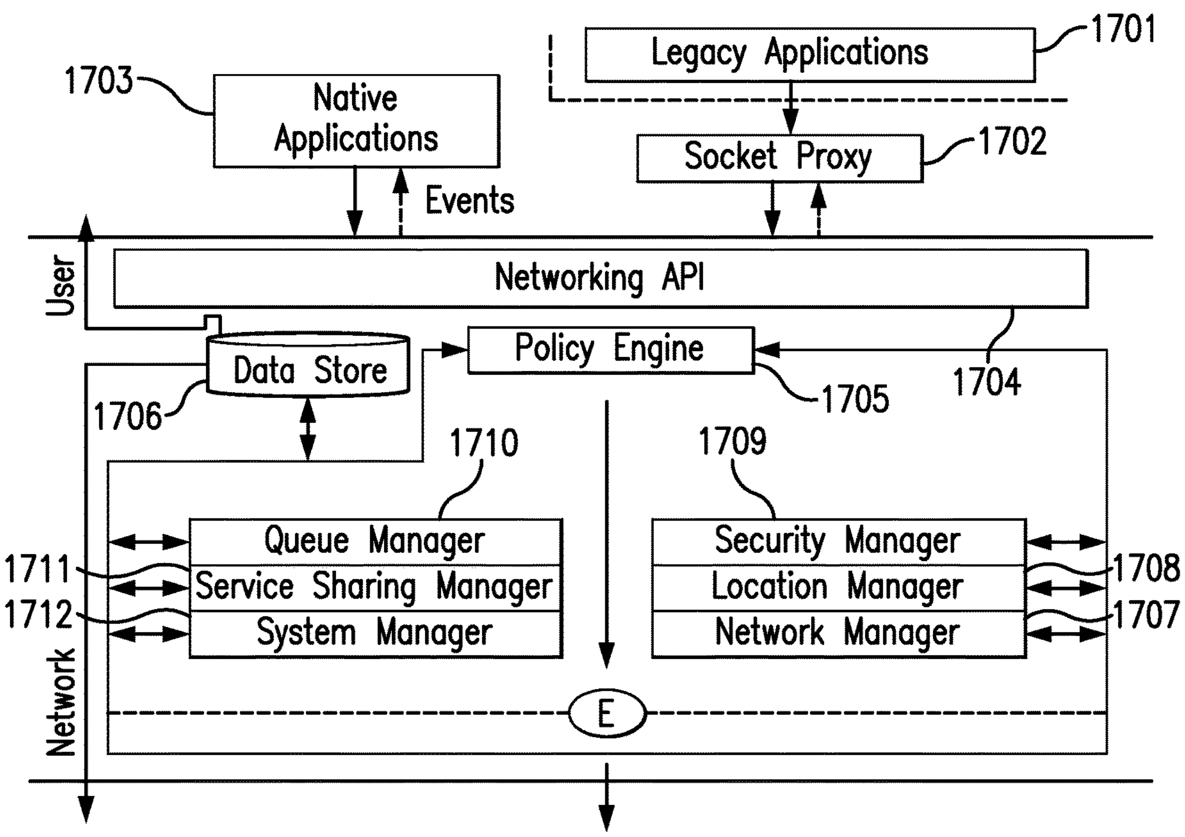
FIG. 17 is a diagram illustrating example control middleware in accordance with one aspect of the disclosed subject matter.

For the purpose of illustration and not limitation, FIG. 17 shows the middleware. The CCM can be independent of any transport, network, and link layer protocols. The CCM can also support both legacy 1701 (i.e., applications that are not modified and use the default BSD sockets 1702 API for networking) and native 1703 (i.e., applications that use the networking APIs 1704 with additional functionalities provided by the proposed redesigned networking stack) applications. Based upon the different inputs from managers and policies, the policy engine 1705 makes a decision about adding and/or deleting network interfaces for an active flow. The managers can be designed for performing independent tasks. The various managers of the middleware are shown in FIG. 17 and can include the data store 1706, network manager 1707, location manager 1708, security manager 1709, queue manager 1710, service sharing manager 1711, system manager 1712, and policy engine 1705.

The data store 1706 can manage the storage functionality for each module. The Network Manager 1707 can maintain and monitor active network interfaces and perform the actions of Policy Engine 1705. The Location Manager 1708 can manage the location of the device. For example, users can specify a particular location as home or office based upon GPS coordinates or Indoor Positioning Systems. The Security Manager 1709 can manage network access security (e.g., authentication across heterogeneous networks). The Queue Manager 1710 can enable disruption tolerance support for applications when there is no network connectivity or a policy enforces no network usage. The Service Sharing Manager 1711 can enable service sharing and session mobility between multiple devices and can store the device data locally for future use, as described in more detail below. The System Manager 1712 can manage system parameters like CPU, bandwidth, battery usages, and the like for each active application session, as described in more detail below. The Policy Engine can maintain the mapping for all active socket connections (i.e., flows) corresponding to each application and can perform flow control decisions based upon the inputs from other managers.

In some embodiments, the middleware can be extended with other modules including but not limited to a sensor manager, which can manage all sensors, e.g., accelerometer, magnetometer, and the like, of the device that can impact the packet flow control. For example, the sensor manager can signal if the user is moving fast so that if so, a UE can optimize the handoff delay by overriding all policies to use an LTE interface, because Wi-Fi will perform several hand-offs as the UE is moving fast, which can degrade the communication.

Figure 18:
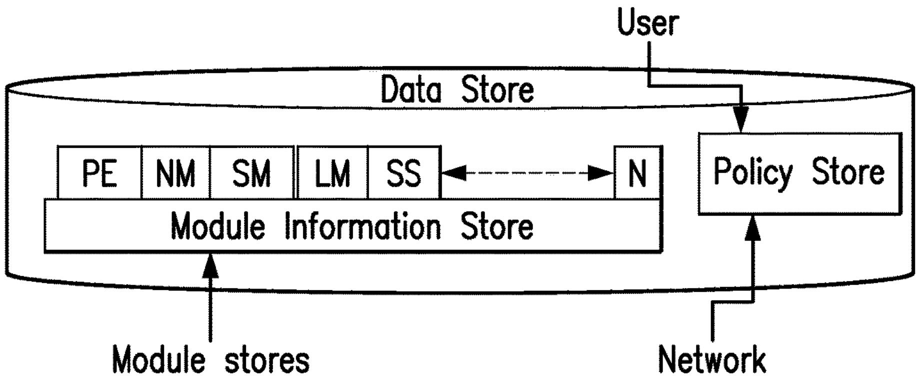
FIG. 18 is a diagram illustrating an example data store in accordance with one aspect of the disclosed subject matter.

In accordance with one aspect of the disclosed subject matter, the data store (DS) module stores the user, network, and application policies for the system and for each installed application in the policy store. The DS can also provide module specific storage to each module in the control middleware, as described in more detail below. For the purpose of illustration and not limitation, FIG. 18 illustrates the DS semantics. As shown in the figure, the data store can include a policy store and module stores. The policy store can perform policy specific storage operations. The module information store can be responsible for module specific operations.

Figure 19:
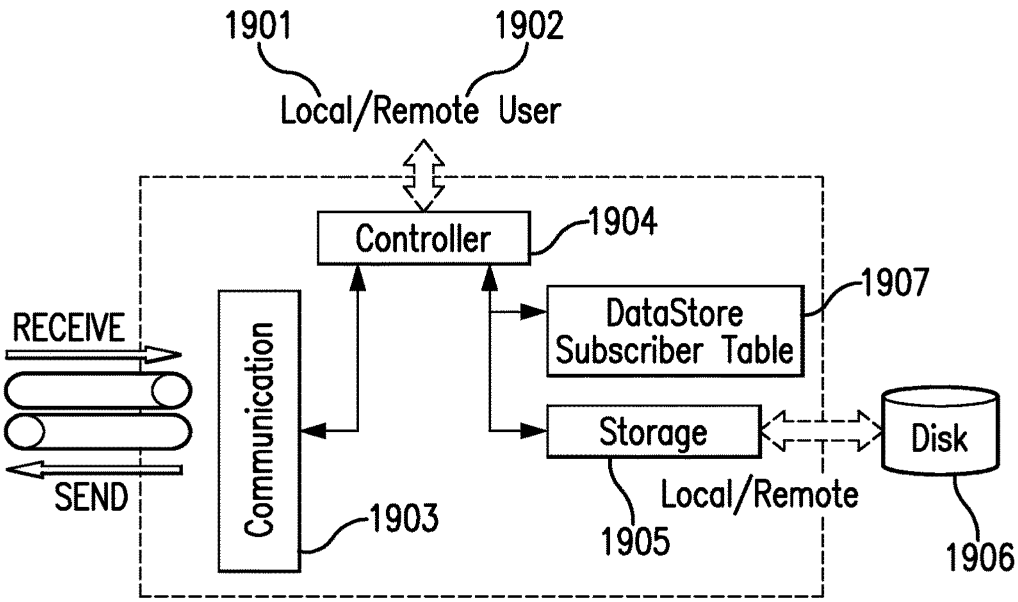
FIG. 19 is a diagram illustrating example sub-modules of the data store in accordance with one aspect of the disclosed subject matter.

For the purpose of illustration and not limitation, FIG. 19 shows the sub-modules of the DS. The DS can be connected to local (e.g., human and applications) 1901 and remote (e.g., service provider) users 1902. The communication sub-module 1903 can send and receive events, and can listen for events on the receive channel. Any new request event can be passed onto the controller 1904, which can make a decision whether to process the request or not (e.g., based on user and module privileges). The controller can then direct the request to the storage sub-module 1905, which can perform any one of the Create, Read, Update, or Delete (CRUD) operations on the respective module store 1906. The DS can include a DataStore Subscriber Table 1907.

Figure 61:
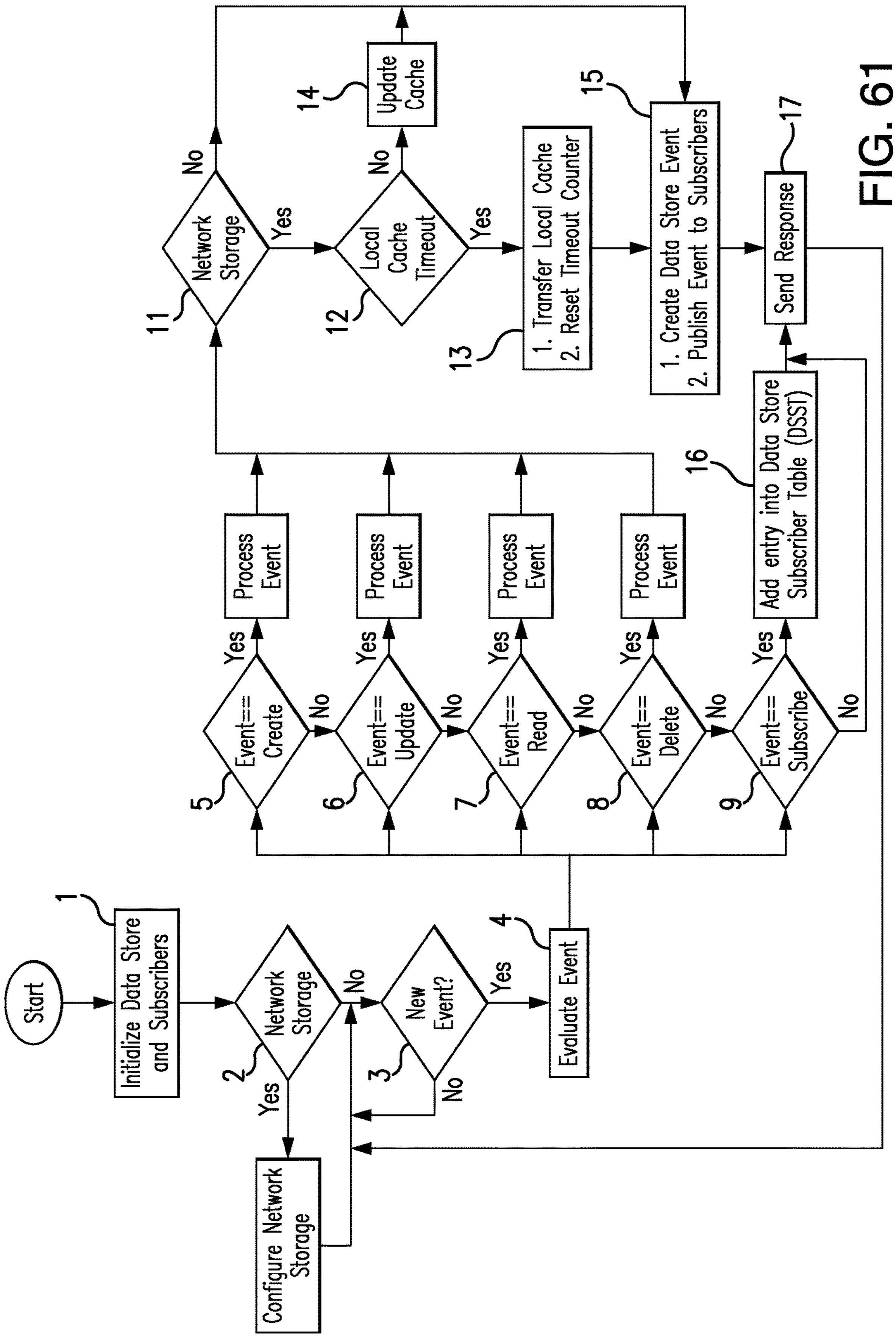
FIG. 61 is a flow chart illustrating exemplary operation of the data store.

For the purpose of illustration and not limitation, FIG. 61 is an exemplary flow chart of the operation of the DS. The DS can be initialized with the local configuration and all the subscribers of the data store events 6101. The controller can be checked for the network storage configuration and if present, network storage can be connected 6102. The controller can start listening to storage events 6103. Once an event occurs, it can be evaluated 6104. The events can be evaluated for one or more of Create 6105, Update 6106, Read 6107, Delete 6108 and Subscribe 6109 events. After event determination, the events can be processed by the controller 6110. If network storage is configured 6111, the controller can maintain a local in-memory data-cache and can maintain a timeout timer for flushing the data into the network 6112. The controller can check for timer timeout and if within limits, the data event can be processed locally 6114. If the timer exceeds the limit, the cache data can be flushed out with the data event processing and timer can be reset 6113. The controller can create a data attribute change event and can publish it to all subscribers 6115. If the event is subscribe, the controller can store the subscriber in the Data Store Subscriber Table 6116. Finally, the controller can send a response to the event source 6117 and can return to listening for new events.

Figure 20:
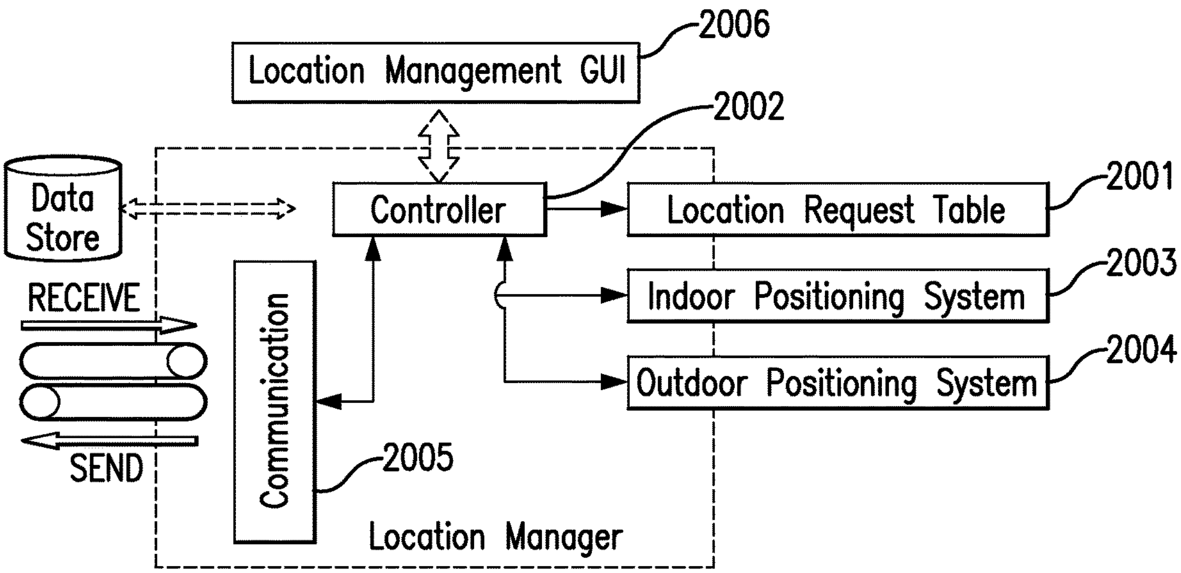
FIG. 20 is a diagram illustrating an example location manager in accordance with one aspect of the disclosed subject matter.

In accordance with one aspect of the disclosed subject matter, the location manager (LM) monitors the location of the UE and example LM components are shown in FIG. 20 for the purpose of illustration and not limitation. The LM can provide three exemplary services: (1) storing location requests (e.g. persistent or non-persistent) using a Location Request Table (LRT) 2001, (2) notifying subscribers when the device reaches the requested location via controller 2002, and (3) providing current location of the device. The policy engine can use the LM's persistent storage to request location tracking for user's home, office or any pre-defined environment. Whenever a user arrives within the proximity of a requested location, the policy engine can be notified with the attribute change event parameters. In an exemplary embodiment, the LM can leverage two different positioning systems based upon the device's location including the Indoor Positioning System (IPS) 2003, which can be Wi-Fi based (or can use the earth's magnetic field variations to position mobile devices inside buildings), and/or an outdoor positioning system (OPS) 2004 and communicate with other CCM managers via the communication block 2005. The LM can use GPS (in the U.S.)/GLONASS (in Russia)/Galileo (in Europe) based upon the device configuration. The location management GUI 2006 can be used to configure device location names and users can name the location coordinates.

Figure 62:
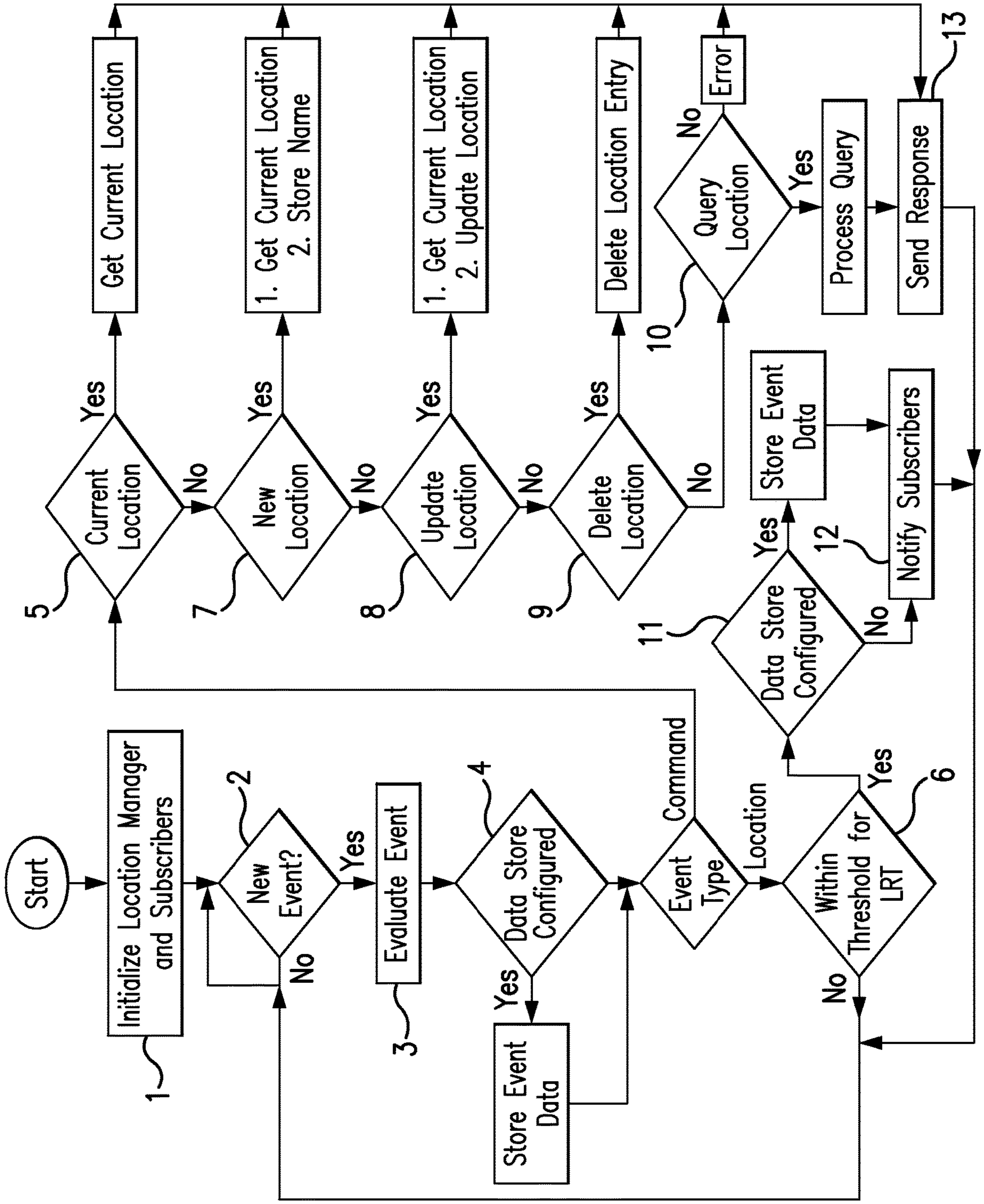
FIG. 62 is a flow chart illustrating exemplary operation of the location manager.

For the purpose of illustration and not limitation, FIG. 62 is an exemplary flow chart of the operation of the location manager. The location manager can be initialized and its subscribers can be notified 6201. The controller can start listening for new events 6202. If a new event occurs, the event can be evaluated 6203. The controller can check if the data store is configured, and if present, the event data can be stored 6204. After event evaluation, the controller can check for location commands, e.g., current location 6205, new location setup 6207, Update location 6208, Delete location 6209 and Query location 6210. The controller can process the commands and can send a response to the policy engine 6213. The controller can constantly monitor location 6206, and if the location is within the threshold, the location event can be stored 6211, and subscribers can be notified 6212.

Figure 21:
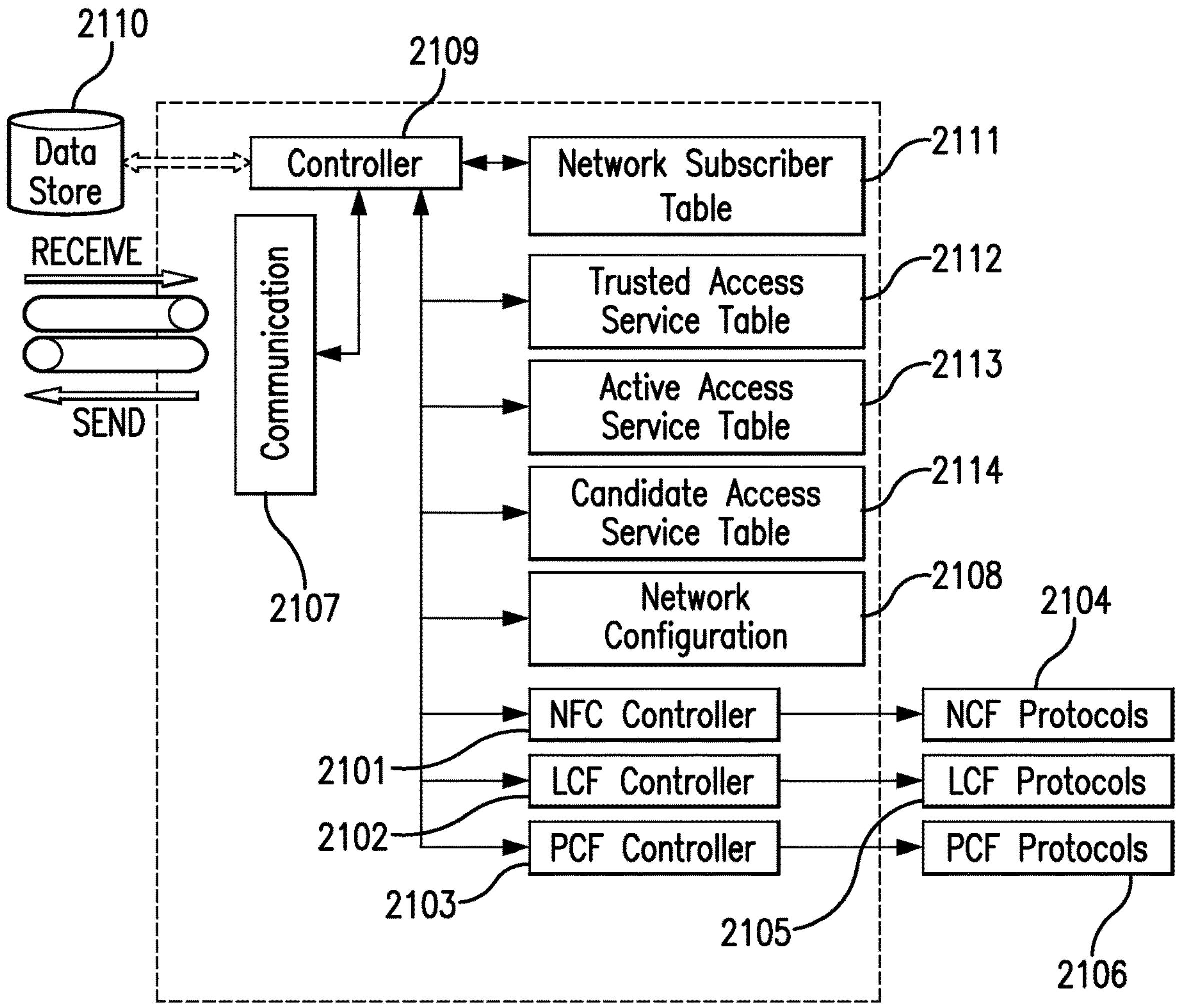
FIG. 21 is a diagram illustrating an example network manager in accordance with one aspect of the disclosed subject matter.

In accordance with one aspect of the disclosed subject matter, example network manager (NM) components are shown in FIG. 21 for the purpose of illustration and not limitation. The NM can control the controllers (2101, 2102, and 2103) of the network, link and physical control function protocols (2104, 2105, and 2106, respectively). In addition to interface control, the NM can provide four kinds of services in the CCM: (1) providing network information (2) monitoring nearby active networks via communication block 2107, (3) providing network configuration 2108 for acquiring IP address, and (4) alerting subscription whenever a particular network is nearby via controller 2109. The policy engine can use all four services. The NM can maintain the network information about the selected networks and nearby networks in the module information store of the DS 2110. This can assist in future network selection optimizations. For example, the NM can store the selected networks with corresponding locations to create a geo-map of a user's daily trip to a work place using data mining techniques and can optimize the network selection based upon the user's predictive path. The Network Subscriber Table (NST) 2111 can store the NM subscribers.

The NM module can maintain and constantly monitor network interfaces via the LCF. For example, the NM can maintain a Trusted Access Service (TAS) table 2112, which can be dynamically updated by the service provider or user. The TAS can store access service information, e.g., id, authentication procedure, device type, credentials, cost, bandwidth, and access history. The NM can also maintain two additional tables, i.e., Active Access Service (AAS) 2113 and Candidate Access Service (CAS) 2114. The AAS table can maintain a list of currently connected access services. The CAS table can maintain the available list of trusted access services.

In accordance with one aspect of the disclosed subject matter, a network information service is provided using local information (e.g., real-time) and/or by using network based information manager via the LCF. A network configuration service can provide network access, e.g., once the network interface is up, a DHCP request is sent to acquire an IP address for network access. The NCF controller can control the network control function protocols and can configure static flow identifiers and relays handover decisions to NCF protocols. The LCF controller can control link control function protocols, including but not limited to relaying link status (up or down), link control (on, off, or standby), link performance information, and virtual interface (i.e., when a single physical network interface is used to connect to multiple networks simultaneously) configuration. The PCF controller can control physical control function protocols, which are used to configure the optimal spectrum channel (e.g., technology specific). Also, for device security reasons, the PCF cannot directly expose control functions. It can use interface specific LCF APIs for controlling physical layer.

For the purpose of illustration and not limitation, FIG. 63 is an exemplary flow chart of the operation of the network manager. The network manager can be initialized and the subscribers can be notified 6301. The controller can wait for new events 6302. If a new event occurs, the event can be evaluated 6303. If the data store is configured, the event data can be stored for future use 6304. The controller can evaluate the event type, e.g., LCF 6305, PCF 6309, NCF 6310, network configuration 6312, network subscribe 6315 and add network 6316. The network discovery can return the nearby networks from LCF 6306. The network information request can return the network information of the requested network 6307. The new network information can update the candidate service access table 6208. The interface configuration 6318 can configure the physical radios parameters. The handover 6311 can result in a mobile handover; the controller can update the active access service table and trusted access service table, if the network data was not present. After updating local tables, the controller can send handover signal to respective NCF protocols. The network configuration can first check whether the user is authorized, and if yes, the network can be configured 6313. For network subscription 6315, the controller can create an entry in the network subscribe table (NST) 6314. For add network 6316, the network can be added into the trusted network table. The subscribers can be notified about the event processing result 6317.

Figure 22:
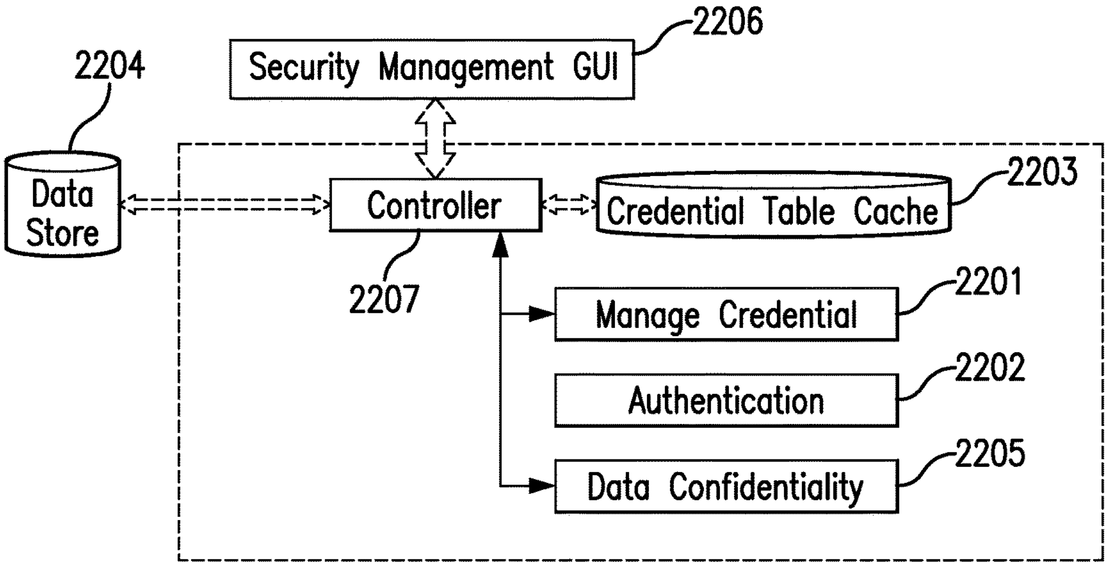
FIG. 22 is a diagram illustrating an example security manager in accordance with one aspect of the disclosed subject matter.

In accordance with one aspect of the disclosed subject matter, the Security Manager (SM) provides the following security operations: credential management, control of network and device access, and secure end-to-end communications. For the purpose of illustration and not limitation, FIG. 22 shows the example security manager components. For credential management 2201, the SM can manage credentials for different networks. For Network Access, the SM can be responsible for authentication 2202 of mobile node to infrastructure provider and for authorization of network access from the service provider. For Device Access, the SM can store a table of trusted devices 2203 and is responsible for authentication and authorization between the devices. The SM can release the credentials to the Network Manager, which can be required for establishing a secure connection. For end-to-end communication, the SM can provide data confidentiality 2205 by enabling secure end-to-end communication with NCF protocol parameters. The security management GUI 2206 can be used to configure network access credentials in cases when the credentials are under the control of the user.

The SM can manage network and device access credentials. The credentials can also be stored in the SM module information store or in the Subscribers Identification Module (SIM) application within the Universal Integrated Circuit Card (UICC). The SM information store can include the following information: (1) type of credential (e.g., certificate, pre-shared key or login/password), (2) usage of the credential (e.g., HIP protocol, network access), (3) additional information (e.g., name and type of the network the credentials give access to) and (4) credentials. The data store 2204 storage can be device dependent such that to provide device independent storage, service providers can provide a network based data store.

Figure 64:
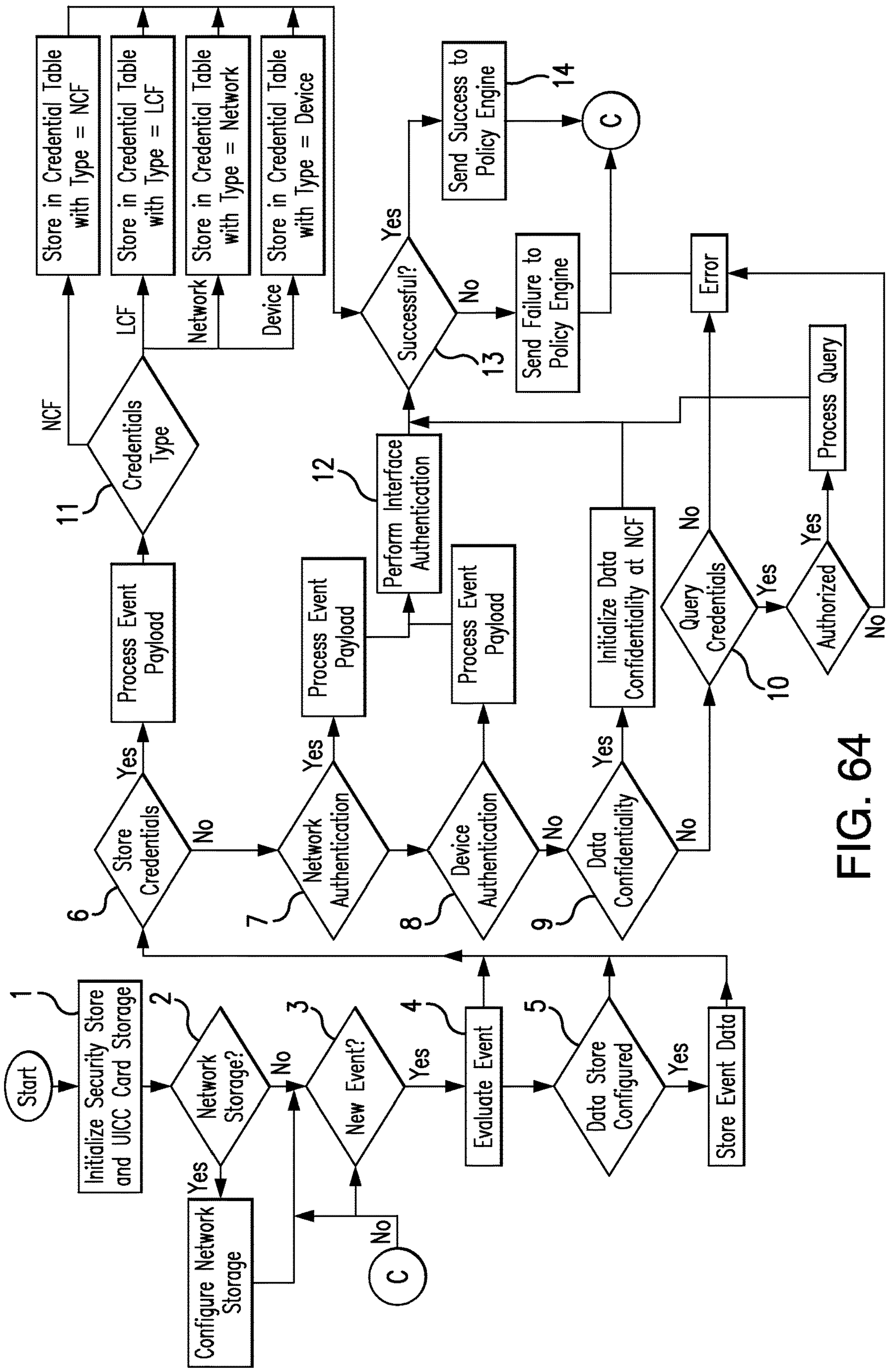
FIG. 64 is a flow chart illustrating exemplary operation of the security manager.

For the purpose of illustration and not limitation, FIG. 64 is an exemplary flow chart of the operation of the SM. The security manager can be initialized with local and UICC storage 6401. The network storage configuration can be checked 6402, and if present, the network storage can be connected. The controller 2207 waits for new events 6403. If a new event occurs, the event can be evaluated 6404. If local data stored is configured 6405, the event data can be stored. The controller can perform different functions based upon event types, e.g., store credentials 6406, network authentication 6407, device authentication 6408, data confidentiality 6409 and network credentials query for authorized users 6410. The credential type can be evaluated 6411 and can be stored for each type of credential. The controller can perform network/device authentication 6412 and can return a result to the policy engine 6414. For data confidentiality, the controller can set the NCF configuration to enable encryption for the data path of the current flow. Authorized users can query for stored credentials 6410. For all events, the controller can return notification to the policy engine 6414.

Figure 23:
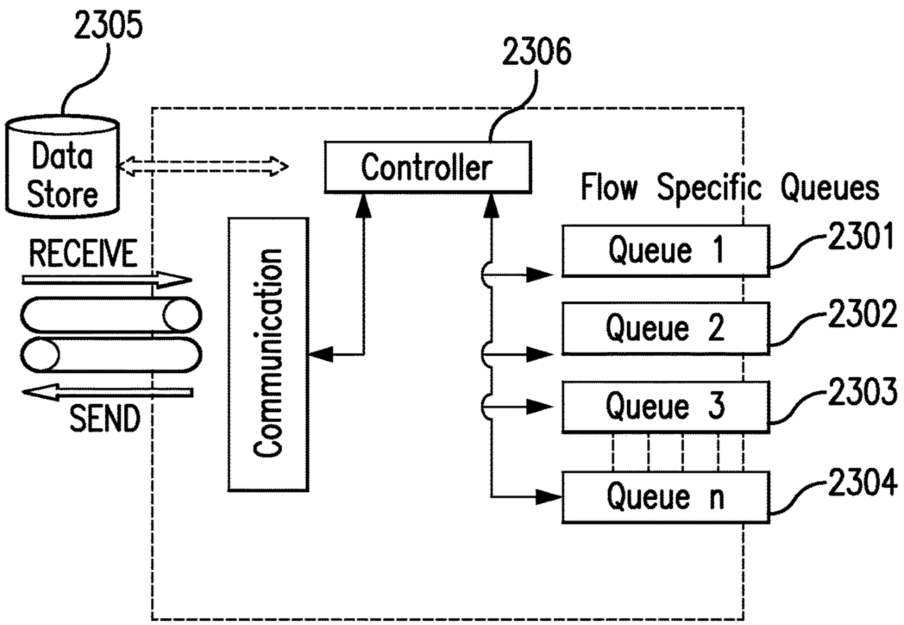
FIG. 23 is a diagram illustrating an example queue manager in accordance with one aspect of the disclosed subject matter.

In accordance with one aspect of the disclosed subject matter, the queue manager (QM) module is used for managing flow specific packet storage. For the purpose of illustration and not limitation, FIG. 23 shows example QM components. The QM can manage data flow specific message queues 2301, 2302, 2303, and 2304, and can provide two services in the middleware: (1) packet storage via data store 2305 and (2) queue overflow alert via controller 2306 and communication block 2307. Users can also set application or flow priorities for the queues. For example, HTTP traffic can be given greater priority than Bit-Torrent traffic.

If there are no active interfaces for application data transfer, the policy engine can either inform the application about the lack of network availability or store the data packets in the QM. The policy engine can request a new queue for each flow, and after successful creation of queue, the QM can return a queue-id that is stored in the Active Flow Table (AFT), which is maintained by the policy engine as discussed in more detail below. Whenever a new interface event is delivered to the policy engine, corresponding queues can be checked for possible network transmission.

The flow specific queue can reach its storage limit for the data transfer, e.g., in a large file transfer, which results in a queue overflow. The QM can alert the policy engine about the queue overflow, which in turn can alert the application if the event channel is configured.

Figure 65:
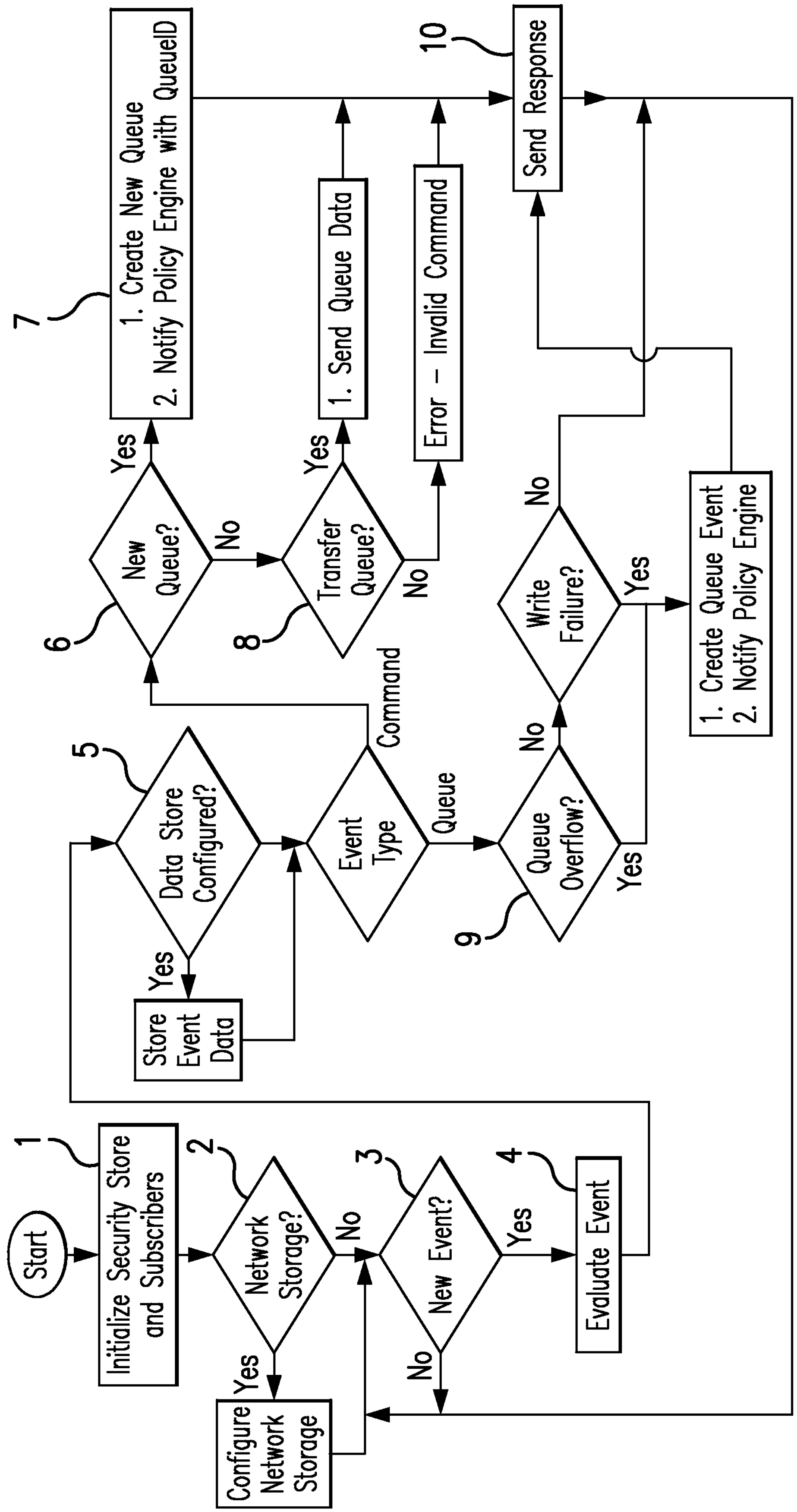
FIG. 65 is a flow chart illustrating exemplary operation of the queue manager.

For the purpose of illustration and not limitation, FIG. 65 is an exemplary flow chart of the operation of the queue manager. The queue manager can initialize the data store and subscribers 6501. If network storage is configured, the controller can create a new connection with the network storage server 6502. The controller can wait for new events 6503. If a new event occurs it can be evaluated 6504. The controller can check for local data store configuration, and if present, local events can be stored 6505. The event type can be evaluated, e.g., New Queue 6506 can create a new queue and can return the queue id to the policy engine 6507. For Transfer Queue 6508, the data can be flushed out of the queue into the network. If there is a queue overflow 6509 error, the policy engine can be notified. The controller can also notify the policy engine when there are write failures.

Figure 24:
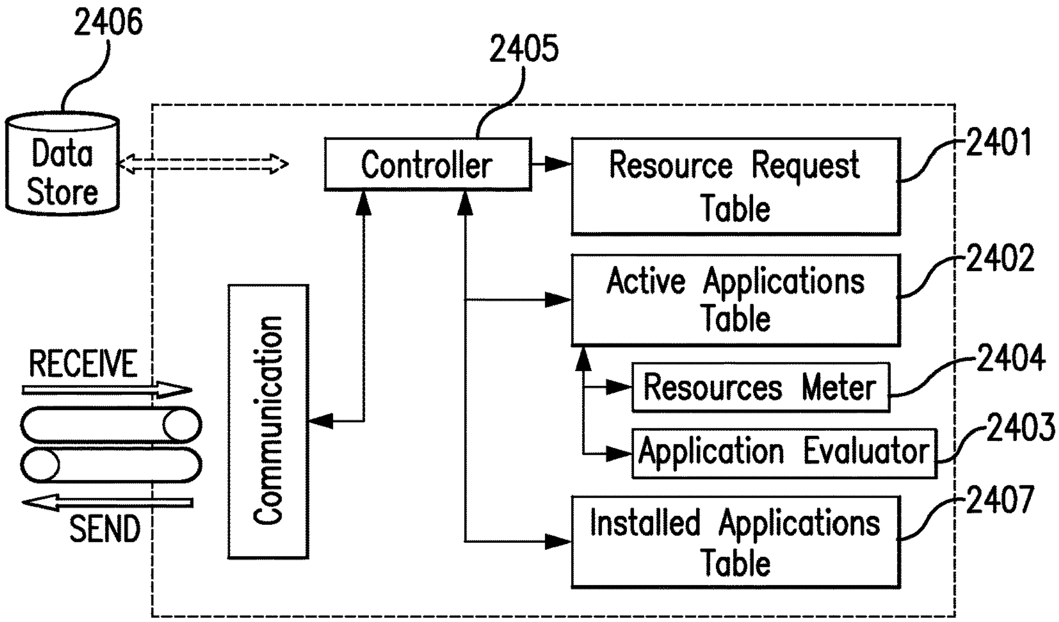
FIG. 24 is a diagram illustrating an example system manager in accordance with one aspect of the disclosed subject matter.

In accordance with one aspect of the disclosed subject matter, the System Manager (SysM) module in the control middleware is responsible for application resource monitoring and application management services in a local environment. For the purpose of illustration and not limitation, FIG. 24 shows example components of a system manager. The resource request table 2401 can store a request for any installed application. When a request is fulfilled, the SysM can notify the subscriber about the resource fulfillment. For example, a user can set the bandwidth limit for an application 1 to be 100 MB, and the policy engine can request the SysM to notify the user when application 1 reaches that limit. The Active Application Table (AAT) 2402 can maintain all active running applications' information. The application evaluator 2403 can monitor the application's call graph (i.e., a directed graph that represents calling relationships between subroutines in a computer program) for resource optimizations. For example, in a modular application, one particular module can be consuming 80% of the CPU, and to improve resource utilization, the system manager can offload this module execution into a connected cloud. The resource meter 2404 can monitor the application CPU, memory, storage, battery, bandwidth usage, and the like. The controller 2405 can store this information in the data store 2406 for making future application offload decisions. The Installed Application Table (IAT) 2407 can maintain information about all the installed application on the respective device.

Figure 66:
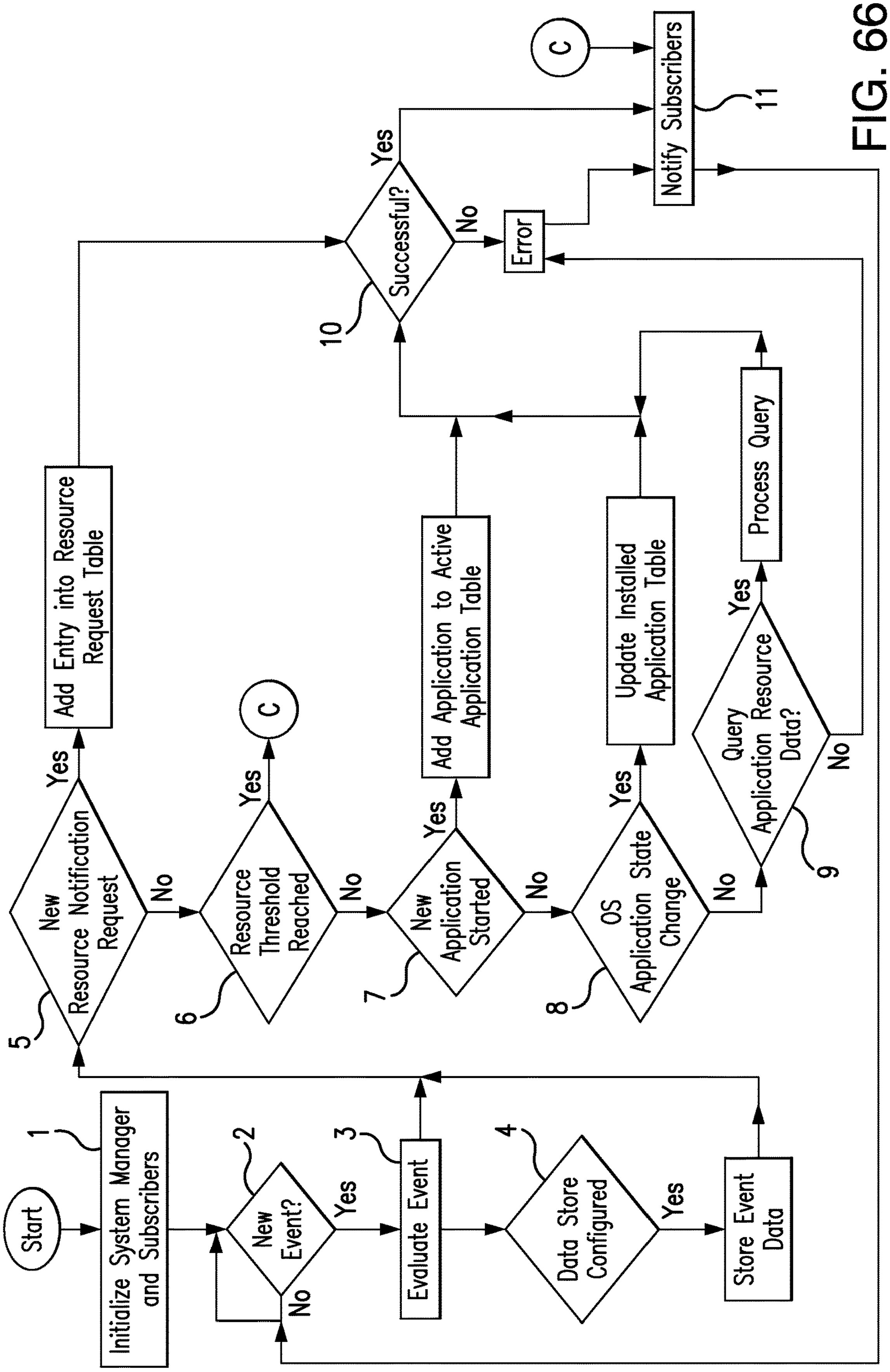
FIG. 66 is a flow chart illustrating exemplary operation of the system manager.

For the purpose of illustration and not limitation, FIG. 66 is an exemplary flow chart of the operation of the system manager. The System Manager can initialize the module and the subscribers 6601. The controller can wait for new events 6602. If a new event occurs, it can be evaluated 6603. The controller can check for local data store, and if present, the event can be stored 6604. The controller can check for events types and can execute the commands accordingly. The new resource request notification request 6605 can add an entry in the resource request table. The resource threshold reached event 6606 can notify the subscribers of the resource. When a new application is started 6607, the system manager can start monitoring the application and can add an entry into active application table. When there is a change in the application state 6608, e.g. installed/uninstalled/moved, the controller can update the installed application table. The controller can also accept application resource query 6609 for a particular application or for all application. The controller can send notification to subscribers after processing each event 6610.

In accordance with one exemplary embodiment of the disclosed subject matter, the modules required for the CCM comprise a Policy Engine (PE), Security Manager, Location Manager, Network Manager and Data Store. The policy engine can take inputs from these managers in the CCM. Based upon the inputs and the policies, the PE can make a decision about adding and/or deleting network interfaces to an active flow or creating a new flow.

The PE can maintain the mapping for all active connections. For example, the PE can maintain two tables, the Active Flow Table (AFT) and the Policy Table (PT). The AFT can maintain each new flow, including a socket descriptor, application id, active interfaces, source & destination flow identifiers, current policy id, queue id, and unidirectional event channel pointer. The event channel can support only single direction of communication (i.e., middleware to application) due to security reasons; The CCM can unicast or broadcast events using this event channel. The PT can maintain all the policies associated with each application and global system policies. Maintaining connection information can help the middleware to optimize application policy selection. The control middleware can provide two high-level services: (1) create, read, update, and/or delete (CRUD) for connection records and (2) query connection records based upon record parameters including application id, interface type, and the like. Whenever there is an attribute change event (i.e., whenever there is a change in the value of the attribute), it can be passed on to the policy engine for further processing via an event object that contains the old and new attribute values and the source module information from any control middleware module. For example, addition or removal of interfaces and a change in the location of UE are attribute change events and the policy engine is notified, which updates the corresponding mappings in the connection records of CM.

Figure 25:
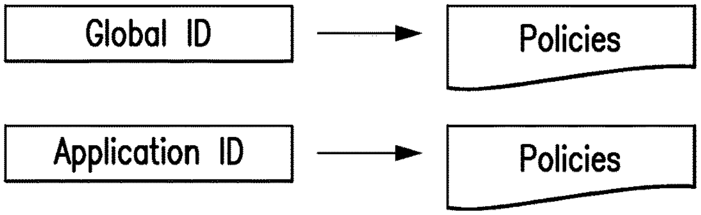
FIG. 25 is a diagram illustrating an example global ID and application ID in accordance with one aspect of the disclosed subject matter.

In accordance with one aspect of the disclosed subject matter, a policy includes a list of conditions and the corresponding action to be taken. Each condition can be a binary operation, which evaluates to either true or false. An action for a corresponding policy is taken only when all the conditions are satisfied, i.e. evaluated to true. The policies can be generated locally on the UE by the user, installed applications, or remotely by the service provider. A policy management tool can display the attributes that can change the behavior of the data flow (e.g., different modules of the middleware). Polices can be defined for each application or for the global network access with different priorities. Polices that are defined for each application can be identified by an application-id. There can be one unique global ID corresponding to all the global policies. In one embodiment, the IDs can be stored in a lookup table where the global ID is a constant, known in the control middleware, and individual application IDs are generated when applications are installed on the UE, as shown in FIG. 25 for the purpose of illustration and not limitation.

In accordance with one aspect of the disclosed subject matter, the application-id can be one of two types: application path based and or application dependent. Application path based application-ids can be based upon the application installation path, which is unique for every application, and the application is identified by a locally generated ID that maps to the unique path. When the application opens a communication socket, the application path can be checked and corresponding policies can be fetched and loaded. Application dependent application-ids are dependent upon the installation type. The application-ids can be Universally Unique Identifiers (UUID) or unique application URIs mapped to UUIDs by the operating system. Applications can supply the application-id to the control middleware for each socket call. In one embodiment, the global and application id namespace is required to be unique in each UE.

In accordance with one aspect of the disclosed subject matter, policies are stored locally in the policy store (i.e., in a sub-module of data store). Alternatively or additionally, the policies can be stored remotely by the service provider (e.g., network access policies), which can be downloaded into the UE's policy store repository. For example, a service provider's default network access policies can include that the phone application will always use LTE and/or when the user is at home, web browsing application uses Wi-Fi. These policies can be made read only so that users cannot change them. The reading permission can be denied, if the service provider wants to hide the network access policies.

Any change to policy repository triggers an event and the policy engine (PE) can be notified about the change. The policy repository can provide subscription functionality, i.e., the PE can subscribe to only active application-ids, and any change in only these application policies is notified to the PE.

In accordance with one aspect of the disclosed subject matter, each installed application in a UE has an associated application ID. The application can open a socket and pass this application ID as one of the socket parameters. This ID can be used to query the policy data store and fetch the corresponding policies associated with the application.

The policies can be evaluated using the current attribute values of the system, e.g. active network interfaces, network bandwidth, bandwidth cost, current location and system resources, such as CPU, memory, battery power, bandwidth usage and the like. The policy that evaluates to true and has the highest evaluated score is selected and the corresponding action is performed.

There can be two possible actions as the result of a policy. First, network interfaces to be used for creating a new flow or updating an existing flow with new interfaces are available, i.e. deleting and/or adding. Second, no suitable network interfaces are available (e.g., due to policy or no coverage), and data is stored in Queue Manager temporarily using First in First out (FIFO) queues. Applications can be notified about the specific state of network interfaces or queue status via events.

Figure 26:
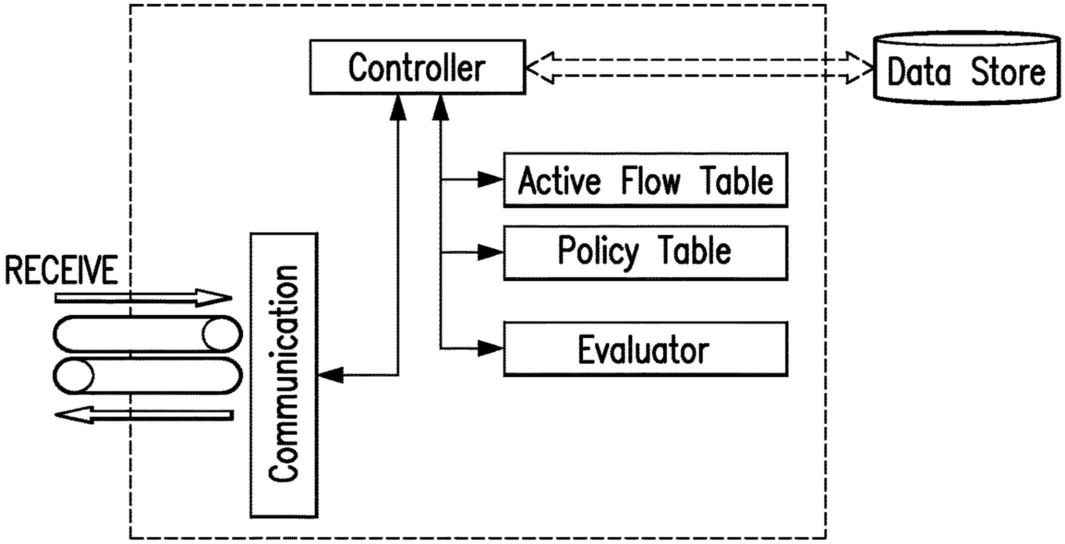
FIG. 26 is a diagram illustrating an example policy engine in accordance with one aspect of the disclosed subject matter.

For the purpose of illustration and not limitation, FIG. 26 illustrates the internal components of the policy engine. The controller maintains a Active Flow Table (AFT) with flow attributes such as application ID, source Network Control Function (NCF) ID, destination NCF ID, source port, destination port, active sub-flows details (e.g., interface, source and destination IP address), current active policy, and the like. A listener function can run in a separate independent execution computer unit and can listen to all the events inside the CCM. An evaluator function can evaluate all the policies related to each application when a new connection is created or when any change occurs via events. The controller can perform the actions of a policy via an enforcement-point (e.g., the Network Manager).

The policy engine on a UE can be distributed. For example, the network based policy engine can subscribe to local control middleware events of UEs. The Service Access Manager (SAM) from the service plane can provide network-based data storage and session management, and Network Information Manager (NIM) LCF network information services to each UE.

Figure 27:
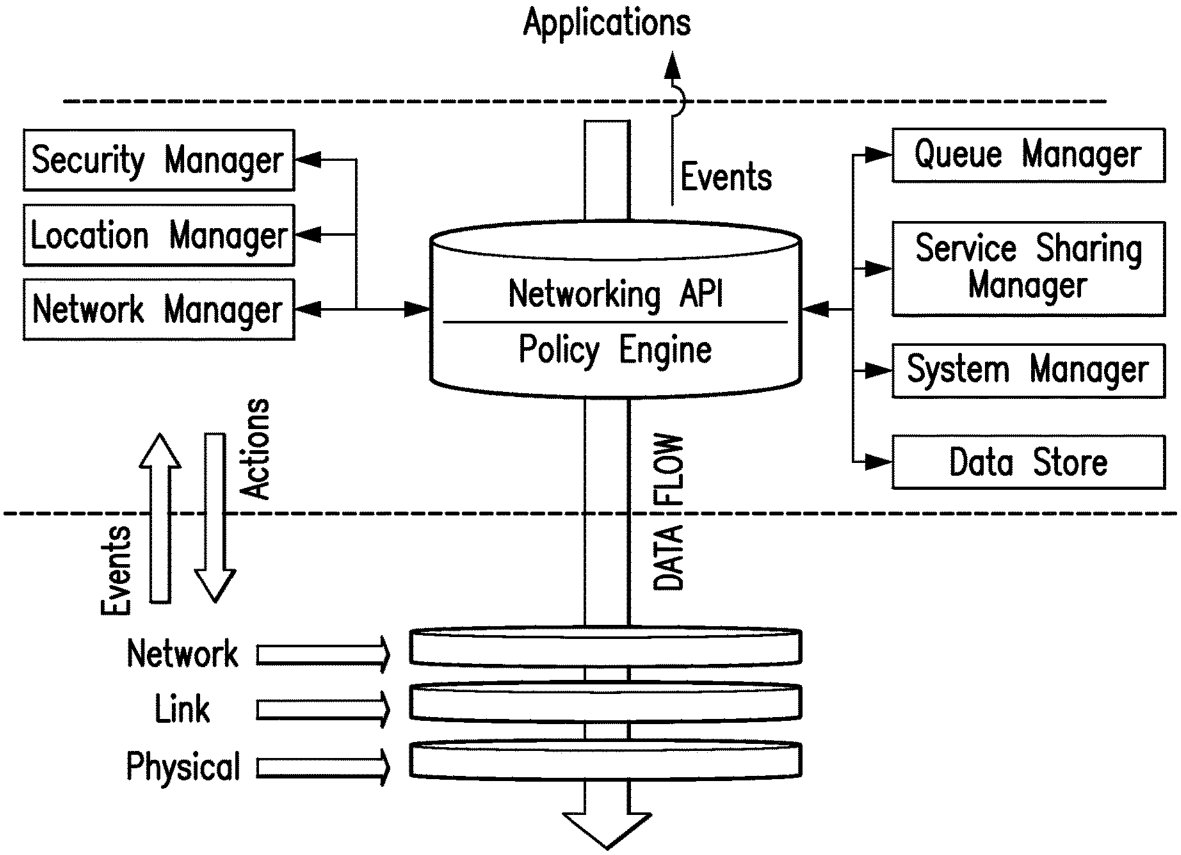
FIG. 27 is a diagram illustrating a data flow pipe controlled by exemplary control middleware in accordance with one aspect of the disclosed subject matter.

The control middleware can control a data flow pipe as shown in FIG. 27 for the purpose of illustration and not limitation. The control middleware can have different attributes as its input variables, which affect the behavior of the active data flows. The actions of the policies can result in changes at the controls of network, e.g. the link or physical layer. In other words, the control middleware can act as the control center for the data flow pipe and other control functions, i.e. network, link and physical, are the connected control knobs.

Figure 28:
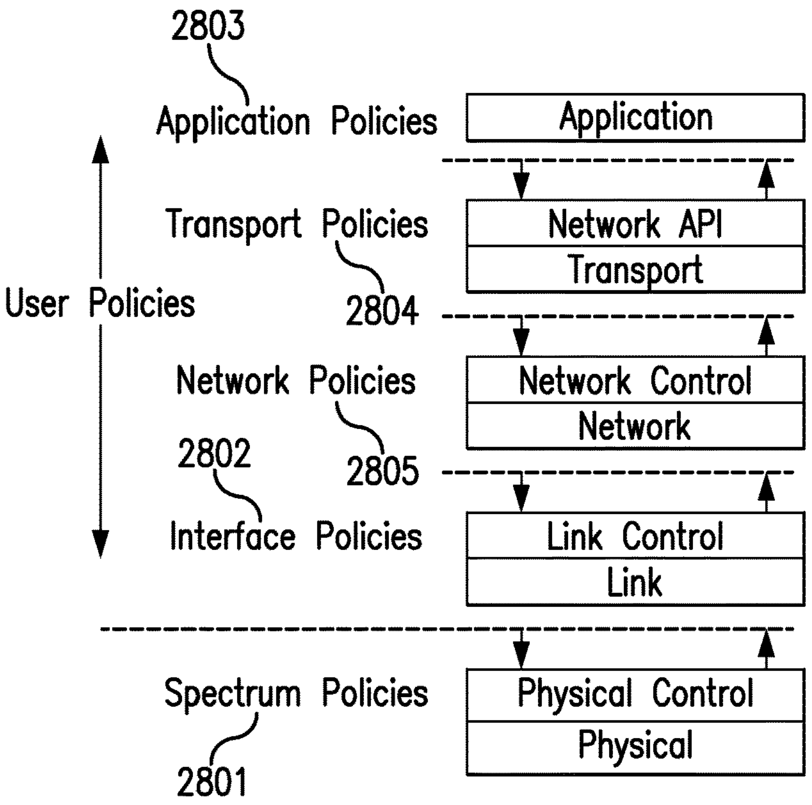
FIG. 28 is a diagram illustrating various levels at which policies can be defined in accordance with one aspect of the disclosed subject matter.

For the purpose of illustration and not limitation, FIG. 28 shows different levels at which policies can be defined. Spectrum policies 2801 can be defined to use optimal spectrum (e.g., licensed or unlicensed). Either the physical layer controller (e.g., different system controlled by the NM) can send optimal spectrum configuration based upon the current location or a UE can use cognitive radio technologies to supplement the spectrum selection decision. A cognitive radio is a transceiver that automatically detects available channels in wireless spectrum and accordingly changes its transmission or reception parameters so more wireless communications can run concurrently in a given spectrum band at a location. This process is also known as dynamic spectrum management. Interface selection policies 2802 can decide which network interface is selected for data communication.

Application policies 2803 can provide different attributes such as bandwidth usage, location, time, and device-type, based upon which decisions can be made. A user can change all these policies and add new policies based upon their needs. Furthermore, for future applications, users and applications developers can define transport 2804 and network layer policies 2805, which can define which transport and network layer protocols the application can use for data communication based upon the networking environment. For example, if a UE is facing intermittent network connectivity the applications, as a policy, the UE can use disruption tolerant transport protocol rather than using TCP or UDP.

Figures 1, 67:
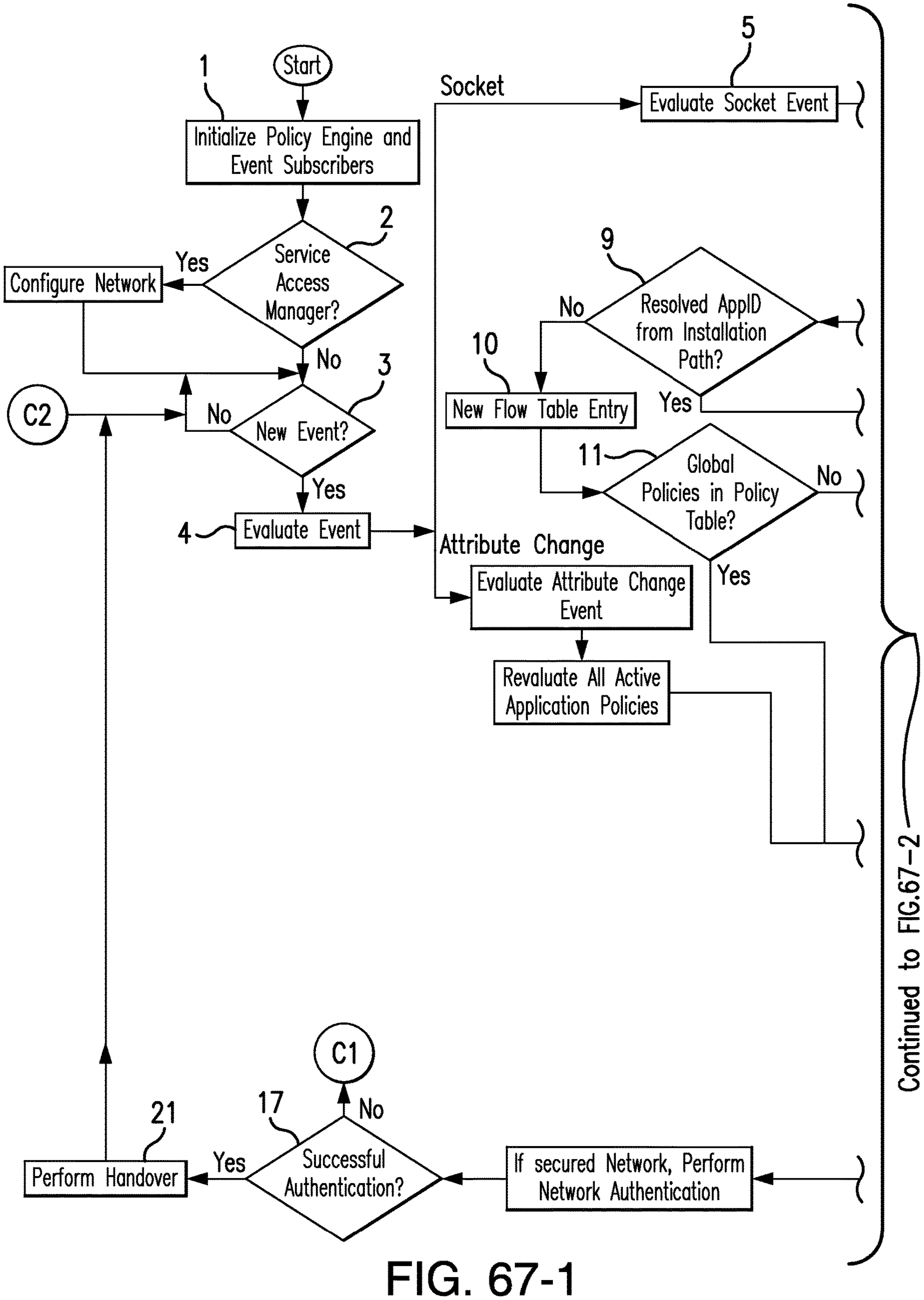
Figures 2, 67:
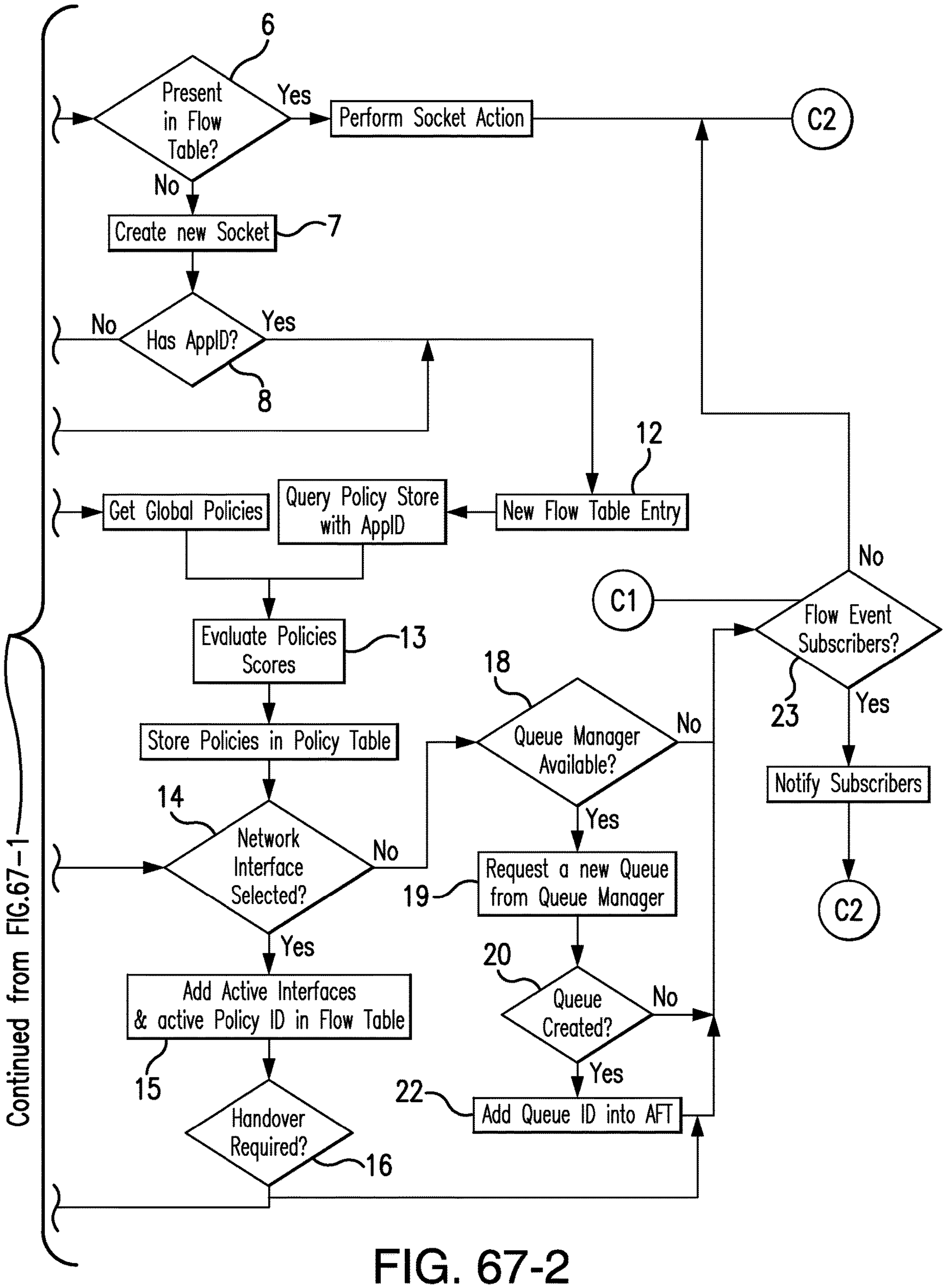

For the purpose of illustration and not limitation, FIG. 67 is an exemplary flow chart of the operation of the policy engine. The control middleware can initialize the policy engine and subscribers can be configured 6701. If the service access manager is configured, the policy engine controller can create a connection with it 6702. The controller can wait for new events 6703. When a new event occurs, the controller 6704 can evaluate it. If the event type is socket 6705, the flow table can be checked to determine if the socket is already present, and if present, the corresponding socket action can be performed 6706. If the socket is not present, a new socket can be created 6707. The controller can check for Application ID presence in the socket event 6708, and if present, a new flow table entry can be created 6712. The controller can query the policy store to load application policies and perform evaluation 6713. If the application ID is not present, the controller can attempt to resolve the unique application installation path, and if resolved, with the associated application ID, a new table flow can be created. It the application path does not result in a successful application ID 6709, a new flow entry can be created with global policies 6711. After policy selection, the controller can decide upon the network interface 6714, and if network interface is selected, the flow table entry can be updated 6715. If a mobile handover decision is made, the controller can check if network authentication is required, and if required, the controller can perform the authentication step 6717. On successful authentication, the control middleware can perform the mobile handover 6721 and can complete the event processing. If the network interface is not selected due to interface unavailability or policy enforcement, the controller can check for Queue Manager availability 6718, and if present, a new queue can be requested from the queue manager 6719. On successful queue creation 6720, the flow table entry can be updated with the queue ID 6722 and the corresponding application can be notified using the flow event unidirectional event channel 6723.

In accordance with one aspect of the disclosed subject matter, the CCM can be installed in the operating system in at least two different ways, e.g. kernel and user space installation. Both types of installations can have different communication flows. In kernel-space control middleware, the networking APIs in the control middleware can be backward compatible with the current BSD socket APIs.

Current applications (i.e., legacy) will work seamlessly with the new networking API. New applications (i.e., native) can set control middleware specific attributes using setsockopt socket API, including application-id and event channel. The application-id can be used for selecting the application specific policies. This attribute can tell the control middleware who is opening the socket. The event channel attribute defines a communication channel that can enable the control middleware to notify the application about the network events.

Applications can access networks using the networking APIs provided by the control middleware. There can be three different flow configurations in which native applications can communicate with a CN based on networking stack on CN. First, in the case of control middleware enabled CN, the control middleware can select HIP protocol as NCF for communication between the hosts. In the case of IPv6 enabled CN, the control middleware can select mobile IPv6 (MIPv6) protocol as NCF. In the case of IPv4 enabled CN, the control middleware can fall back to plain TCP/IPv4 stack.

Figure 29:
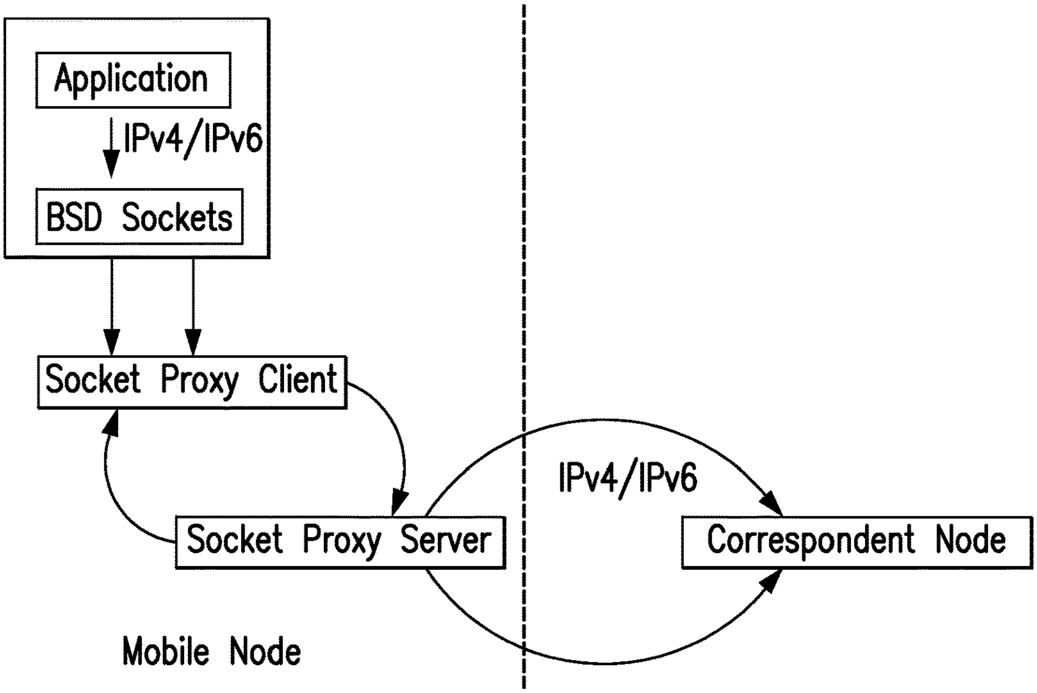
FIG. 29 is a diagram illustrating exemplary socket proxy functionality for a user-space control middleware library in accordance with one aspect of the disclosed subject matter.

In user-space control middleware, the control middleware can be installed on a ULE as a user-space library without making any changes to the kernel-space BSD sockets APIs. Native applications can use this library for network communication. For legacy applications, a native socket proxy (that acts as a proxy that routes network packets between a client and server and provides authentication so only authorized users can access a server) server application can run locally on the UE. The legacy applications can run inside a socket_proxy_client application, which captures all the BSD socket calls and forwards the calls to the locally running socket proxy server. For the purpose of illustration and not limitation, FIG. 29 shows the socket proxy functionality for user-space control middleware library.

Figure 30:
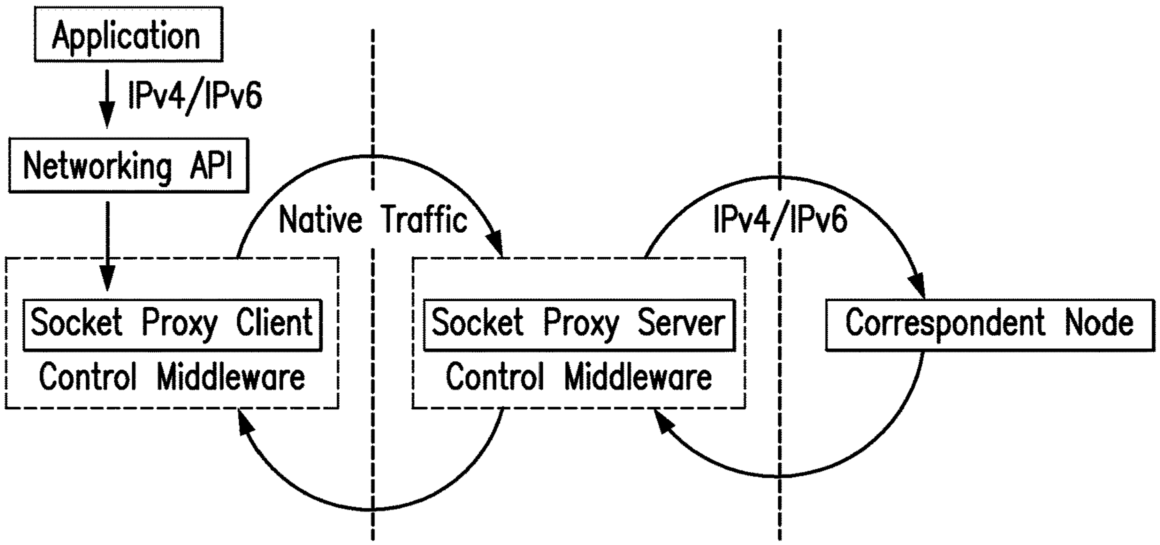
FIG. 30 is a diagram illustrating an example socket proxy server and client in accordance with one aspect of the disclosed subject matter.

The CN can have IPv6 or IPv4 support without any control middleware. To make a UE always connect to the CN using control middleware, a socket proxy can be used on the network side, which supports control middleware networking stack. The socket proxy component on the network side can be used as a server and the policy controller with AFT in the control middleware acts as a socket proxy client. For the purpose of illustration and not limitation, FIG. 30 shows the socket proxy functionality. First, the application can open an IPv4 or IPv6 socket. Second, the policy controller can act as socket proxy client and can forward the request to socket proxy server in the network. The socket proxy server can be connected to the socket proxy client natively. Third, the socket proxy server can act as an IP client for the CN and can forward all the response packets to the socket proxy client. The socket proxy effectively acts as a socket relay system, which opens the requested application socket at the server rather than opening it on the local the networking stack.

Figure 31:
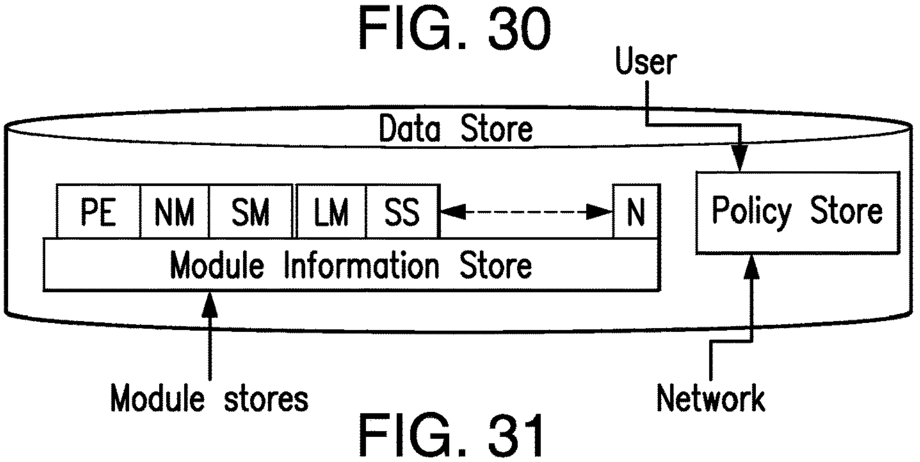
FIG. 31 is a diagram illustrating an example of centralized storage in the data store in accordance with one aspect of the disclosed subject matter.
Figure 32:
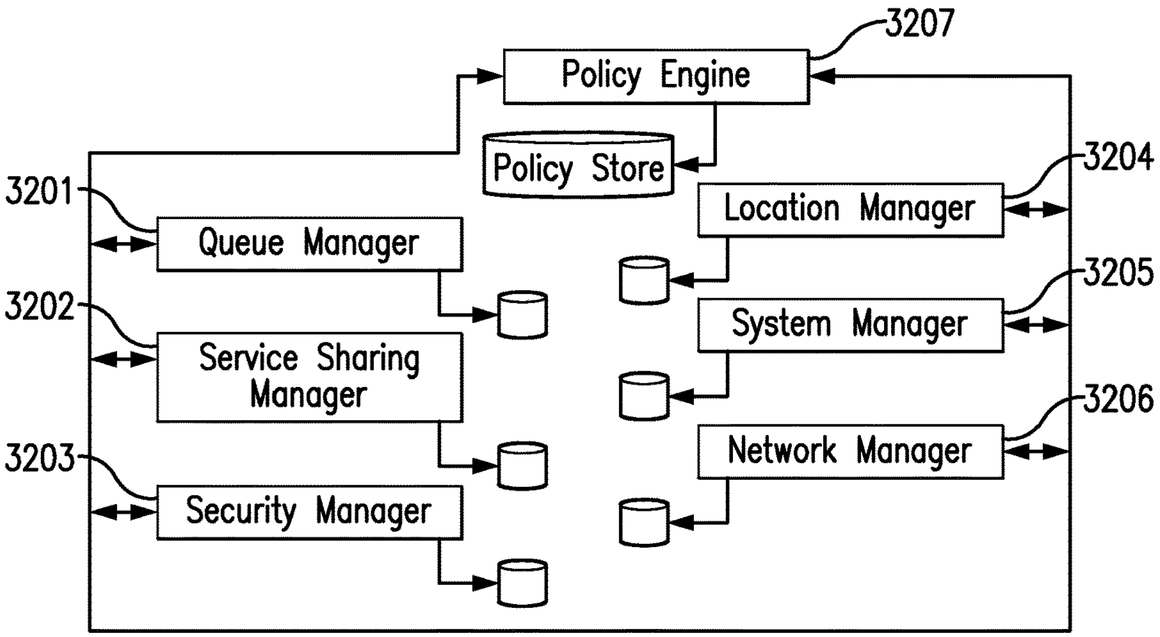
FIG. 32 is a diagram illustrating exemplary distributed storage in accordance with one aspect of the disclosed subject matter.
Figure 33A:
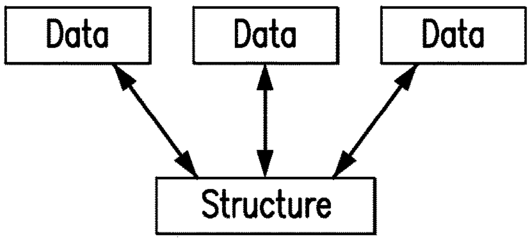
FIGS. 33A-33B are diagrams illustrating examples of schema and document based storage in accordance with one aspect of the disclosed subject matter.
Figure 33B:
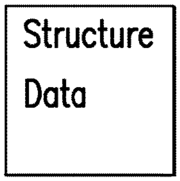

In accordance with one aspect of the disclosed subject matter, the policy engine described above can be enhanced with additional intelligence. A learning model-based, event-driven control middleware, which makes better decisions to optimize system and network resources can be provided. The various modules of the middleware can independently store generated data in two different ways. In centralized storage, each module can store the information in the respective module information store of the data store, as shown in FIG. 31 for the purpose of illustration and not limitation. In distributed storage, each module (e.g. Queue Manager 3201, Service Sharing Manager 3202, Security Manager 3203, Location Manager 3204, System Manager 3205, Network Manager 3206 and Policy Engine 3207) can manage data locally, as shown in FIG. 32 for the purpose of illustration and not limitation. The modules can store data in at least two different ways: schema and document based storage. In schema (which refers to the organization of data to create a blueprint of how data will be stored) based storage, each module can define a base schema file, which describes how the data will be stored. There can be a single base structure file and multiple data files, as shown in FIG. 33A for the purpose of illustration and not limitation. In database terminology, a table can be defined once and multiple records can be stored in the table. In document based storage, data can be directly stored in independent document files. The structure and data can both reside in the same file, as shown in FIG. 33B for the purpose of illustration and not limitation.

Each module can define its schema independently. As the middleware can be extended with other modules, the module information store can be also extended. Information store can be a key-value hash table based system, flat file based or a relational database management system (RDBMS) locally installed or on a remote server.

Stored data can be analyzed to make better decisions when communicating with devices or making network selection to optimize resources. As the data can be generated and stored by each module separately, the time of execution can be dependent upon the module.

In case of learning, a problem is known beforehand and the learning algorithms can create a model with the given data, i.e., a training set (i.e., a set of data used in various areas of information science to discover potentially predictive relationships), which forms a knowledge base. For example and without limitation, Artificial Neural Networks (ANN) and Hidden Markov models (HMM) can be used. The knowledge base can be used to answer the problem. In case of mining, the problems are initially not defined. The mining algorithm can look for patterns in the give datasets, for example using classification and clustering algorithms.

Figure 34:
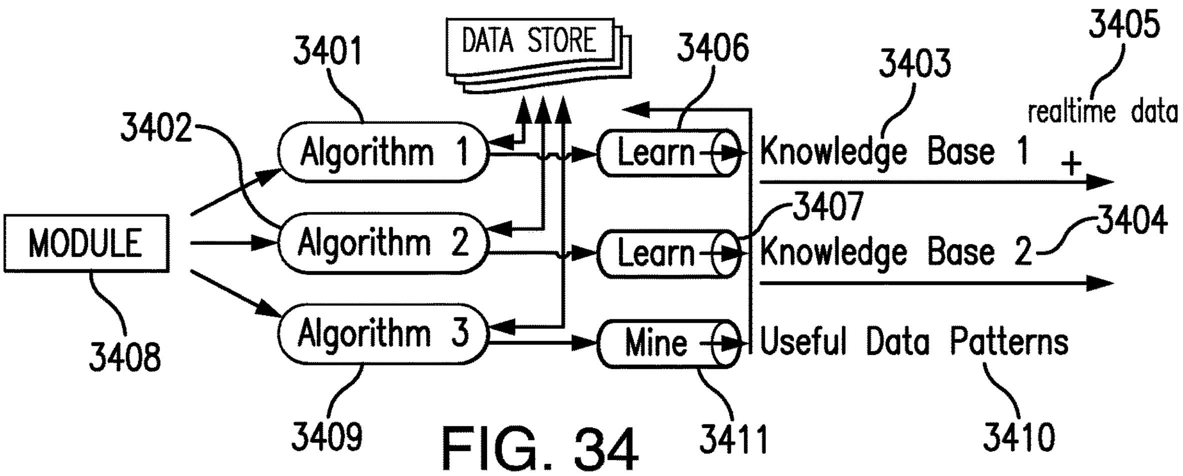
FIG. 34 is a diagram illustrating exemplary module specific data and algorithms in accordance with one aspect of the disclosed subject matter.

In accordance with one aspect of the disclosed subject matter, the analysis algorithms can be learning or mining based, as shown in FIG. 34 for the purpose of illustration and not limitation. In learning based algorithms (e.g. algorithm 1 3401 and algorithm 2 3402 in FIG. 34), the decisions can be made based upon the stored knowledge base (e.g. knowledge base 1 3403 and knowledge base 2 3404). The algorithms can predict the next attribute value based upon real-time data 3405. For example, for the problem of "whether the next Wi-Fi hotspot will have high bandwidth availability" an algorithm learns 3406 and 3407 from the stored data, e.g., Wi-Fi performance parameters, access time, and location. Once the knowledge base is created, the algorithm can predict the high bandwidth Wi-Fi hotspot availability with the real-time data 3405 as the input.

Figure 35:
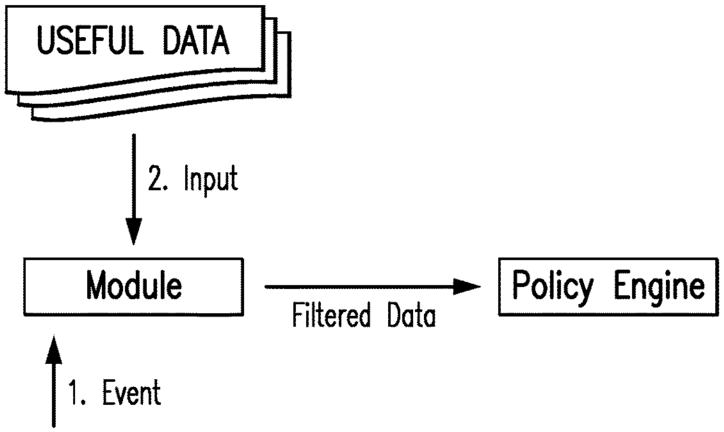
FIG. 35 is a diagram illustrating an example of using analyzed data for middleware optimization in accordance with one aspect of the disclosed subject matter.

The modules 3408 can store this useful data again for future use. When modules provide information to the policy engine, the policy engine and/or modules can use the useful data to make better decisions, as shown in FIG. 35 for the purpose of illustration and not limitation. For example, out of four scanned near-by networks, the network manager (NM) can return the network that has maximum reliability directly using the previously stored data.

In mining based algorithms (e.g. 3409 as shown in FIG. 34), useful patterns 3410 can be mined 3411 from the previously logged data. These patterns can provide a better user experience and device performance. For example, the NM can store the selected network information, e.g., network providers, performance parameters, network cost, bandwidth and location, for optimizing handoff delay in the future.

Figure 36:
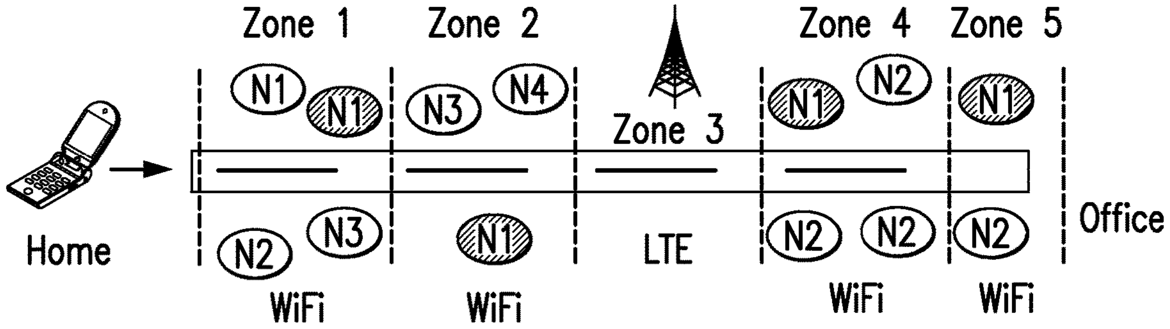
FIG. 36 is a diagram illustrating an example of network selection optimization using daily route in accordance with one aspect of the disclosed subject matter.

In accordance with one aspect of the disclosed subject matter, the NM analyzes the network access data for creating a geographic map of the daily route of the user using a mining algorithm. The map can help the policy engine in making network access decisions. For example, if the engine knows that there will be a cheap Wi-Fi network in next five minutes, it can stop using LTE for data upload and wait for the Wi-Fi network. For the purpose of illustration and not limitation, FIG. 36 shows a user's daily route from home to office for network selection optimization. The NM can divide the route into different zones based upon the location of the UE. As shown in FIG. 36, Zone 1, 2, 4, and 5 support Wi-Fi and zone 3 supports LTE only. As the user has a contract with Network 1 (N1), the UE has saved the MAC addresses of all the access points (AP) belonging to N1. As the UE moves along the path, handoffs can be made directly without looking for other networks in the zone by the policy engine.

Each module can store various attributes. For example, the Location Manager can store daily trips, location, GPS coordinates, and time. The Network Manager can store network SSID, location, time, performance, Time to Live (TTL), nearby networks, and cost. The Security Manager can store network credentials, device credentials, local identities, TTL for credentials, user credentials. The Service Sharing Manager can store device, location, shared services, service access time, and user ids. The System Manager can store application CPU, memory, network usage (session time), and battery usage. Based on these values the policy engine can dynamically move the applications load connected cloud platform, which reduces the load on the UE, for example, for machine vision, real-time image processing, and gaming as described in more detail below.

In accordance with one aspect of the disclosed subject matter, the control middleware modules store the control data and inference the device networking usage patterns to create a knowledge base. This knowledge base can be viewed as a knowledge plane on top of the traditional control plane and data plane in communication networks. The knowledge plane can provide inputs to the control plane to make better decisions and learns from the decisions continuously.

Figure 37:
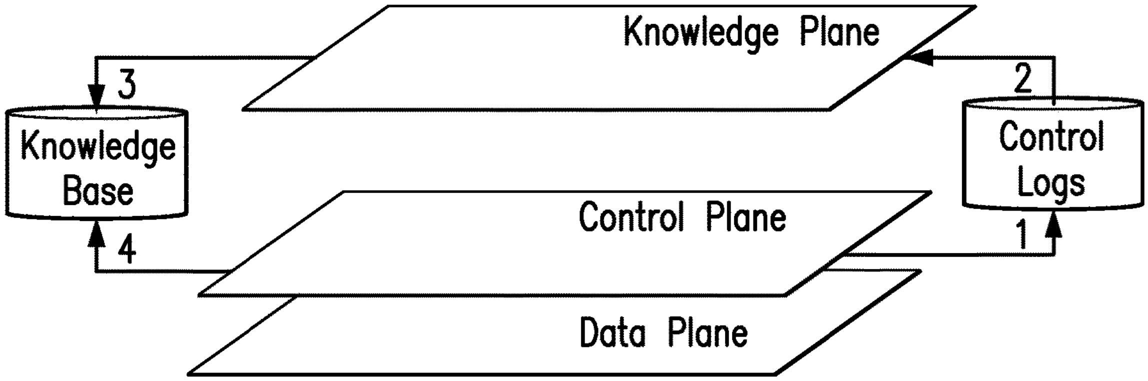
FIG. 37 is a diagram illustrating an example knowledge plane in accordance with one aspect of the disclosed subject matter.

For the purpose of illustration and not limitation, FIG. 37 shows the knowledge plane functionality. The control plane can store all the data related to the control decisions made by the plane. The cognitive plane can take the stored raw data and processes it using learning or mining algorithms. The processed data can be stored back as a knowledge base. The knowledge base information can be given back to the control plane to make better decisions.

In accordance with another aspect of the disclosed subject matter, a unified secure communication framework for network access and end-to-end (E2E) communication in heterogeneous networking environments is provided by abstracting common access patterns. The architecture can make use of the redesigned mobility enabled networking stack described above in which the network infrastructure is decoupled into logically separate service and infrastructure planes as shown in FIG. 16. The service plane can be focused on network services and applications. The Service Access Manager (SAM) network element can be responsible for performing mobile node (MN) security management (e.g., authentication and authorization), and access control for different administrative domains and/or heterogeneous technologies. The infrastructure plane can focus on the physical network infrastructure management independently.

The Network Manager (NM) module can maintain and monitors all active network interfaces information, and can deliver network events to the Policy Engine (PE). The SM module can manage and store all the respective access credentials. The SM can provide access service authentication for a MN in a heterogeneous mobile environment for both networks and devices. The Policy Engine (PE) in turn can collaborate with the SM and NM in order to make a mobile handover decision in a secure manner.

For networks, as shown in FIG. 16, the service-plane can manage the Mobility Manager service for NCF protocols, the MN identity and network information service for LCF protocols, spectrum database service for PCF protocols and can provide access control of MNs to service providers. The users can also avail these services independently from third party providers. The infrastructure-plane can communicate with LCF protocols to establish trust before allowing access to network resources. The trust can be established indirectly using service-plane authentication. For devices, the infrastructure-plane can be technology specific, and can provide device discovery and trust establishment between devices. The control middleware can be the logical service-plane that provides access control of locally running services to users. The secure access framework can provide credential management, credentials usage for secure network and device authentication, and additionally, can provide secure end-to-end data communication channel functionality based upon application requirements.

As a MN enters a new service domain, for successful network access, it can be required to have proper network access credentials. The access credentials required for each service domain can be different, depending upon the service agreements between participating service domains, but in all cases they will be tied to a "user identity", which is validated after creating a secure channel with network access credentials. The service provider can issue a user identity, e.g. International Mobile Subscriber Identity (IMSI), with the USIM application installed in UICC. Network access technologies can also have different types of authentication mechanisms, with their respective credential types, for the verification and access control of the user identity.

In wireless communications, the permanent user identity can only be shared with a network after establishing a secure confidential channel over the air interface. The MN needs to create a confidential link layer temporary channel by establishing a shared secret after node authentication, to share its identity across the network. In case of LTE, the secure channel can be created using the master session key generated by the EAP-AKA procedure ($K_{ASME}$) as discussed in more detail below. In Wi-Fi networks, the secure channel can be established using a session master key (MK), which can be generated in two ways. In WPA2 personal mode, the MK can be generated using a symmetric shared secret (e.g., passphrase and/or password) because the user has control of both ends, i.e., device and network. In WPA2 enterprise mode, the MK can be generated after successful client authentication, which can be done using EAP framework. In order to enable reuse of the same issued credentials across different service domains and access technologies (e.g., LTE or Wi-Fi), the target service domains need to support a compatible authentication framework and mechanisms. The EAP framework and AKA authentication mechanism, for example, enable the reuse of the same UICC-stored credentials for authentication across LTE and Wi-Fi networks.

The service provider issued user identity (e.g., IMSI), distributed with the UICC, can be used for managing identity in a federated manner. The service-plane can authenticate a MN across different infrastructure providers, and can enable trust establishment between infrastructure-plane and the MN for secure communication. Similar to the standard Federated Identity Management schemes, the service-plane can enable the portability of MN's identity information across otherwise autonomous security administrative domains. Furthermore, in order to maintain the MN's privacy, an alternative pseudo-identity can be created to preserve the integrity of the original identity. The pseudo-identity mechanism can create another identity that is mapped to the original identity. The pseudo-identity can be the only identity shared across networks, keeping the original identity intact. In case of identity theft, a new identity can be created without compromising the original identity. Also, multiple pseudo-identities can be created and shared a priori for each infrastructure provider for speedy re-authentication.

In accordance with one aspect of the disclosed subject matter, the credentials required for secure communication can be generated remotely by a third-party for validation of node identity (authentication), either to the visited network or to other nodes. For cellular networks, the credentials can be generated by the service provider and distributed physically using UICC cards. In case of Wi-Fi networks, for authentication, separate implementation specific client applications can be used to store user credentials, or the UICC credentials can be reused in EAP framework.

In one embodiment, node authentication can be performed using asymmetric public key cryptographic mechanisms (e.g., certificates), which requires the use of a third party Certificate Authority (CA) entity. The Service Access Manager (SAM) network element can also provide this third-party CA functionality for establishing trust between any two communicating nodes. In other embodiments, the CA functionality can be externally provided by a third-party.

To reduce handover delays and to obtain additional network information, the LCF protocols, in some embodiments, can require support of external network elements to acquire additional information of nearby networks from a Network Information Manager. If secure communication is required to the NIM, the LCF protocols can use the certificates issued by the SAM for node authentication and to establish a secure channel for this communication also. If the network elements are under the control of the same infrastructure provider, the session credentials generated for the link layer access can be reused for LCF protocols to reduce credential management complexity.

For inter-node communications path or for node to Mobility Manager communications, the network layer cryptographic methods can also require certificate-based algorithms. For establishing a secure E2E communication channel at the network layer, IPsec can leverage the CA-issued certificates for node authentication. The NCF mobility protocols can also leverage the same CA issued certificates, to establish a secure channel with the Mobility Manager. Therefore, the security framework can reduce credential complexity by reusing CA issued credentials for LCF to Network Information Server and NCF to Mobility Manager communications, and also for E2E application data confidentiality.

In accordance with another aspect of the disclosed subject matter, the SM module, as shown above in FIG. 22, can store and manage all the network access credentials including user specific credentials for networks that are not under the control of the MN's service domain (e.g., home, office, and/or hotspot). The LCF and NCF protocol credentials can also be stored in the SM. The SM can leverage the operating system's credential management functionalities for secure storage. It can maintain a memory-based data store cache backed by the local disk or UICC card storage, if it has sufficient capacity. The UICC can decouple the user credentials storage from a single physical mobile device, which enables the same UICC card to be used with different devices. Additionally, the credentials can also be stored in a cloud-based service for backup, which enables credential availability on multiple devices without requiring UICC.

In accordance with one aspect of the disclosed subject matter, the Security Manager module manages network access credentials, performs service plane authentication and authorization with SAM by secure identity disclosure to infrastructure plane, and provides credentials for establishing secure E2E communication setup. The SM module can maintain a Credential Table with the following information: credential-id, type of credential (e.g., certificate, pre-shared key, and/or login and password combination), usage of credential (e.g., HIP protocol, network access), access service-id, and additional information (e.g., name and type of the network, location, and the like). For mobility events, the SM can also coordinate with the NM to perform the authentication procedures and can return the result to the PE, which in turn instructs the NM to execute handover.

Figure 38:
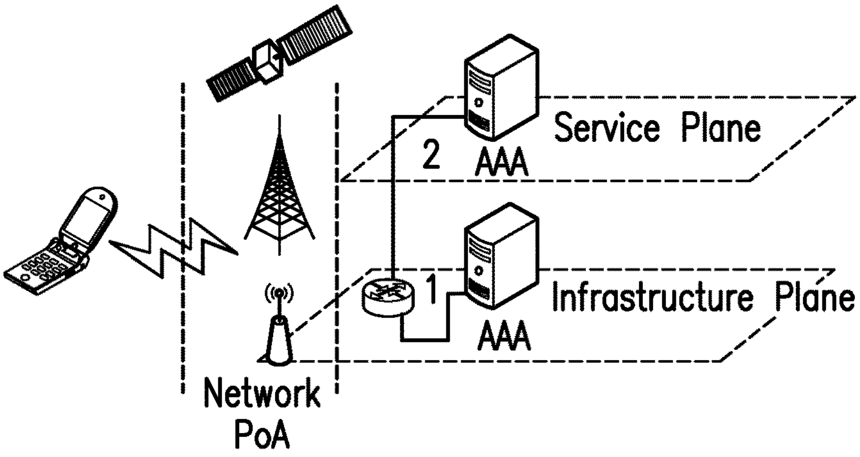
FIG. 38 is a diagram illustrating example service and infrastructure logical planes in accordance with one aspect of the disclosed subject matter.

In accordance with one aspect of the disclosed subject matter, the Control Middleware can enable the logical separation of the authentication function between the Service and Infrastructure planes. The service provider can need to authenticate and authorize a MN before granting infrastructure access. For the purpose of illustration and not limitation, FIG. 38 shows the two-step procedure required for gaining network access.

In the first step, the SM can provide the MN's pseudo-identity securely to the infrastructure provider over a temporary access channel, which binds the user with the corresponding service provider. In the second step, the SM can perform authentication and authorization with the MN's service provider, using infrastructure provider's resources, over the pre-established temporary access channel. For example, in case of LTE, the Non Access Stratum (NAS) channel can create a control plane security context between a MN and MME. In case of Wi-Fi, the security context can be created using the master key (MK) pair associated with a MN and Wi-Fi Authentication Server. Because the infrastructure provider does not take part in authorization procedure, it does not have actual access to the credentials. After successful authorization, the infrastructure provider can obtain network access policies.

The communication between the service and infrastructure planes can be assumed to be secure—there is an a priori established trust relationship between them. Typically, service providers have service agreements with each of the infrastructure providers supporting standard authentication mechanisms.

Once a MN has been authenticated and authorized by the SAM, the MN can start the physical infrastructure plane access procedures to obtain IP network connectivity. A temporary security context can be created between a MN and the network Point of Attachment (PoA) for both control and data planes. For example, in case of LTE, the AS functional layer can create the security context between a MN and eNB. In case of Wi-Fi, a pairwise master key (PMK) can provide the security context between a MN and AP.

In accordance with one aspect of the disclosed subject matter, the NCF protocols can be used to create a secure E2E communication channel based upon application requirements. The control middleware can select the NCF protocol based upon the CN's destination address (e.g., HIT tag or IP address). By default, the NCF can select HIP, if both communicating nodes support it. HIP can perform the Base Exchange process to establish a shared secret using the Diffie-Hellman mechanism as discussed in detail below. For providing confidentiality, the shared secret can be used to encrypt both data and control packets. Only control packets can be encrypted if data confidentiality is not required by the application. If the destination address is IPv6 enabled, the control middleware can select MIPv6 NCF protocol and based upon the application layer protocol, a TLS or IPsec communication channel can be established. If neither HIP nor IPv6 are supported by the CN, the middleware can fall back to IPv4 functionality for the NCF with no pre-defined security mechanism.

Figure 39:
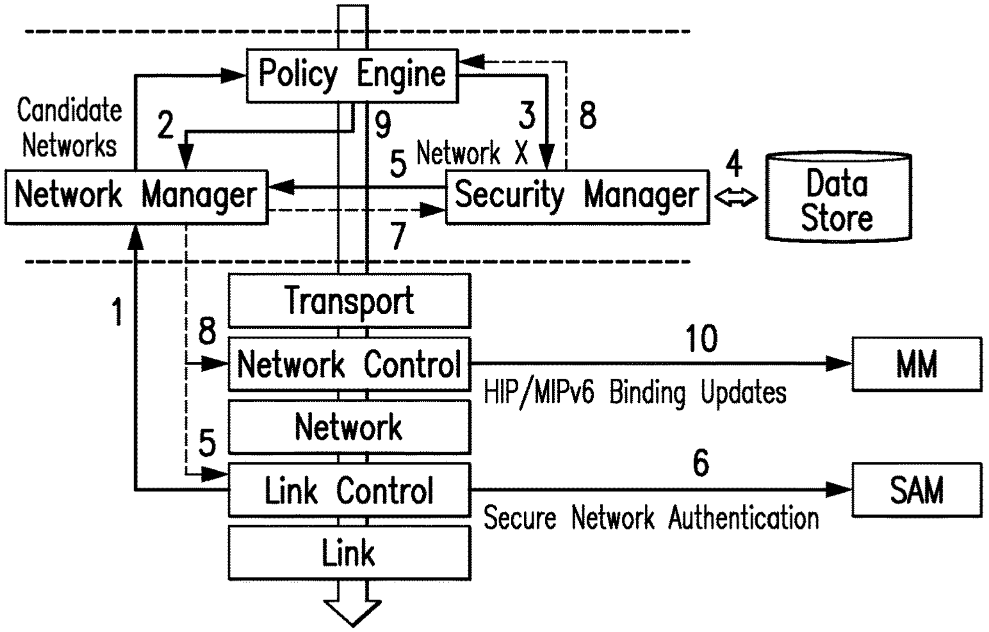
FIG. 39 is a diagram illustrating a mobile handover and exemplary control middleware in accordance with one aspect of the disclosed subject matter.

In accordance with one aspect of the disclosed subject matter, the control middleware can perform pre-authentication with the network access credentials provided by the SM. After acquiring a new IP address securely, the control middleware performs a mobile handover for each active flow by signaling the respective NCF protocol, as shown in FIG. 39 for the purpose of illustration and not limitation.

The control middleware's Network Manager (NM) module can maintain and constantly monitor network interfaces via the LCF. The NM can maintain a Trusted Access Service (TAS) table, which can be dynamically updated by the service provider or user. The TAS can store the access service information, e.g., id, authentication procedure, device type, credentials, cost, bandwidth, and access history. The NM can also maintain two additional tables, Active Access Service (AAS) and Candidate Access Service (CAS). The AAS table can maintain a list of currently connected access services. The CAS table can maintain the available list of trusted access services.

For optimal network connectivity, the NM can monitor the relevant network performance attributes, e.g., signal strength, latency, and available bandwidth using LCF interfaces 3901. If any of the attribute's values goes beyond the threshold value, it can trigger a network event alert. The NM can create a network event object with top-k access services from the CAS table and can signal the policy engine (PE) module 3902. The PE can evaluate the current policies for each application and can make the decision about network selection for a handover (if any). If a network handover decision is made, the PE can signal the SM 3903 with access service identifier to perform pre-authentication. The SM can select the corresponding pseudo-identity, authentication mechanism, and credentials for the access service (if available) 3904. The SM can signal network authentication request to LCF 3905, which performs network access procedures 3906 and can return authentication result to the SM 3907, which in turn signals it to the PE 3908. Based on authentication result, the PE can send a signal to the NM to perform mobile handover 3909.

The MN can send the location update to the MM for the respective NCF protocols 3910. In case of MIPv6, a Binding Update message can be sent to update HA cache secured by IPsec, and RO can be performed for all flows secured by the RR verification function. In case of HIP, the MN can notify both the RVS and the CN using the UPDATE messages that are signed by the private key of the sender and can be verified with the HI (public key) of the sender. The new location of MN can reside in the LOCATOR parameter of the UPDATE message. The UPDATE messages can be sent using the pre-established secure channel from the initial BEX mechanism.

Figure 40:
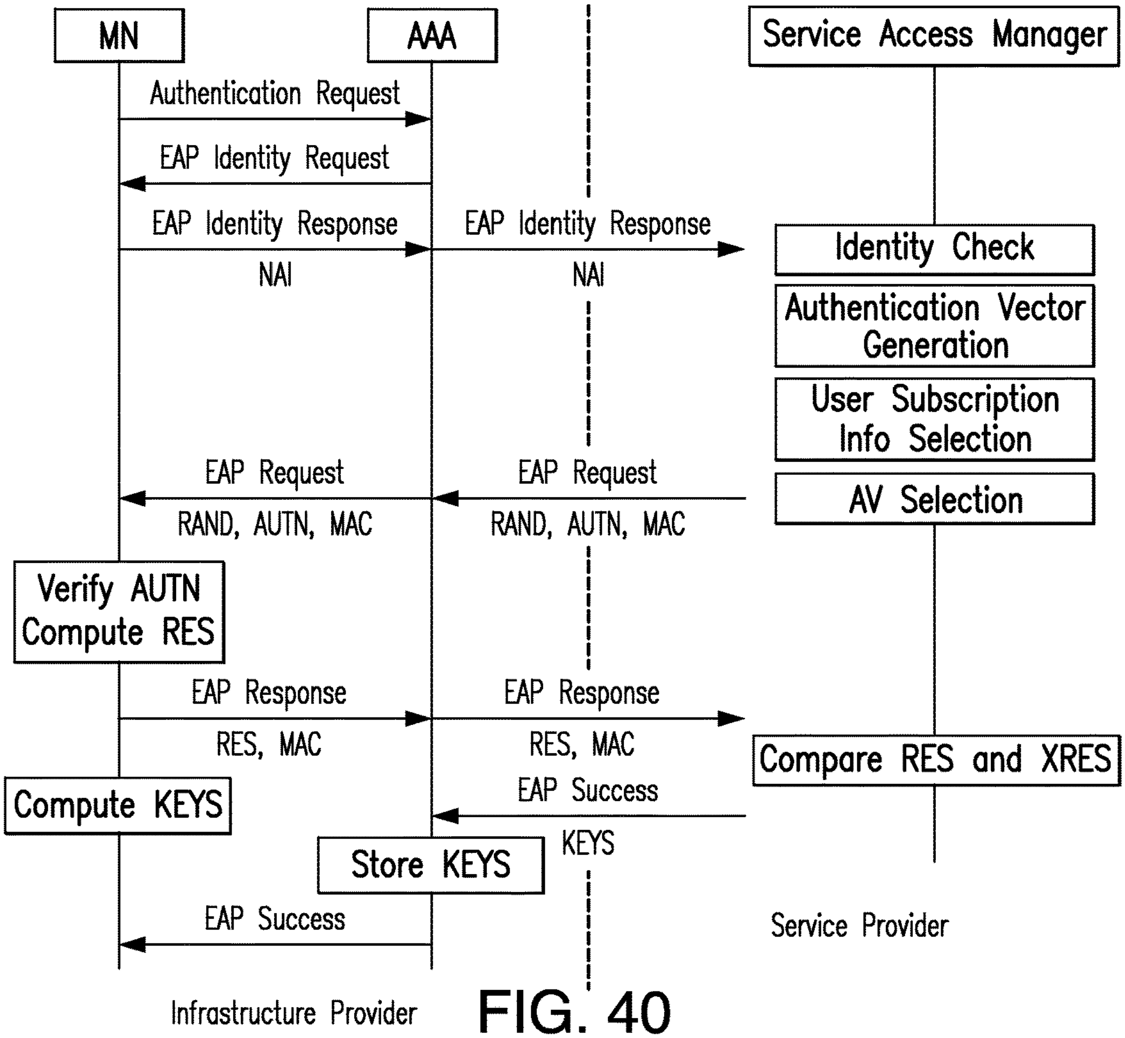
FIG. 40 is a diagram illustrating an example EAP-AKA exchange in accordance with one aspect of the disclosed subject matter.

If the visited network has prior service agreements with a MN's service provider, the USIM credentials can be reused to provide node authentication using EAP framework. Additionally, for independent networks, e.g. Wi-Fi at home, office, or public hotspot, the SM module can store and select the respective credentials at the time of authentication. For the purpose of illustration and not limitation, FIG. 40 shows the SAM server authenticating the MN's access with a Wi-Fi infrastructure provider's AAA server by reusing the USIM credentials. The LCF can initiate an authentication request using the Wi-Fi link SAP and can perform network authentication using EAP-AKA method. After successful authentication, the SAM can return a master session key to the visited network's AAA server and the MN can also generate the same master session key independently. Additionally, the visited network AAA server can send a session key token to newly connected MN for future session validity.

The LCF link SAPs can store the session key tokens, which are shared between the infrastructure provider and MN. The session key tokens can provide an optimal Time-To-Live (TTL) for fast re-authentication procedure. The TTL value can be further optimized based upon MN's access patterns. This allows reduced authentication time when a MN frequently accesses the same infrastructure provider, for example, in a metropolitan area Wi-Fi network provider.

In accordance with one aspect of the disclosed subject matter, the control middleware also provides a general platform for service access control and enables secure device service sharing in local networks. The devices can be discovered using peer-to-peer or centralized protocols. The sharing of device services can also expose security threats, such as unauthorized use of devices, service disruption caused by malicious devices, eavesdropping, and the like. Thus, the services need to be authenticated and authorized, and the E2E communication needs to be encrypted. Similar to network access, device access can be abstracted into two logical steps, i.e., infrastructure and service plane access. The infrastructure plane access can provide authentication for device access. The service plane can provide service access authorization.

In accordance with one aspect of the disclosed subject matter, for devices, the infrastructure-plane is technology specific, and provides device discovery and trust establishment between devices. The control middleware can be the logical service-plane that provides access control of locally running services to users. The device identity can be generated locally from stored credentials, using link layer access technology, e.g. MAC address, or it can be pre-assigned by either a third-party.

The NM can coordinate with the LCF to provides a temporary device access channel for performing device discovery and trust establishment using the user configured authentication method and the corresponding credentials. For trusted device identification, the NM module can use the TAS table with access service type as device. Each table entry can contain: access service id, authentication procedure, type, and supported operations. For reducing credential management complexity and peer-2-peer connectivity, the authentication credentials of the respective access technology interfaces can be generated locally by the user or pre-allocated.

After successful trust establishment, the PE can signal the device availability to the running services and enforces application-specific user policies to provide access control.

In accordance with one aspect of the disclosed subject matter, for accessing services securely, by default, the control middleware can use HIP. In a local environment, device discovery process can provide the NM with the CN's IP address. If the identity of the CN is not known a priori, a MN can use HIP BEX process in the opportunistic mode (e.g., CN's HIT tag is NULL). After a successful BEX, a shared secret can be established using the D-H mechanism and a secure communication can be created.

In accordance with another aspect of the disclosed subject matter, the control middleware provides a general platform for service sharing across multiple devices in a secure trusted environment. The service-sharing manager (SSM) can allow the control middleware to create new flows between devices or modify existing flows by adding and/or removing devices.

Figure 41:
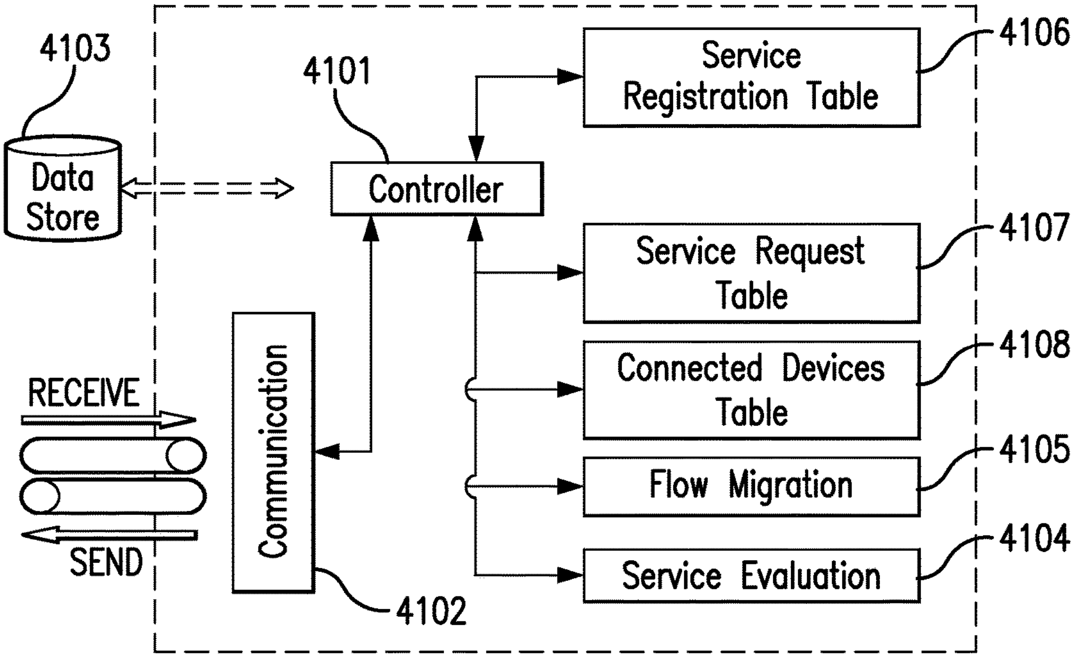
FIG. 41 is a diagram illustrating an example service sharing manager in accordance with one aspect of the disclosed subject matter.

In accordance with one aspect of the disclosed subject matter, the SSM enables service sharing in a trusted networking environment using new service sharing APIs. The SSM module can provide three kinds of service: (1) service registration, (2) service request and (3) flow migration. For the purpose of illustration and not limitation, FIG. 41 shows example internal components of a SSM including SSM controller 4101, communication block 4102, and data store 4103. The service evaluation component 4104 can evaluate and score similar service based upon a service request. The flow migration component 4105 can perform session mobility from one device to another. The Service Registration table 4106 can maintain the registered services on the device and Service Request table 4107 can maintain and monitor the requested services in the network. The connected devices table 4108 can maintain the active connected device list with the corresponding location details (e.g., IP address, network SSID, device type, and the like).

In accordance with one aspect of the disclosed subject matter, the middleware can define two kinds of services: system and application. System services can be public hardware services like camera, video display, audio speaker, microphone, sensors, and the like. Application services can be defined by user applications. Applications are allowed to share their services privately (within the same application) or publicly. Public services such as routing, storage, and computing can be used by other applications.

When a service is defined on a socket, it can start listening for requests and can be identified by an IP address and a port number. Other peers or clients can use this IP address and port number to directly communicate with a service. In this model, clients need to know the location of the service prior to making any service requests. To decouple the service identity and location, new networking APIs can be introduced, i.e., service & query. The service API can specify the different attributes of the service running, e.g., service ID, URI, context, description, and the like. The clients can query for the required service by specifying attributes without any knowledge about the service location.

The service API can be used to register application services (e.g., locally or globally). Applications can pass a description of the service attributes as an input parameter to service API. These attributes can be stored in the Service Registration table (SReg). The attributes defined for a service can be Service ID, URI, Context, Scope, Action and Description. The Service ID can provide a unique identifier for a running service. It can be assigned by the running application or generated dynamically for the lifetime of a socket. The URI can define the Uniform Resource Identifier (URI) of the running service. It can be used to uniquely define the service. For example, edu.columbia.cs.irt.sine uniquely defines the sine service. The URIs can also be used with wild cards. For example, edu.columbia.cs.irt.* defines all the services from irt. The Context can define the location of the socket where it is defined, e.g., local subnet, room presence, organization or global (e.g., public Internet). The Scope can define the scope of the service, e.g., public, private or protected. In Private, only the same application can access this service. This can be identified by the service URI. For example, a service with edu.columbia.cs.irt.sine URI is only visible to the same URI service running on a different device. If the application wants all services to be shared, it can use wild cards, e.g., edu.columbia.cs.*. In Public, the service can be public any application can use it. Applications can authenticate before using depending upon the application design. In Protected, services in the same group can access this service. If the mobile device users are logged-in, then their group can be the default group for all the active services. The Action can define the action to be taken when a query request arrives. The SSM controller can define the action of each registered service. The current defined action states include FORWARD, DELIVER, DELAY, and DROP. In FORWARD, a service query request can be forwarded to the assigned value in address field. The address field can have multiple addresses, and the SSM controller can pick any one address or more than one or all based upon the configuration. In DELIVER, the service query can be delivered locally to the service listening on the socket. When an application invokes a service( ) call on a socket, a default entry can be added with the DELIVER action along with the corresponding service-id. In DELAY, the service query resolution can be delayed, for dynamic processing of action. For example, if a service is not hosted locally, it can be deployed on-demand. In DROP, the service query can be dropped. The Description can define the fine-grained details of the service hosted by the socket. For example, a video display system service can provide details such as video screen size: 23", resolution: 1920×1080 pixels, color gamut support: 98%, and the like. When the applications request for services, they can query for these parameters. They can be passed in a JavaScript Object (JSON) or XML format based upon the implementation.

For describing the functional flow of the service registration, as an example, a system application can define a service to share video display in a local network. The service semantics can be defined using JavaScript Object Notation (JSON) as follows:

```
{
  service_id: 2002:2000::20:2001:23AF::20,
  type: system,
  system_service: video,
  context: local,
  scope: public,
  description: {      min_resolution: 1024 x 768,
                      max_resolution: 1440 x 900,
                      device_name: Samsung LED monitor,
                      monitor_size: 24 in,
                      resolution_support: [ 1024 x 768, 1280 x 800,
                                            1344 x 840, 1440 x 900],
                      color: 24 bits
               }
}
```

Figure 42:
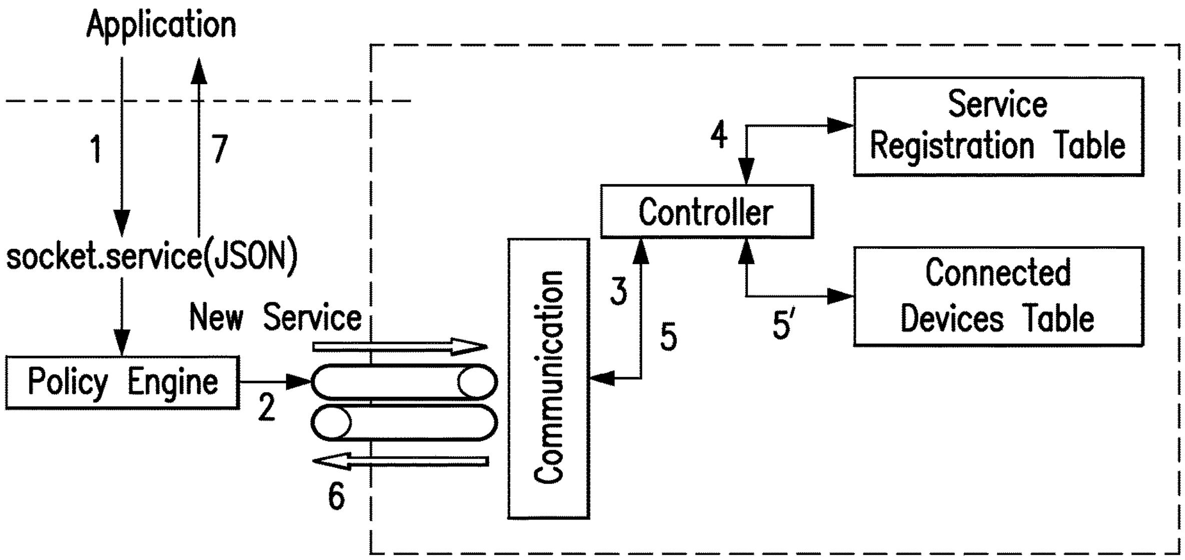
FIG. 42 is a diagram illustrating an example of service registration in accordance with one aspect of the disclosed subject matter.

For the purpose of illustration and not limitation, FIG. 42 shows the service registration process. The application can call socket.service (JSON) to register the service with the control middleware. The policy engine can pass the new service registration request to SSM. The SSM communication module can pass the request to the controller. The controller can register the service with the SRT. On success, the controller can return the SRT entry row number to the communication module. On failure, zero can be returned. The controller can broadcast the new service to all connected devices in parallel. The policy engine can receive the request's response. The response can be returned to the application. Similar steps can be followed when the service is removed from the SSM. In case of a service crash, the policy engine can direct the removal of the service.

In accordance with one aspect of the disclosed subject matter, devices can discover each other either in a peer-to-peer or centralized manner. The SSM module can register itself as a public service in the SReg table. Once the devices are discovered and there is a pre-established trust between them, the control middleware network manager (NM) can signal the policy engine about the device presence. The PE can signal the local SSM of the first device, which in turns can connect to the second device's SSM and establishes a trusted communication channel. The SSM can share the service registration meta-data with each other and update the SReg table accordingly.

Each service can be scored according to its attribute in the description that is defined to have priority number. When multiple services are found for each service request, the evaluator module can calculate the service score based upon the requested service description. The applications can set a threshold when the service availability event should be delivered (e.g., set in the description). For example, a threshold can be only when score is greater than 70% and only after evaluating the service for three times or for a new service only after 20 seconds since the last service was found. The evaluator score model can be configurable. After successful evaluation, the SSM can send a new service notification to all waiting applications via policy engine. The applications can start their communication with the newly discovered service independently.

Figure 43:
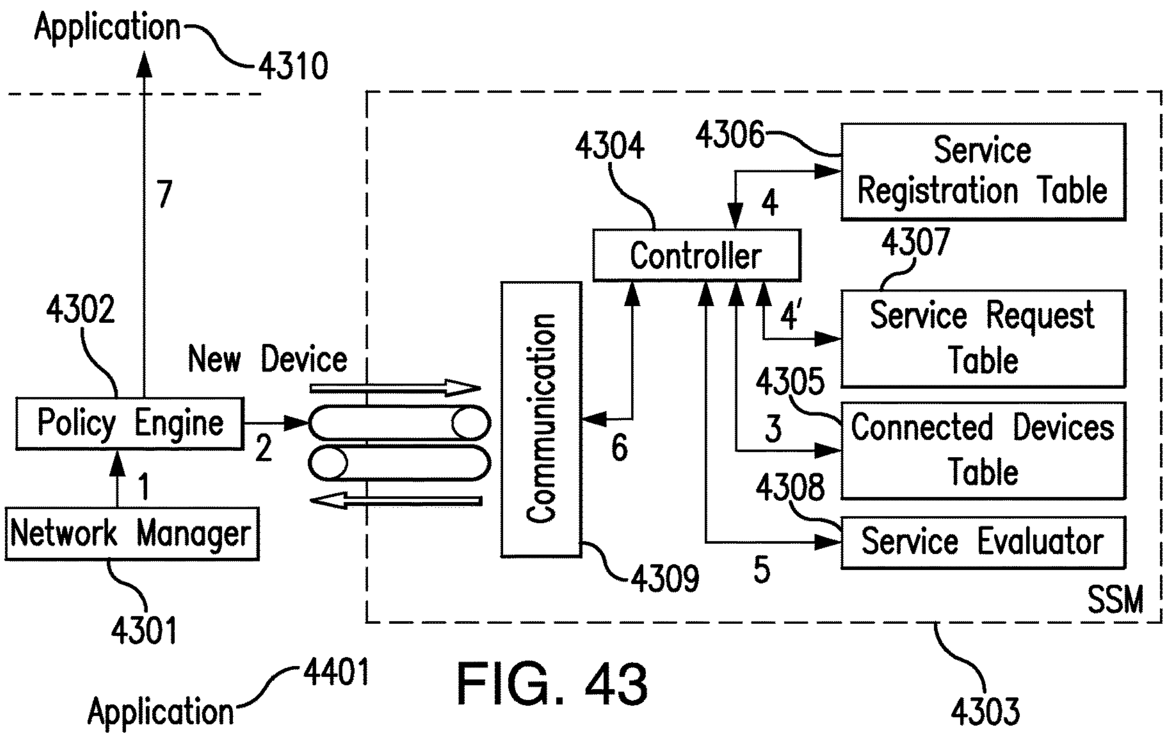
FIG. 43 is a diagram illustrating exemplary device discovery and meta-data sharing in accordance with one aspect of the disclosed subject matter.

For the purpose of illustration and not limitation, FIG. 43 shows the flow of the service resolution after device discovery. The NM 4301 can send a new device signal with the device information to the policy engine 4302 (1). The Policy engine 4302 can send the new device signal to SSM 4303 (2). The SSM controllers 4304 can establish a secure channel and share their services meta-data, and add entry into connected device table 4305 (3). The controller 4304 can check the service registration table 4306 and service request table 4307 for any service matches (4 and 4'). If services are found, the evaluator function 4308 can be called (5). If the service score is above the threshold, service information can be passed onto communication component 4309 (6). The policy engine 4302 can notify the application 4310 about the new service using the unidirectional event channel (7).

In accordance with one aspect of the disclosed subject matter, when an application intents to use some service, locally or globally, the query( ) API is used as the applications do not know the service location. When applications make a query( ) API call, the request can be stored in the Service Request (SReq) table based upon the kind of request, i.e., blocking or non-blocking. In a blocking request, an application can expect an immediate service resolution. In a non-blocking request, an application does not expect an immediate response; the application can be notified about the requested service when it is available in the network via the unidirectional event channel. An application can query for itself in the network using its URI.

For describing the functional flow of the service request, as an example, an application can request for a video system service in a local network. The JSON object for the service can be as follows:

```
{
    query_type: non-blocking,
    type: system,
    service: video,
    description: { min_resolution: 1440 x 900 },
    context: local
}
```

Figure 44:
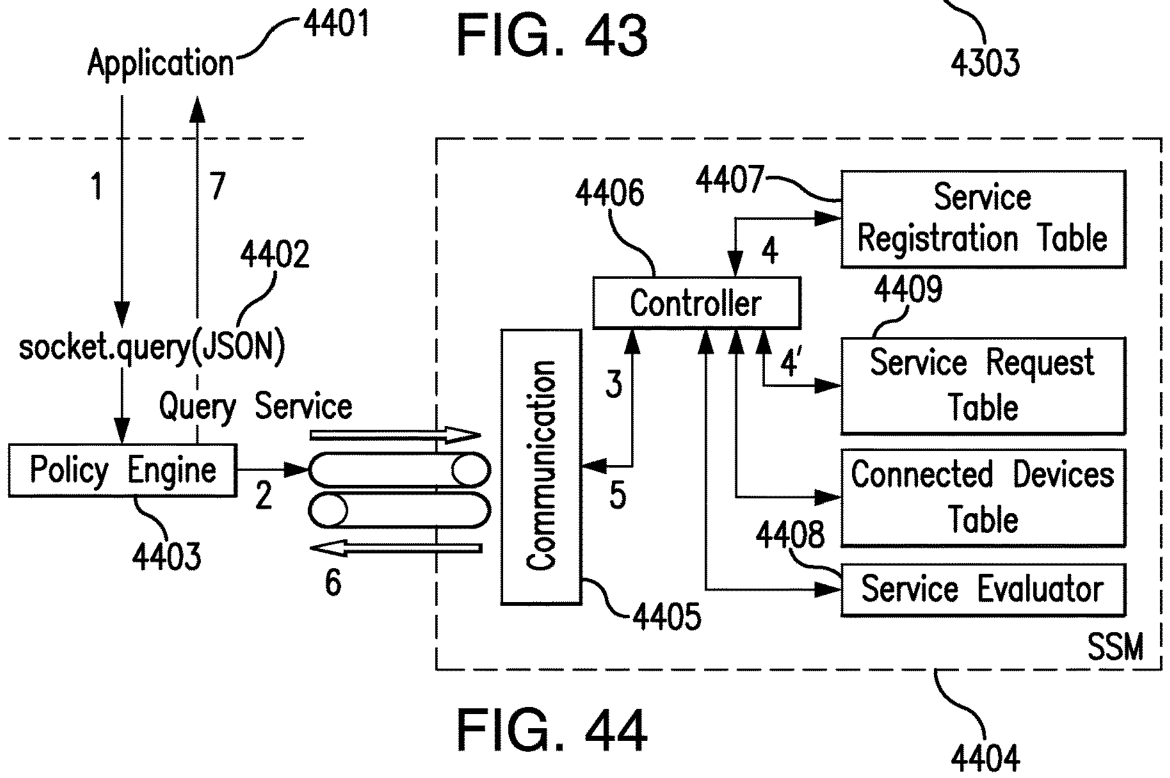
FIG. 44 is a diagram illustrating exemplary service request and resolution in accordance with one aspect of the disclosed subject matter.

For the purpose of illustration and not limitation, FIG. 44 shows a non-blocking service query flow. The application 4401 can call socket.query (JSON) 4402 API for service request (1). The policy engine 4403 can make a service query request for the corresponding application to the SSM 4404 (2). The communication module 4405 of SSM can pass the request to the controller 4406 (3). The controller 4406 can check the SReg table 4407 service entries, i.e., Service Entry Found and No Service Entry (4 and 4'). In Service Entry Found, the service evaluator 4408 can be called. If the service score is above the threshold, the application can be notified about the service (e.g., service ID, service type, IP address) along with the SRT table row number. In No Service Entry, if the query type is non-blocking, the controller 4406 can add an entry into the service request table 4409 (4'). In this case, the controller can wait for new devices to be discovered in the network. If the query is blocking, the controller 4406 returns can return zero. The controller 4406 can return the request table entry row number with the device details or in case of failure, zero to the communication module 4405 as a response (5). The row number can be sent to the policy engine 4403 (6). The PE can return the row number with the device details to the application 4401 (7).

In a blocking service query, the service lookup result can be immediately returned to the application. If the service is found in the service registration table, the service details can be returned to application. If the service query context is global, the query can passed onto a next connected service router (as described in more detail below). The JSON object for the service can be as follows:

```
{
    query_type: blocking,
    service_uri: edu.columbia.cs.irt.sine.prime
    context: global
}
```

Figure 45:
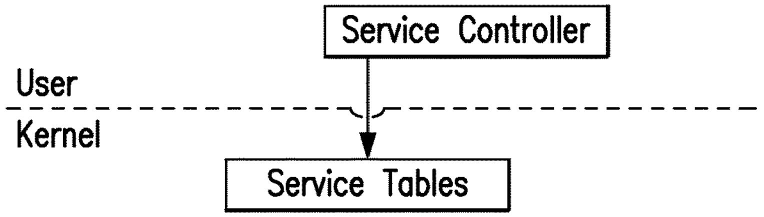
FIG. 45 is a diagram illustrating exemplary service controller and service tables in accordance with one aspect of the disclosed subject matter.

In accordance with one aspect of the disclosed subject matter, to have clear separation between the control and data path, the service sharing tables can be decoupled from the controller as shown in FIG. 45 for the purpose of illustration and not limitation. This decoupling can enable kernel-space implementation of service tables for better performance. The other SSM components can reside in the user-space, which can control the service tables using user-space to kernel-space communication APIs. Furthermore, this enables service tables to be implemented in the hardware similar to routing and MAC tables.

In accordance with one aspect of the disclosed subject matter, the devices can be removed from an existing flow. In case of a device crash or switch off, the SSM can notify all the connected devices about service unavailability of local services or the service request times out. In case of an application crash, the SSM can notify all the connected devices about service unavailability of that specific service and can remove the registration entry.

Figure 46:
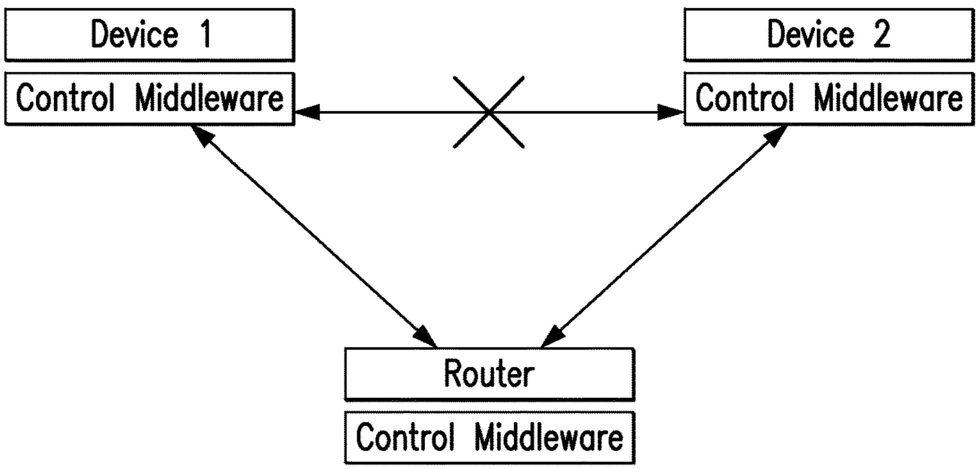
FIG. 46 is a diagram illustrating an example service router configuration in accordance with one aspect of the disclosed subject matter.

In accordance with one aspect of the disclosed subject matter, as the control middleware is device independent, it can be installed on routers (i.e., control middleware network configuration). In the network configuration, the device discovery can be done centrally and each device can communicate with the router's control middleware, which saves UE battery power. For the purpose of illustration and not limitation, FIG. 46 shows the discovery agent home router configuration. The home router discovery agent can act as a centralized discovery agent, and all the UEs can connect to the home router for service discovery. The home router can maintain a global service registration table for the entire local network. The SSM controllers can push SRT changes only to the home router. The UEs can complete service request queries by only looking at home router SRT.

In accordance with one aspect of the disclosed subject matter, as the applications are notified about the new service availability in the network, the applications can decide to migrate the current service session from the local device to the newly discovered device. There can be two ways in which the flow can be migrated from one device to another: Source and Sink Model or Source and Destination Model. In the Source and Sink Model, Device 1 (i.e., source) can forward the video packets to device 2 (i.e., sink). In this case, device 1 acts as a source of data packets and device 2 acts as a sink for data packets. In other words, the data is transferred to the second device but the control still remains with the first device. In the Source and Destination Model, Device 1 (i.e., source) can initiate the migration of the whole flow from device 1 to device 2 (i.e., destination) completely. In this case, the session sharing applications need to support flow migration, which is the ability to move application context from one device to another. To support this functionality the flow identifier (the NCF provides a constant identifier to the upper layer, i.e. transport, which does not change during the lifetime of the flow) of the network control function can be shared between the communicating devices and also, the SSM can transfer the session state from one device to another based upon the application.

The migrate API can be used to provide flow migration for both models. For source and destination model, the applications session state needs to be synchronized prior to calling migrate API.

Figure 47:
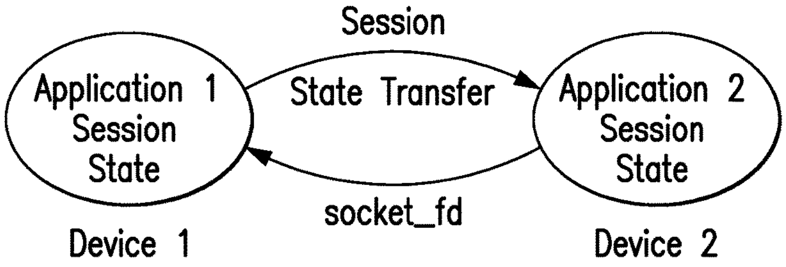
FIG. 47 is a diagram illustrating application an example session state transfer in accordance with one aspect of the disclosed subject matter.

In the pre-migration step, the destination application (on device 2) can create a socket and return the file descriptor to the source application (on device 1). Optionally, the applications can share session data, which includes session cookies, credentials, and application state attributes. For the purpose of illustration and not limitation, FIG. 47 shows the application session state transfer from application 1 on device 1 (i.e., source) to application 2 on device 2 (i.e., destination). After the applications share the state, the destination can return a remote socket file descriptor, which is used as a new flow end-point after the migration.

Once the application session state is transferred, the application 1 can call migrate API with service_id, type of migration and optional remote_socket_fd parameter (e.g., which service, where in remote device and how). If the optional remote_socket_fd is not passed, the remote flow migration module can create one dynamically. For source and sink, the packets can be delivered to the SSM flow migration module, which forwards it to the remote device service. The JSON object for the service can be as follows:

```
{
    service_id: 2002:2000::20:2001:23AF::20,
    remote_socket_fd: 12343332,
    type: 2
}
```

Figure 48:
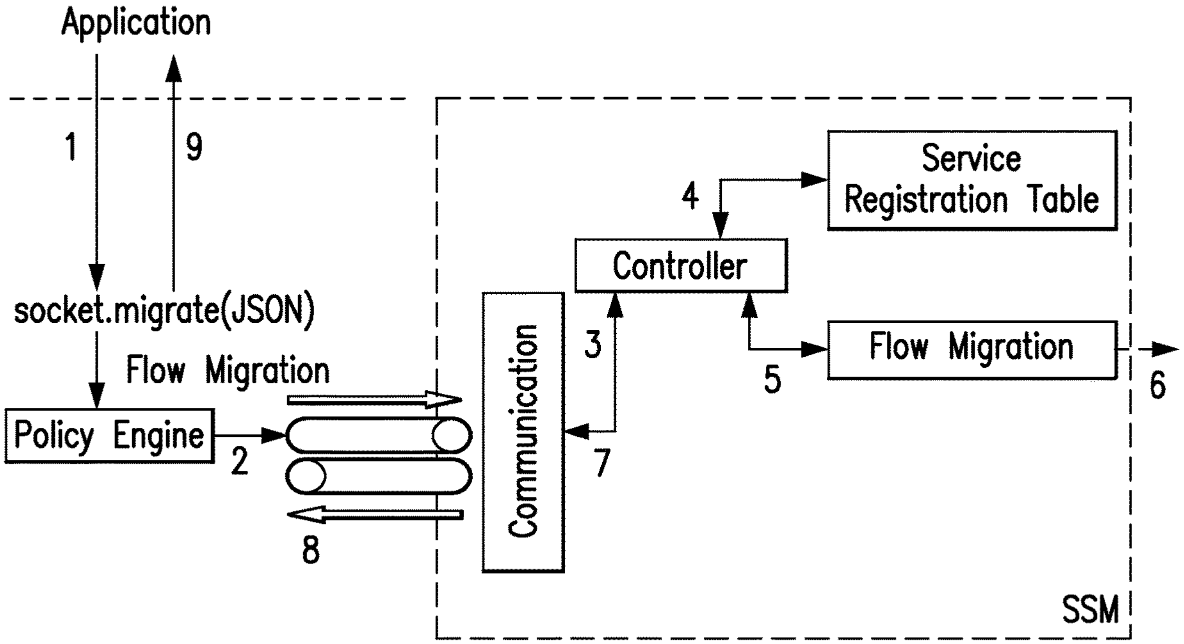
FIG. 48 is a diagram illustrating an example of flow migration in accordance with one aspect of the disclosed subject matter.

For the purpose of illustration and not limitation, FIG. 48 shows the flow migration action points. Application 1 can call socket.migrate (JSON) API to initiate a flow migration for the calling socket. The policy engine can request flow migration with the flow details to SSM. The request can be passed onto the controller. The controller can check the service migration request and fetch the necessary device details from the SReg table entry. The controller can initiate the flow migration. The devices can be connected, and state of the flow can be synchronized between the two devices. The controller can notify the policy engine about the migration result, i.e., success or failure. The policy engine can be notified about the migration result. The policy engine can notify the application with the migration result.

Figures 1, 68:
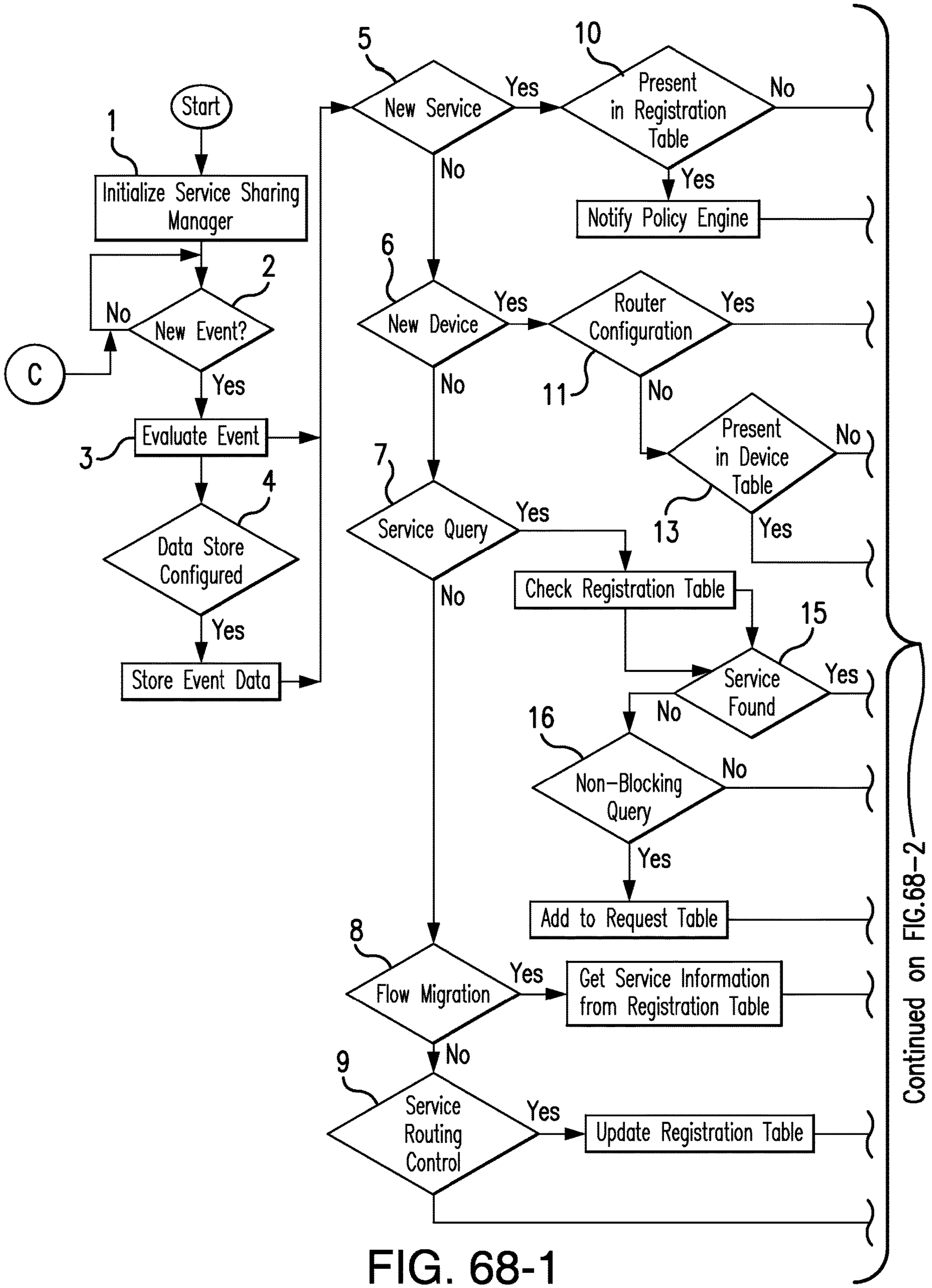
Figures 2, 68:
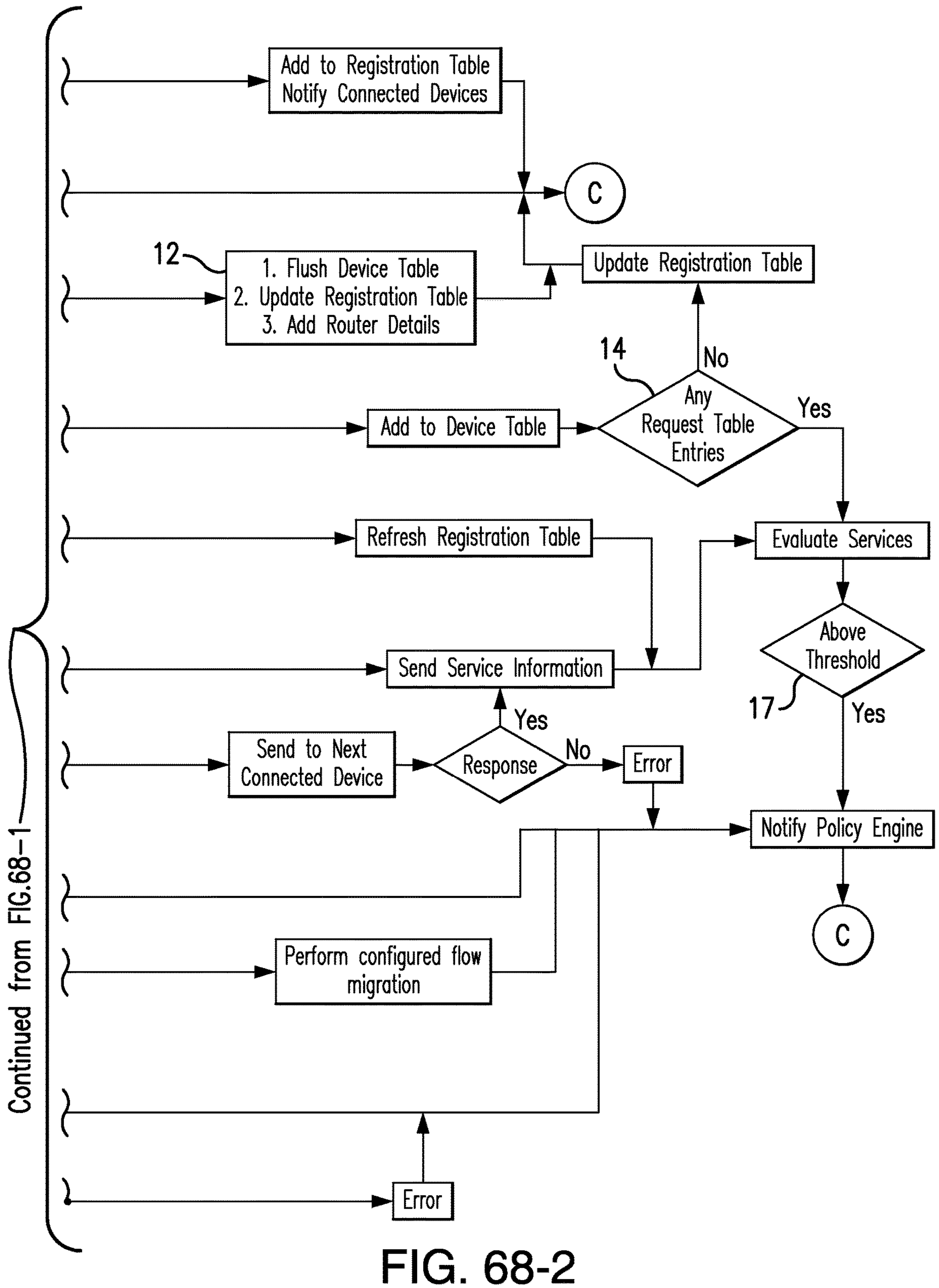

For the purpose of illustration and not limitation, FIG. 68 is an exemplary flow chart of the operation of the service sharing manager. The control middleware can initialize the service-sharing manager (SSM) 6801. The SSM controller can wait for new events 6802. When a new event occurs, the event can be evaluated 6803. If the local data store is configured, the controller can save the event data 6804. The controller can process the event type, e.g., new service 6805, new device 6806, service query 6807, flow migration 6808 and service routing control 6809. When the new service event is processed, the controller can create a registration table entry, if not present, and can notify all connected devices based connected device table entries 6810. When the new device event is processed, the controller can check for router configuration in event data 6811. If the new device is configured as a router, the connected device table can be flushed and the registration table can be updated 6812. The new device (router) details can be added into the connected device table. If the new device is not a router, the device details can be added into the connected device table and the registration table entries can be updated 6813. The controller can check the request table entries for any service match 6814, and if found, the services can be evaluated 6817, and if the service score is the above the configured threshold score, the policy engine can be notified, which in turn can notify the respective application. When a service query event is processed 6807, the controller can check the registration table. If the service is found, the service can be evaluated, and if threshold is reached, information can be sent to the policy engine 6817. If the service is not found, and the query is non-blocking, the query request can be added into the request table for future fulfillment 6816. If the query is blocking, the controller can forward the query to the next connected router and wait for the response. If the response is found, the policy engine can be notified about the service information.

In accordance with another aspect of the disclosed subject matter, as the Context aware Control Middleware (CCM) is device independent, it can be installed on network elements such as servers and routers that have computing and storage capabilities. When the network elements (e.g., routers) are deployed inside the network infrastructure, they can create a network-based dynamic computing platform. The dynamic service-aware routers (e.g., service routers) can discover, share and exchange information with each other using the service-sharing manager (SSM) of the control middleware in a peer-to-peer manner or in a centralized manner. The Service Routers (SR) can provide service as a basic abstraction of the network.

Figure 49:
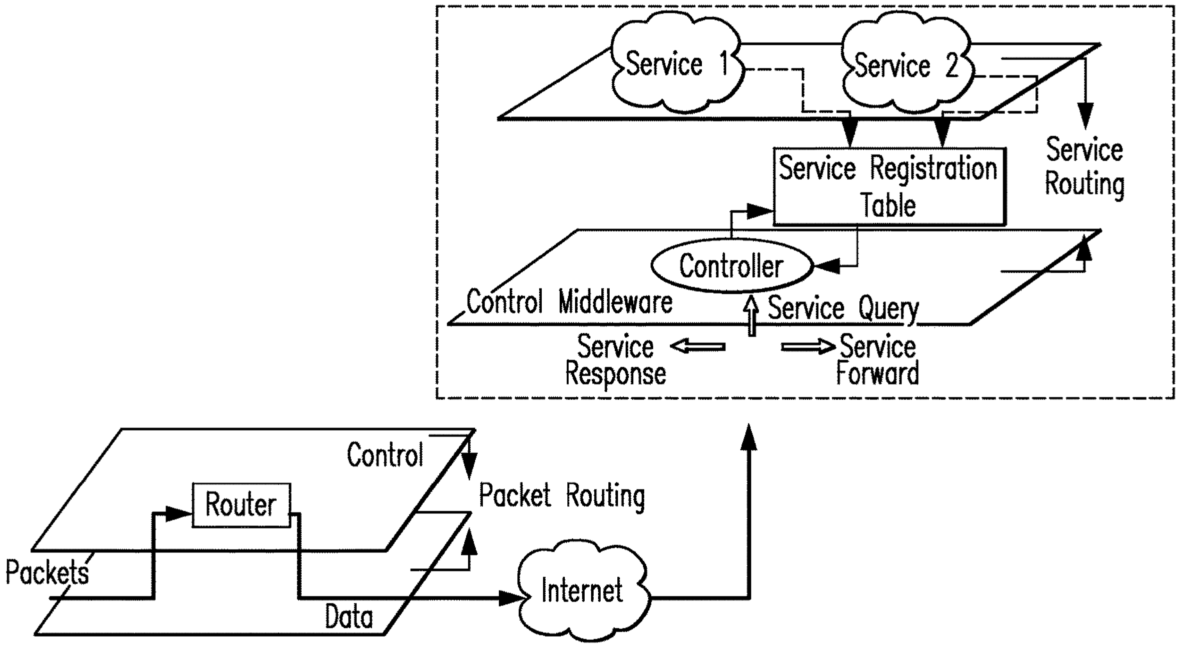
FIG. 49 is a diagram illustrating an example of service routing and packet routing in accordance with one aspect of the disclosed subject matter.

In accordance with one aspect of the disclosed subject matter, in the packet routing networks, routers can forward packets based upon the routing tables. With service routing, a SSM controller can perform service routing by lookup and control of service tables (e.g., SSM-SReg tables) when it receives a service query request. For the purpose of illustration and not limitation, FIG. 49 illustrates the service and packet routing planes with corresponding tables that control them. If a controller finds a service match, a service query response can be returned. If no service match is found, the service query request can be forwarded accordingly based upon SReg table entries. Service routing and packet routing can be independent of each other.

In accordance with one aspect of the disclosed subject matter, service routing provides distributed load balancing natively by allowing applications to update the service table independently. If an application service is experiencing a large number of requests, the ACTION attribute of the service table can be changed from DELIVER to FORWARD, assuming the service has redundancy in the network. The applications can use the service API call on the socket to define a service and also, perform any service changes. To change the service action state, the service call can take a JSON argument that includes the service_id and the new action_state. The policy engine can pass the request to the SSM, which can change the service state. In case applications don't want to monitor the services, the policy engine can dynamically update the SReg entry based upon the application's system resources usage (CPU, memory, bandwidth usage, and the like). The JSON object for the service can be as follows:

```
{
    service id: 2001:23::23:2314,
    action_state: FORWARD
}
```

Figure 50:
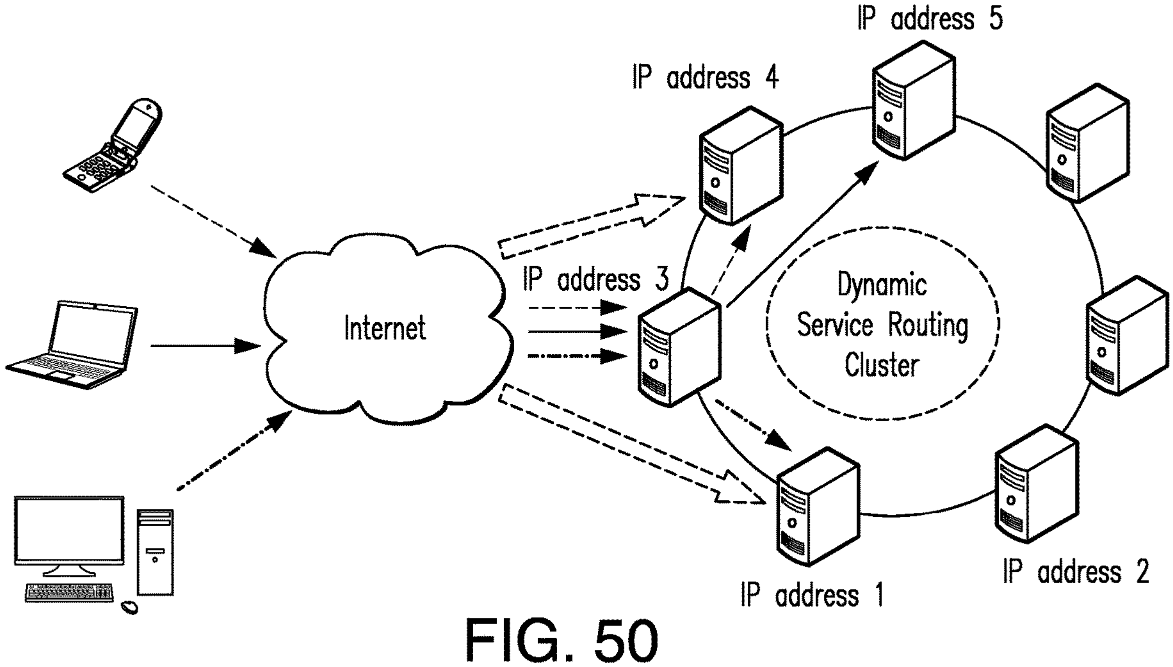
FIG. 50 is a diagram illustrating an example of service routing in the datacenter in accordance with one aspect of the disclosed subject matter.

In accordance with one aspect of the disclosed subject matter, when the control middleware is installed on the datacenter servers, the application service providers (ASP) can host services, which can be dynamically load balanced without any special hardware use. For the purpose of illustration and not limitation, FIG. 50 shows a dynamic service routing cluster installed inside an ASP's infrastructure. The cluster can be configured to scale using other topologies like master-slave or hierarchical. The clients, e.g. mobiles, laptops, and desktops, can make use of this service routing environment by using blocking query API. A blocking query can return the service resolution result immediately. In case of non-blocking query, the service resolution optionally can happen immediately, but the application can listen for the service availability. The client applications can call socket.query( ) API with a JSON query request, for example, as follows:

```
{
    query_type: blocking,
    service_id: 2001::30:3433,
    service_node: 128 / 32 bit location address,
    hop_count: 4,
    auto_connect: true
}
```

The service_id attribute can define which service the client application wants to connect to. The service_node can be the destination node where the client expects the service to reside; the actual service optionally can be hosted on that node. For example, Columbia document service, i.e., www.docs.columbia.edu, can be hosted in a different data center, but the client application is unaware of it. The hop_count attribute can define the maximum service nodes the query request can traverse. The auto_connect attribute can direct the control middleware to connect to the resolved service location automatically without calling socket.connect( ) function.

Figure 51:
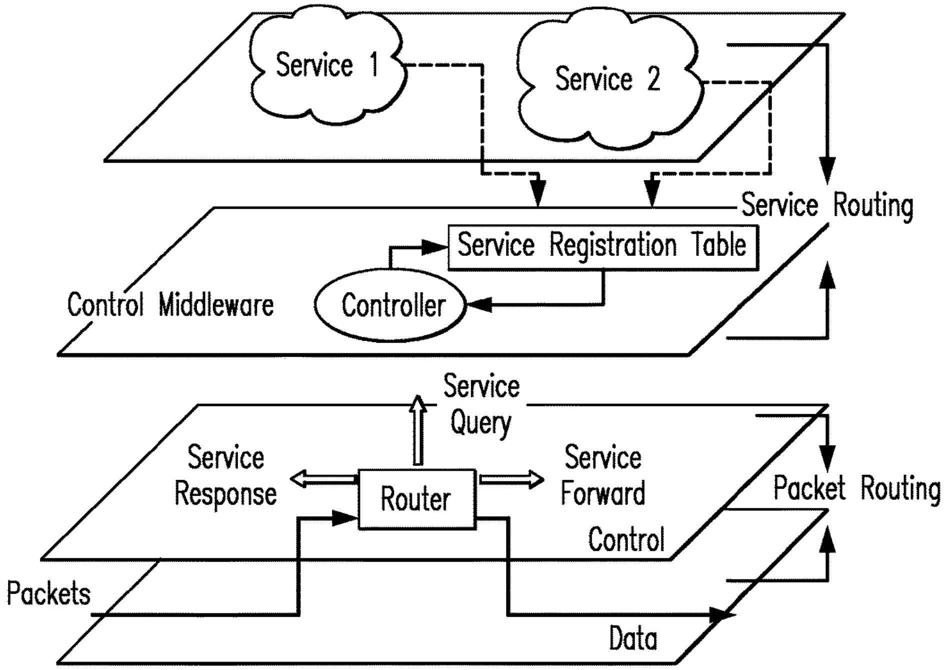
FIG. 51 is a diagram illustrating an example of service and packet routing in a router in accordance with one aspect of the disclosed subject matter.

In accordance with one aspect of the disclosed subject matter, to improve network latency, application reliability and availability, ASPs can deploy services inside the network infrastructure. In this case, the service routers can work on both packet and service routing. For the purpose of illustration and not limitation, FIG. 51 shows service routing on top of packet routing. The service routers can discover each other in a peer-to-peer manner or using a centralized service controller.

Figure 52:
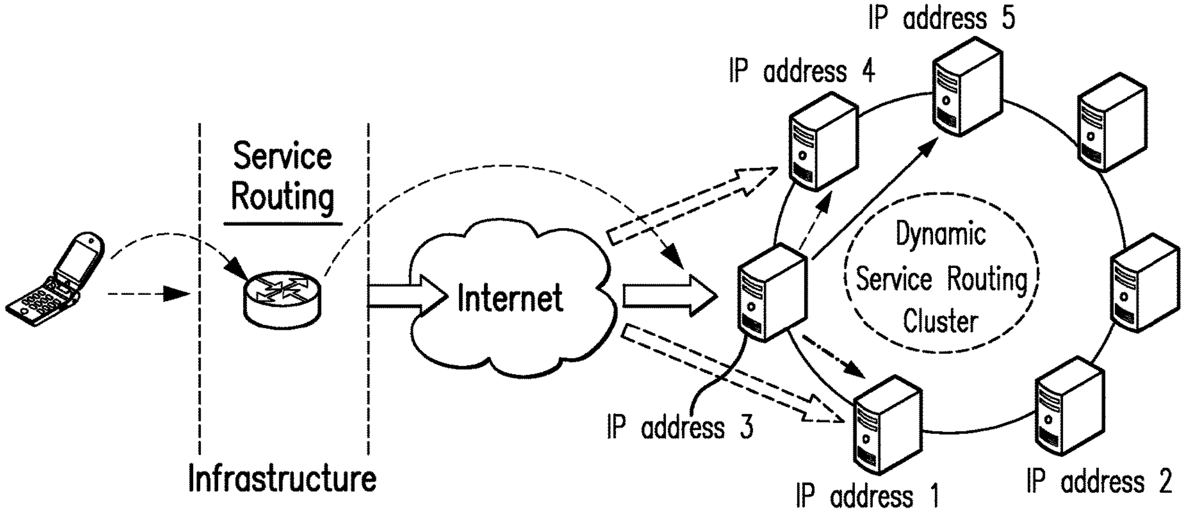
FIG. 52 is a diagram illustrating an example of service routing in the network infrastructure in accordance with one aspect of the disclosed subject matter.

For a UE, the nearest service router can be configured in the SSM by a network-based centralized service or opportunistically by using a control probe message based upon the SSM configuration. The client applications can issue a query API call for service resolution, which makes the service deployment location independent. The service query request can be first processed in the service router and then routed to the specified service node, if service is not hosted in the network, as shown in FIG. 52, for the purpose of illustration and not limitation. This in-network service platform can create a Dynamic Service aware Network.

In accordance with one aspect of the disclosed subject matter, the ASP services are registered with the service tables using service( ) API and managed independently. Each service can register one or more unique identifiers (e.g., service ID and URI). Similar to IP tables, the service tables can be global. To remove conflicts between service ids from multiple ASPs, a unique ID of each ASP can be used as a prefix with the service id, for example, HIT::Service-ID. The registered services can have a default action DELIVER in the SRT table. The service IDs and URIs in the SRT table can use wild cards. For example, a 256 bit service ID, 2001::02::*, captures all the service requests for ASP with 128 bit identity starting with 2001::02. The wild cards can be used on URIs as well. For example, if www.docs.columbia.edu/* URI is stored in service table, it captures all the service requests for Columbia document services.

Once the service is registered in the service router, the service discovery agent can publish the service in the network. Different methods can be used to publish the service based upon the implementation including, for example, Centralized, Cluster-based, Flooding or using Distributed Hash Tables methods. After the service discovery, service table entries can be filled with DELIVER, FORWARD, DROP, and DELAY actions accordingly. If there are no services running on the router, the default entry [*|FORWARD|Next Service Router location address] can be executed.

In accordance with one aspect of the disclosed subject matter, the UEs are connected to the nearest service router, e.g. service gateway (SG) (the first service router connected to each UE is called service gateway, as it acts as a gateway for the whole service network; functionally service gateways are identical to other service routers), in the network infrastructure. The client can request for a service using the query API and the local SSM controller can pass the request to the connected SG. The SSM controller on the service router can inspect the service query, e.g., service-id/URI, within its service table entries. If an entry is found with a DELIVER action, a service response can be sent along with the location address and port number of the resolved service. If a FORWARD action is found, the request can be forwarded to the IP address of the next configured service router. If no matching entries are found, the request is forwarded via the default entry [*|FORWARD|Next Service Router location].

Figure 53:
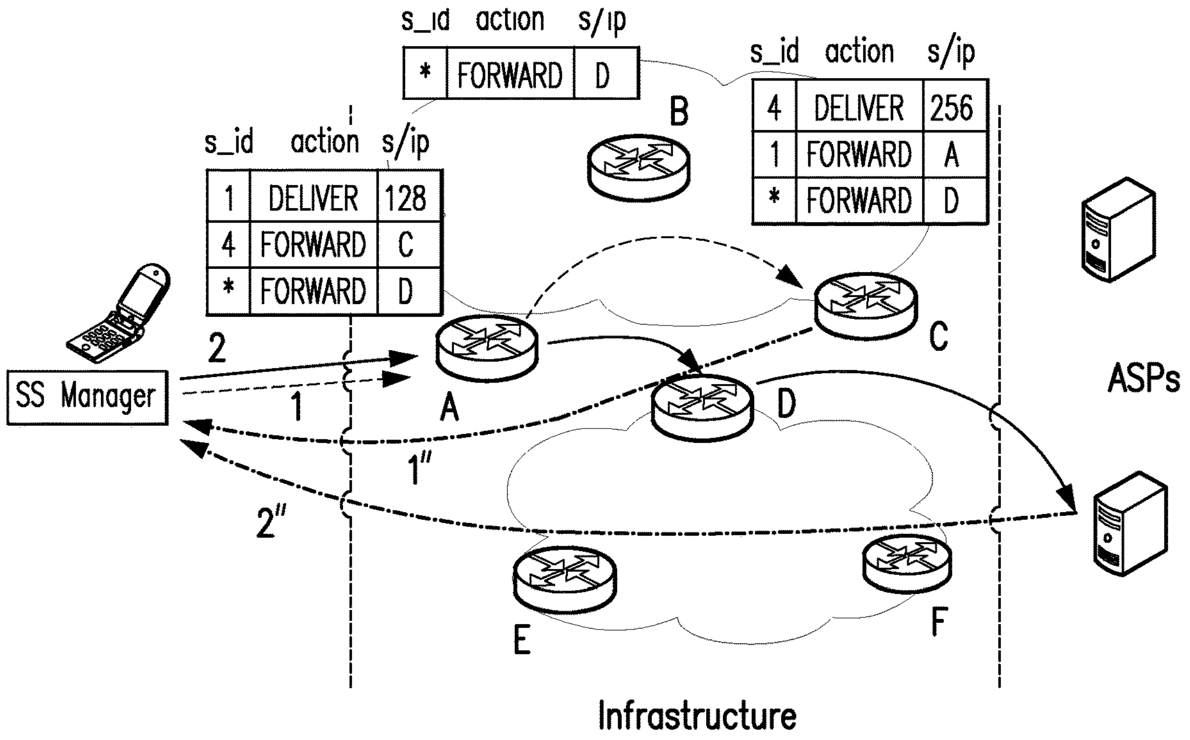
FIG. 53 is a diagram illustrating an example of service request flow in accordance with one aspect of the disclosed subject matter.

As shown in FIG. 53 for the purpose of illustration and not limitation, the UE can be connected to the service gateway "A". The UE can query for service with id=4 (i.e., query 1). The request reaches A, and after checking the service table entries, the request can be forwarded to service router C. The SSM controller at router C can find the service and return the service information back to the UE. For the second service query, the request reaches service router A then service router D without successful service resolution in the network. The service router D can pass on the request to the service_node attribute value of the service request query. As the service request query is created by an ASP application, it can query for location based and/or high bandwidth services. For example, Netflix can provision a high bandwidth service inside Verizon's New York network and the service request query call can add location=NYC and bandwidth=5 Mbps as additional parameters.

Figure 54:
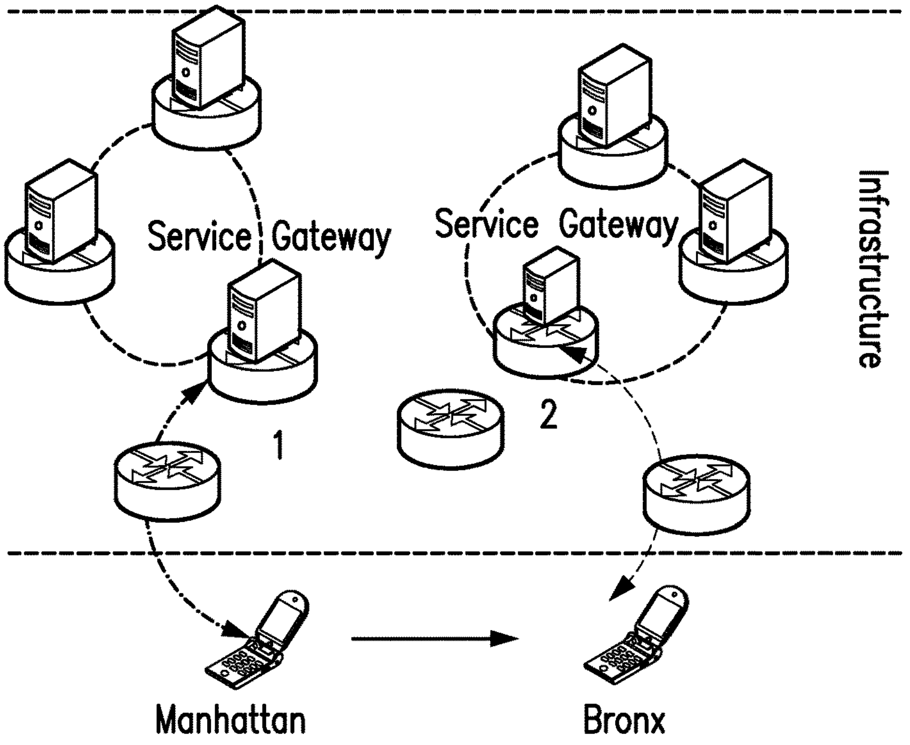
FIG. 54 is a diagram illustrating an example of mobility and the service gateway in accordance with one aspect of the disclosed subject matter.

In accordance with one aspect of the disclosed subject matter, as a UE is moving from one location to another, the SG can also be configured dynamically based upon the UE's location. For the purpose of illustration and not limitation, FIG. 54 shows dynamic SG configuration when a UE moves from Manhattan to Bronx area. In Manhattan, the MN is connected to SG 1 and when the MN moves to Bronx area, the SG 2 can be selected dynamically.

In accordance with one aspect of the disclosed subject matter, in a cloud-computing environment, applications from different users (e.g., ASPs, Enterprises, or Governments) are separated and secured from each other by means of a virtual machine (VM) abstraction. A hypervisor (i.e., a piece of computer software, firmware or hardware that is used to run VMs) with control middleware configured in network configuration can be installed on datacenter servers or service routers creating a dynamic service-computing platform.

Figure 55:
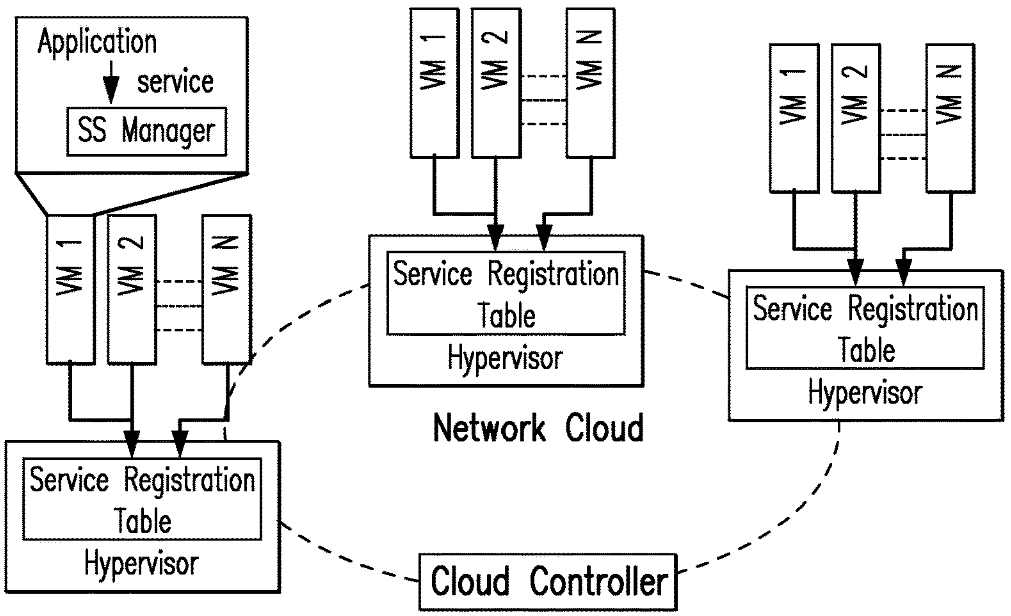
FIG. 55 is a diagram illustrating an example network service cloud in accordance with one aspect of the disclosed subject matter.

In the network configuration, the control middleware in the hypervisor can act as a centralized service discovery manager for all the locally running VMs. The hypervisors themselves gat act as an independent peer, which communicates with other peers. For the purpose of illustration and not limitation, FIG. 55 shows a service cloud deployed within the network using hypervisor enabled service routers. Cloud platforms like OpenStack (i.e., http://www.openstack.org/) or OpenNebula (i.e., http://opennebula.org/) can manage VMs deployed on the service routers. For example, www.google.com can provision virtual machines inside a network, based upon local user traffic usages. Google applications can register their services with the control middleware and VM control middleware in-turn can update the service tables of the local hypervisor.

Figure 56:
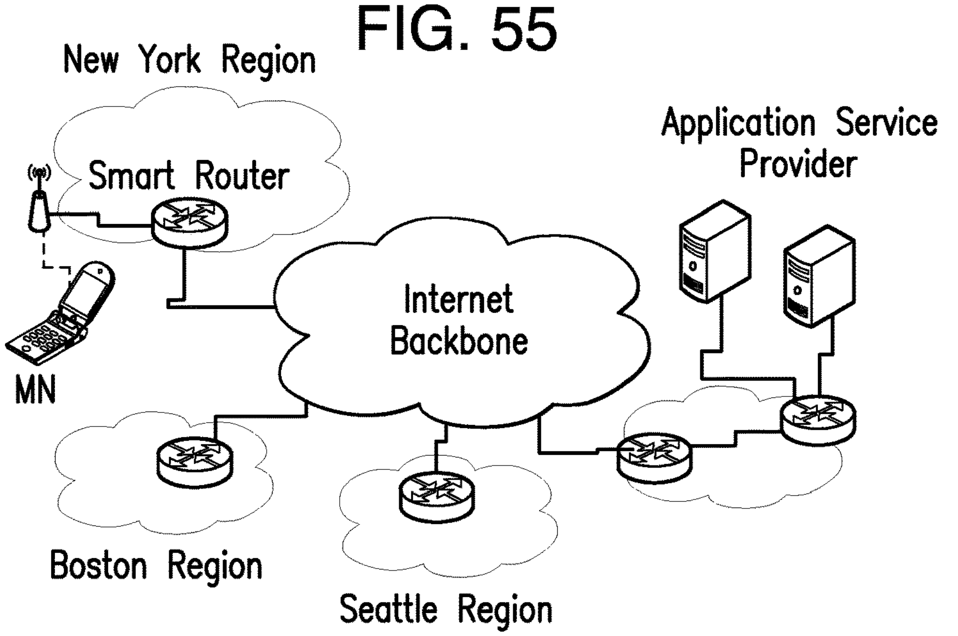
FIG. 56 is a diagram illustrating an example ASP using the network cloud in accordance with one aspect of the disclosed subject matter.

Similarly, a generic platform for various programming languages (e.g., Java, Ruby, Python, PUP, and the like) can be deployed on these service routers to form platform-as-a-service (PaaS) cloud. Internet application service providers, e.g., Facebook, Twitter, Google, and the like, can leverage this platform to improve latency, and load balancing as services can be deployed close to the user and it also can reduce the load on origin servers. For example, as shown in FIG. 56 for the purpose of illustration and not limitation, if an Internet application provider like Twitter.com (i.e., Java platform) is experiencing service outage due to heavy traffic from New York region, it can deploy its service (rather than a full VM) directly inside network within the network provider's NYC region to reduce service load. In this example, all the twitter.com traffic from NY region is handled inside the network itself.

Figure 57:
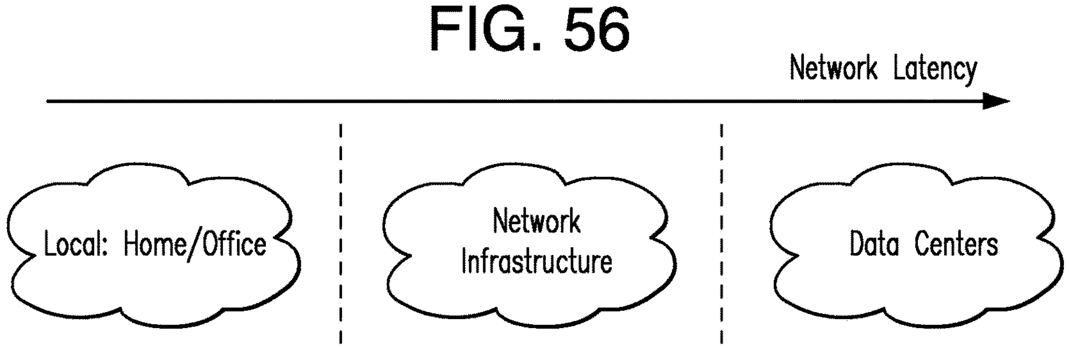
FIG. 57 is a diagram illustrating exemplary network latency based on service location in accordance with one aspect of the disclosed subject matter.

Service deployment in a local network, data center and within the network infrastructure (as described above) can be advantageous particularly given the gradual increase in the network latency as a local network is moved towards data centers as shown in FIG. 57, for the purpose of illustration and not limitation. With new mobile devices, e.g., smartphones, tablets and laptops, and mobile broadband access, the users are consuming more mobile content. The intelligence to access services based upon the location of the user or the device environment seamlessly, and also, manage services at these locations in a seamless manner can add value, resource savings and new business models.

Current networking infrastructure provides only packet forwarding functionality. With reduced cost in computing and storage, and in accordance with the disclosed subject matter, networking infrastructure can provide a computing platform using service routers, as described above. These service routers can compute and store the user network access logs for providing better future services. Having computing and storage within the network infrastructure can create a "Network with Memory" system, which knows the UE behavior in the network from past network access data. Having a network with a memory can help in stopping Denial-of-Service (DoS) attacks, forensics for understanding security events, providing detailed behavior of UE in the network, and providing better user network services based upon traffic classification methods.

In accordance with one aspect of the disclosed subject matter, the Network Access History (NAH) system manages the network access history of for an ISP. The service can be distributed on top of the network service routers. The data can be aggregated by the NAH service using Service Sharing Manager (SSM) APIs running on a service router. Large datasets can be provided in the network related to users, applications, and service usage traffic. The datasets can be stored using privacy preserving algorithms to provide anonymity to users and application service providers. The datasets generated by the NAH service can be used for data mining (e.g., detecting anomalies, trends, patterns, and correlations) using the computing capabilities of network service cloud. For example, the usage patterns of a given user can be tracked and analyzed (just as the geographic data was used as described above to optimize the network usage) to proactively offer services to users, including, for example, detecting hot-spots and saving battery power by suppressing application execution. Service usage can be forecasted for providing better service.

Figure 58:
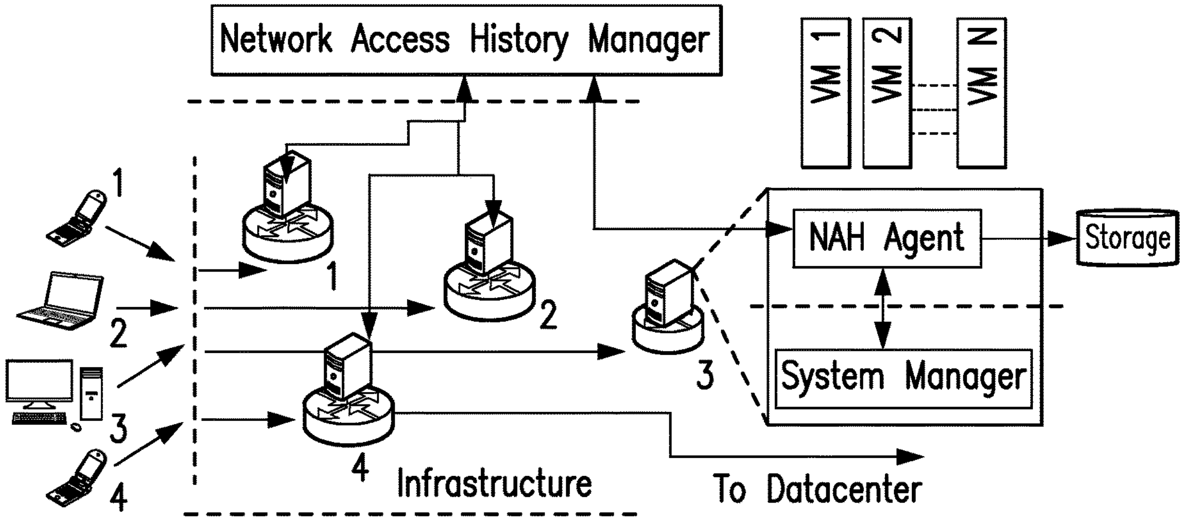
FIG. 58 is a diagram illustrating exemplary network access log service in accordance with one aspect of the disclosed subject matter.

For the purpose of illustration and not limitation, FIG. 58 shows the NAH service. The NAH Manager can manage distributed NAH Agents, which store the access log locally. For example, UE 1, 2 and 3 access services locally from the network and UE 4 can access services from the datacenter.

Figure 59:
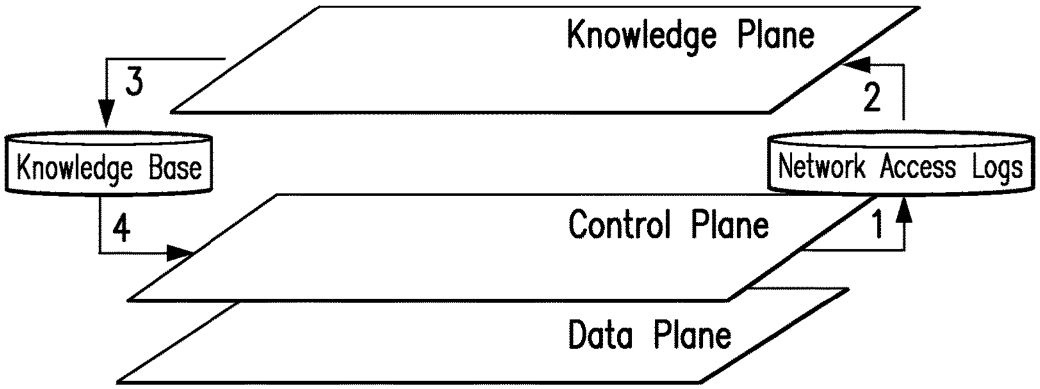
FIG. 59 is a diagram illustrating an example knowledge plane in accordance with one aspect of the disclosed subject matter.

In accordance with one aspect of the disclosed subject matter, storing access logs and mining the logs for useful information about UEs creates a knowledge plane in the network infrastructure, similar to the knowledge plane for a UE described above. For the purpose of illustration and not limitation, FIG. 59 illustrates the knowledge plane on top of the control and data plane. The mining and/or learning algorithms of the knowledge plane can process the network access logs and the results can be stored in the knowledge base. The knowledge base enables the network to have its own memory. For any future network access request from a UE, the knowledge base can be referenced to allow or deny access and to configure the QoS for the respective flow.

In accordance with one aspect of the disclosed subject matter, the NAH Manager deploys a distributed map-reduce service on top of service routers to perform data mining. The Map-Reduce is a programming model for processing large data sets. In the "Map" step, the master node can take the input, divide it into smaller sub-problems, and distribute them to worker nodes. A worker node can do this again in turn, leading to a multi-level tree structure. The worker node can process the smaller problem, and pass the answer back to its master node. In the "Reduce" step, the master node can then collect the answers to all the sub-problems and combine them in some way to form the output, i.e., the answer to the problem it was originally trying to solve.

Figure 60:
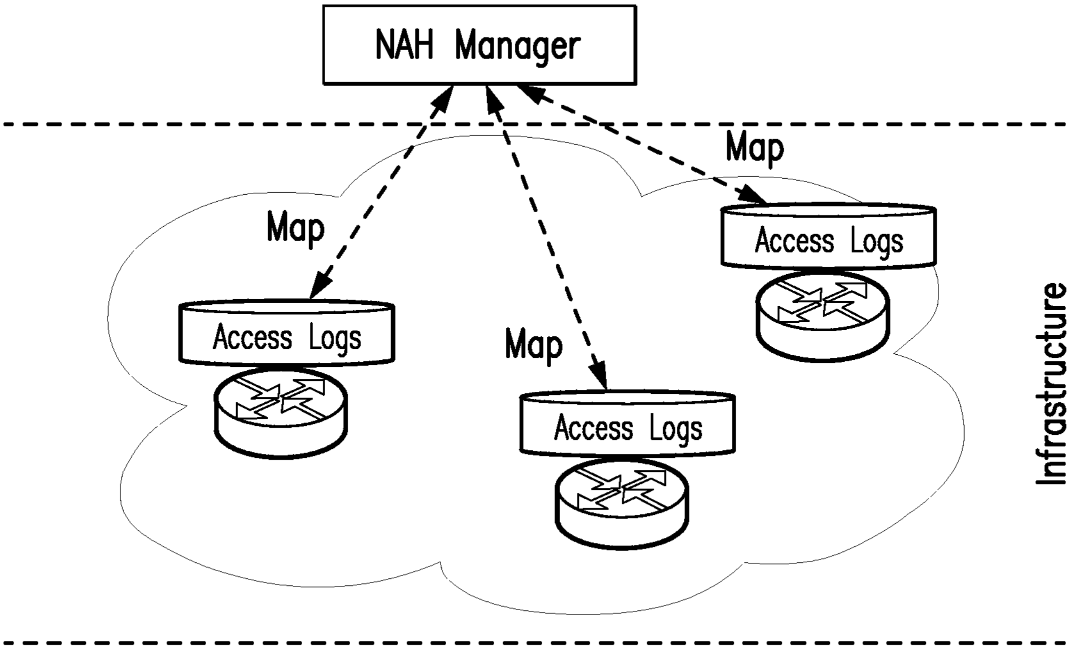
FIG. 60 is a diagram illustrating an example of in-network data mining in accordance with one aspect of the disclosed subject matter.

For the purpose of illustration and not limitation, FIG. 60 shows a distributed map-reduce framework. The NAH manager can act as a master and can perform the reducing step, and distributed processes on service routers can perform the processing map step.

The foregoing merely illustrates the principles of the disclosed subject matter. Various modifications and alterations to the described embodiments will be apparent to those skilled in the art in view of the teachings herein. For example, various values and ranges, including dimensions, electromagnetic properties, temperatures and times, are provided in the descriptions of the exemplary embodiments, and a person skilled in the art will be able to modify the values and ranges for use in particular applications within the scope of the disclosed subject matter. It will be appreciated that those skilled in the art will be able to devise numerous modifications which, although not explicitly described herein, embody its principles and are thus within its spirit and scope.

The invention claimed is:

1. A device for providing unified networking in a heterogeneous mobile environment comprising:

network hardware including a physical layer;

one or more memory devices having stored therein:

a link layer stacked on top of the physical layer;

a network layer stacked on top of the link layer;

a transport layer stacked on top of the network layer;

an application layer stacked on top of the transport layer;

a network control function (NCF) between the network layer and the transport layer for providing one or more of routing table control, multi-homing, mobility, multipath, and on-demand end-to-end security functionalities;

a link control function (LCF) between the link layer and the network layer for providing one or more of mac-address and lookup table control, link status, control, performance information, network packet lookup, network to device discovery and authentication, handover delay optimizations, and control for virtual interface configuration wherein the LCF is configured for communication with a network information manager that provides information about available networks; and a control middleware between the application layer and the transport layer for maintaining a mapping for one or more flows, maintaining one or more policies, and performing flow control decisions based on the one or more policies.

2. The device of claim 1, wherein the policies are one or more of the location of the device and a mapping of a plurality of infrastructure providers and their associated locations.

3. The device of claim 1, wherein the control middleware is adapted to manage the physical, link, and network control functions.

4. The device of claim 1, wherein the control middleware is adapted to provide one or more of multi-homing, mobility, multipath, service sharing, disruption tolerance, managing discovery of networks, devices, and available physical spectrum channels and combinations thereof.

5. The device of claim 1, wherein the control middleware is configured for communication with a service access manager for controlling network access.

6. The device of claim 5, wherein the service access manager communicates with a control middleware between an application layer and a transport layer on the device to receive a plurality of policies for selecting from the plurality of different network providers for network access.

7. The device of claim 1, wherein the NCF is adapted to provide a flow identifier to the transport layer which does not change during the lifetime of the flow even in the event of a mobility event.

8. The device of claim 1, wherein NCF is configured for communication with a mobility manager for handling mobility events.

9. The device of claim 1, the one or more memory devices further having stored therein a physical control function (PCF) between the physical layer and the link layer for managing spectrum channel configuration, wherein the PCF is configured for communication with a spectrum database manager for transceiver spectrum configuration.

10. The device of claim 1, wherein the control middleware comprises one or more of a network manager, a location manager, a security manager, a queue manager, a service sharing manager, one or more system manager modules, a data store, and a policy engine.

11. The device of claim 10, wherein the policy engine is configured to maintain a mapping for all active connections of the device and to determine when to execute handovers;

the security manager is configured to store network information selected from the group comprising network access credentials, device access credentials, user access credentials, user identities, pseudo identities, local identities, time-to-live for credentials;

the location manager is configured to store a plurality of location data;

the network manager is configured to store a plurality of network performance information; and the service sharing manager is configured to store a plurality of devices and shared services information.

12. The device of claim 10, wherein the policy engine is distributed across a network comprising the device and wherein the policy engine performs the flow control decisions based on first information available at the device and second information from other network nodes in a service plane.

13. The device of claim 1, wherein the control middleware is configured for sharing, across the plurality of devices, application services and system services associated with hardware components of each of the plurality of devices, and wherein each service executing on a device is associated with a corresponding uniform resource identifier.

14. The device of claim 1, wherein the control middleware is configured for offloading execution of one or more application services to a cloud environment.

15. The device of claim 14, further comprising offloading execution of one or more application services to a cloud environment for at least one or more of additional resources and application policy requirement.

16. The device of claim 1, further comprising a learning algorithm configured to analyze stored data in the knowledge base to perform flow decisions.

17. The device of claim 16, wherein the learning algorithm comprises at least one of an artificial neural network based algorithm and a hidden Markov based algorithm.

* * * * *